(12) United States Patent
Idaka et al.

(10) Patent No.: US 8,399,803 B2
(45) Date of Patent: *Mar. 19, 2013

(54) LASER PROCESSING SYSTEM

(75) Inventors: Mamoru Idaka, Osaka (JP); Hideki Yamakawa, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,896

(22) Filed: Nov. 22, 2011

(65) Prior Publication Data

US 2012/0062972 A1    Mar. 15, 2012

Related U.S. Application Data

(62) Division of application No. 11/828,505, filed on Jul. 26, 2007, now Pat. No. 8,084,713.

(30) Foreign Application Priority Data

Jul. 27, 2006  (JP) .................................. 2006-204777

(51) Int. Cl.
*B23K 26/03* (2006.01)
*G06F 19/00* (2011.01)

(52) U.S. Cl. ................... 219/121.83; 700/166

(58) Field of Classification Search ............. 219/121.62, 219/121.67, 121.68, 121.69, 121.72, 121.83; 700/166, 180, 184

See application file for complete search history.

(56) References Cited

U.S. PATENT DOCUMENTS

| | | | |
|---|---|---|---|
| 4,864,112 A | 9/1989 | Imai et al. | |
| 4,978,202 A | 12/1990 | Yang | |
| 5,001,718 A | 3/1991 | Burrows et al. | |
| 5,067,086 A | 11/1991 | Yamazaki et al. | |
| 5,646,765 A | 7/1997 | Laakmann et al. | |
| 5,660,747 A | 8/1997 | Drouillard et al. | |
| 5,751,436 A | 5/1998 | Kwon et al. | |
| 5,864,114 A | 1/1999 | Fukuda | |
| 5,897,797 A | 4/1999 | Drouillard et al. | |
| 6,043,452 A | 3/2000 | Bestenlehrer | |
| 6,180,914 B1 | 1/2001 | Jones et al. | |
| 6,210,401 B1 | 4/2001 | Lai | |

(Continued)

FOREIGN PATENT DOCUMENTS

| | | |
|---|---|---|
| JP | 62263889 | 11/1987 |
| JP | 02198412 | 8/1990 |

(Continued)

OTHER PUBLICATIONS

Office Action issued by the U.S. Patent and Trademark Office in corresponding U.S. Appl. No. 11/585,356 dated Nov. 9, 2010 (22 pages).

(Continued)

*Primary Examiner* — Geoffrey S Evans
(74) *Attorney, Agent, or Firm* — Kilyk & Bowersox, P.L.L.C.

(57) ABSTRACT

A method of setting processing data for a computer-assisted laser processing apparatus is disclosed, along with a system for setting a laser processing data. The method comprises a function of setting a three-dimensional profile of a object and a processing pattern as processing conditions, a function of generating processing data representing the processing conditions for the object, and a function of visually displaying a two dimensional representation of the processing data on a display screen and a function of setting a three-dimensional profile of a object and a processing pattern as processing conditions, wherein it is enabled to set the three-dimensional profile and the processing pattern while displaying the object in two dimensions on the display screen disposed within a processing zone.

13 Claims, 63 Drawing Sheets

U.S. PATENT DOCUMENTS

| | | | |
|---|---|---|---|
| 6,325,792 | B1 | 12/2001 | Swinger et al. |
| 6,344,625 | B1 | 2/2002 | Kim et al. |
| 6,438,445 | B1 | 8/2002 | Yoshida et al. |
| 6,469,729 | B1 | 10/2002 | Ryan |
| 6,483,071 | B1 | 11/2002 | Hunter et al. |
| 6,552,300 | B1 | 4/2003 | Kerner |
| 6,594,926 | B1 | 7/2003 | Wujciga |
| 6,617,544 | B1 | 9/2003 | Tsukamoto et al. |
| 6,888,542 | B1 | 5/2005 | Clauss |
| 7,069,108 | B2 | 6/2006 | Saarela et al. |
| 7,380,717 | B2 | 6/2008 | Lubow |
| 7,705,870 | B2 | 4/2010 | Sato |
| 8,084,713 | B2 * | 12/2011 | Idaka et al. ............. 219/121.83 |
| 2001/0031960 | A1 | 10/2001 | Kliewer et al. |
| 2001/0044668 | A1 | 11/2001 | Kimbrough et al. |
| 2003/0057609 | A1 | 3/2003 | Ratcliffe |
| 2005/0049500 | A1 | 3/2005 | Babu et al. |
| 2005/0205781 | A1 | 9/2005 | Kimba |
| 2006/0066877 | A1 | 3/2006 | Benzano |
| 2006/0089747 | A1 | 4/2006 | Sakai |
| 2006/0118733 | A1 | 6/2006 | Kiyohara et al. |
| 2006/0180582 | A1 | 8/2006 | Andreasch et al. |
| 2006/0228525 | A1 | 10/2006 | Dakowski |
| 2007/0086822 | A1 | 4/2007 | Sato |
| 2007/0100492 | A1 | 5/2007 | Idaka et al. |
| 2007/0252006 | A1 | 11/2007 | Heck et al. |
| 2008/0011854 | A1 | 1/2008 | Idaka |
| 2008/0017619 | A1 | 1/2008 | Yamakawa et al. |
| 2008/0067251 | A1 | 3/2008 | Yoshimoto et al. |

FOREIGN PATENT DOCUMENTS

| | | |
|---|---|---|
| JP | 11028586 | 2/1999 |
| JP | 2000202655 | 7/2000 |
| JP | 2003136260 | 5/2003 |
| JP | 2005175566 A | 6/2005 |
| JP | 2006007257 A | 1/2006 |
| WO | 2005046926 A1 | 5/2005 |
| WO | 2006061959 A1 | 6/2006 |

OTHER PUBLICATIONS

Office Action issued by the U.S. Patent and Trademark Office in corresponding U.S. Appl. No. 11/770,104 dated Dec. 17, 2010 (26 pages).

Office Action received in related U.S. Appl. No. 11/855,448 dated Apr. 5, 2012 (30 pages).

Office Action issued by the U.S. Patent and Trademark Office in corresponding U.S. Appl. No. 11/770,104 dated Aug. 12, 2011, nineteen pages.

Office Action issued by the U.S. Patent and Trademark Office in corresponding U.S. Appl. No. 11/585,356 dated Sep. 25, 2008 (14 pages).

Office Action issued by the U.S. Patent and Trademark Office in corresponding U.S. Appl. No. 11/585,356 dated Jun. 8, 2009 (15 pages).

Office Action issued by the U.S. Patent and Trademark Office in corresponding U.S. Appl. No. 11/585,356 dated Mar. 16, 2010 (18 pages).

Office Action issued by the U.S. Patent and Trademark Office in corresponding U.S. Appl. No. 11/769,131 dated Nov. 13, 2009 (14 pages).

Office Action issued by the U.S. Patent and Trademark Office in corresponding U.S. Appl. No. 11/769,131 dated Jun. 3, 2010 (10 pages).

Office Action issued by the U.S. Patent and Trademark Office in corresponding U.S. Appl. No. 11/770,104 dated Sep. 17, 2009 (17 pages).

Office Action issued by the U.S. Patent and Trademark Office in corresponding U.S. Appl. No. 11/770,104 dated May 26, 2010 (16 pages).

Office Action issued by the U.S. Patent and Trademark Office in corresponding U.S. Appl. No. 11/855,448 dated Jun. 23, 2009 (16 pages).

Office Action issued by the U.S. Patent and Trademark Office in corresponding U.S. Appl. No. 11/855,448 dated Mar. 10, 2010 (15 pages).

* cited by examiner

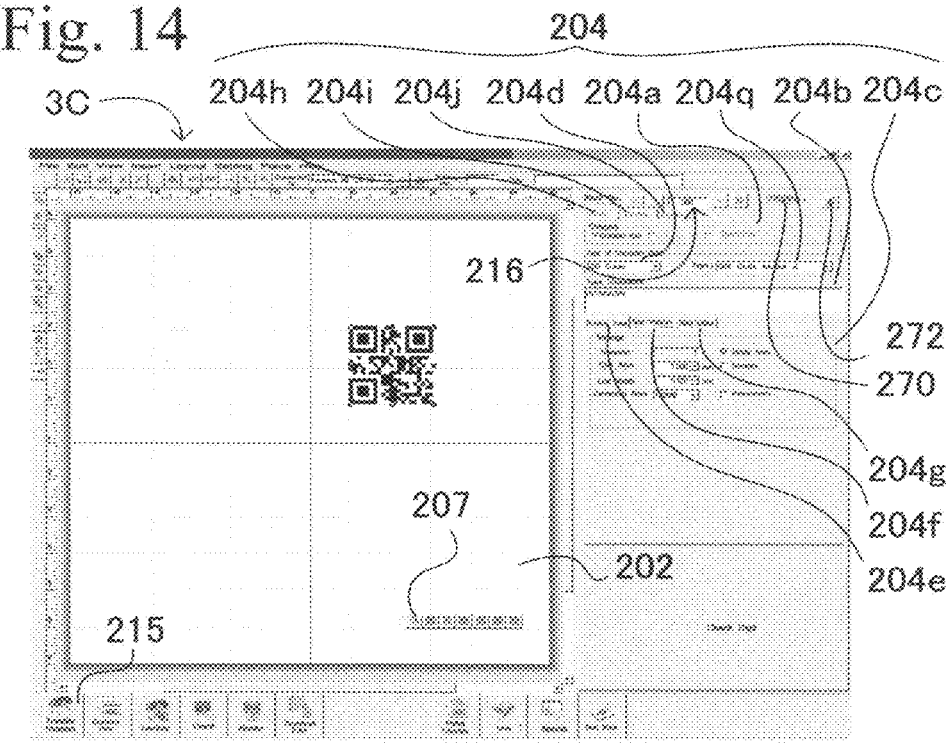
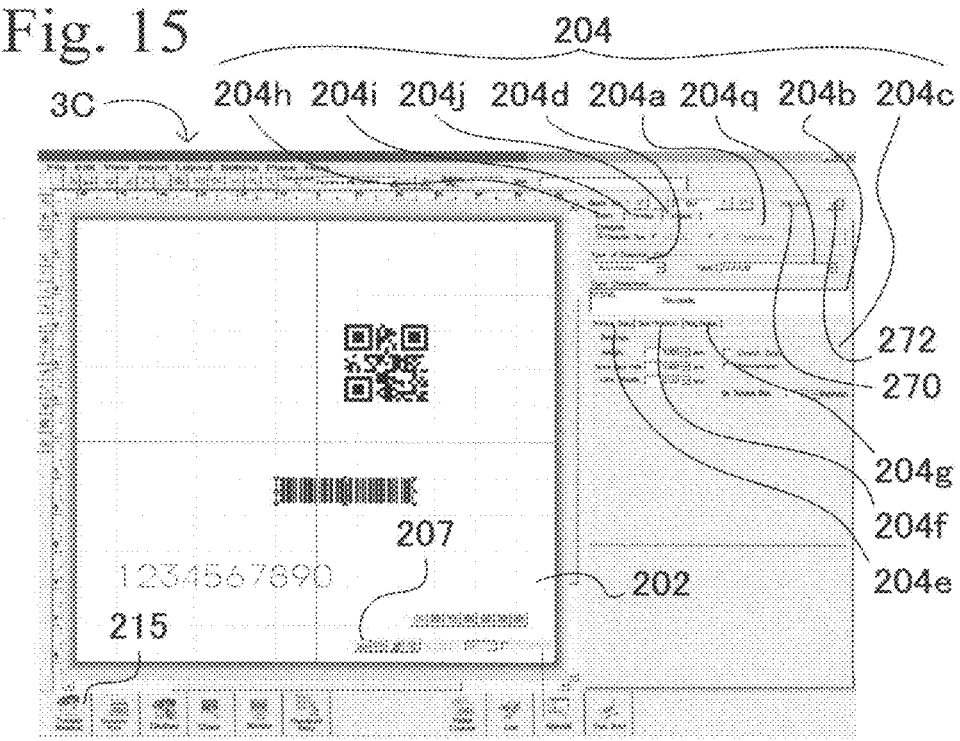

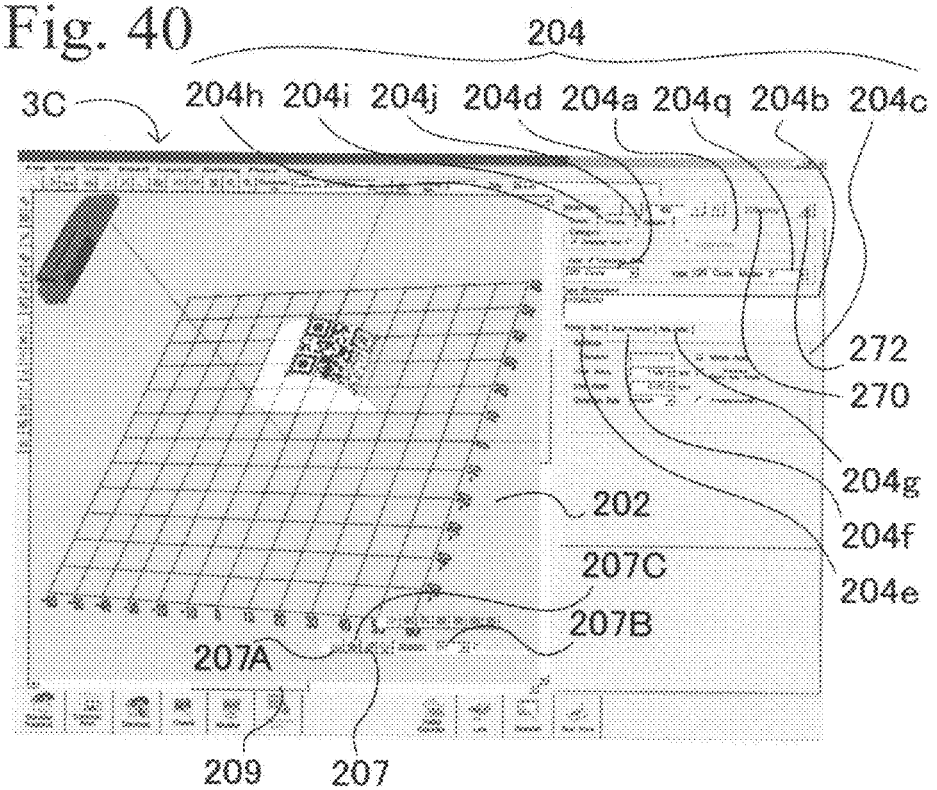
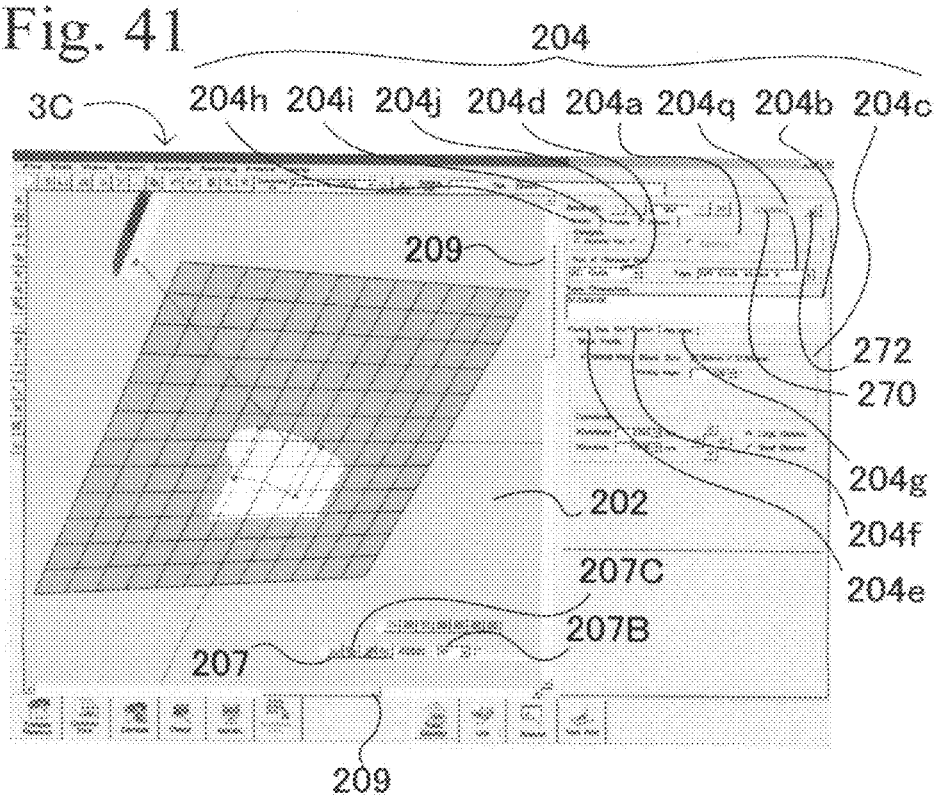

Fig. 92

Fig. 96A  Fig. 96B
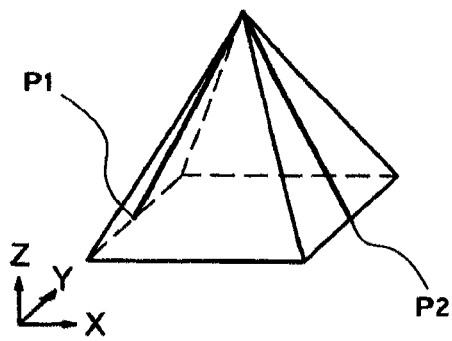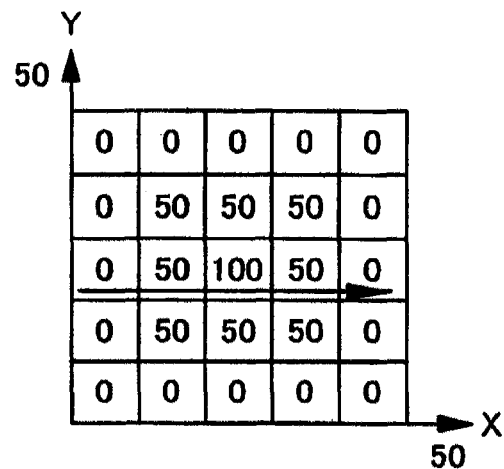
Fig. 97A  Fig. 97B
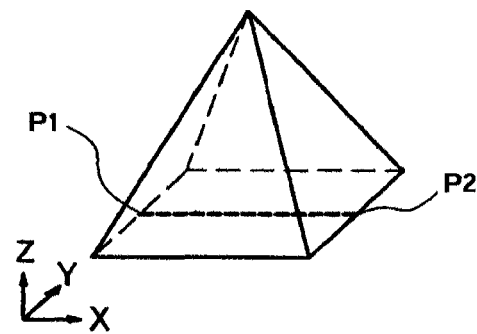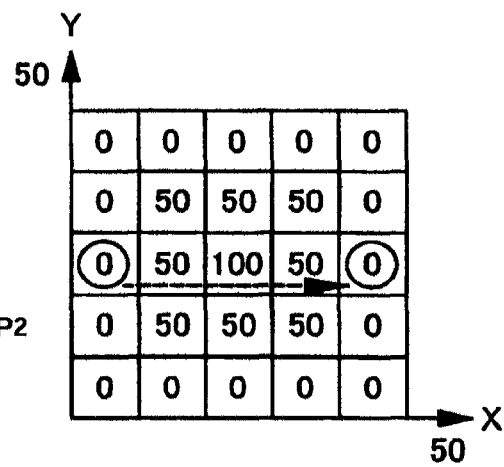

LASER PROCESSING SYSTEM

This application is a divisional of U.S. patent application Ser. No. 11/828,505, filed Jul. 26, 2007 (now allowed), which in turn claims priority from Japanese Patent Application No. 2006-204777, filed Jul. 27, 2006, which is incorporated herein by reference.

BACKGROUND OF THE INVENTION

1. Field of the Invention

The present invention relates to a method of and a system for setting processing conditions of a laser processing system such as a laser marker which performs processing such as printing or marking including characters, symbols and graphics on work with a laser beam, a computer program for setting processing conditions for a laser processing system, a computer-readable recording medium or device on which laser processing conditions are recorded.

2. Description of Related Art

A laser processing system scans a given scan field of a subject surface of works (work surfaces) such as components and finished products with a laser beam to apply processing, such as printing and marking of characters, symbols and/or graphics, to the work surfaces. Referring to FIGS. 1 and 2 for the purpose of providing a brief description of a configuration of a laser processing system by way of example, the laser processing system comprises a laser control unit 1, a laser output unit 2 and an input unit 3. Excitation light generated by a laser excitation device 6 of the laser control unit 1 excites a laser medium 8 of a laser oscillator 50 of the laser output unit 2. A laser beam L emanating from the laser medium 8 is expanded in beam diameter by a beam expander 53 and reflected and directed toward a scanning means by a reflection mirror. A two dimensional scanning means 9 deflects the laser beam L so as to scan a work W in a given scan field, thereby processing, e.g. marking or printing, the work W.

There has been known a laser processing system which is provided with a two dimensional scanning device 9 as shown in FIG. 2. The scanning device 9 comprises a pair of galvanic mirrors which form an X-axis scanner 14a and a Y-axis scanner 14b, and a pair of galvanic motors 51a and 51b to which the galvanic mirrors are mounted for rotation. The X-axis scanner 14a and the Y-axis scanner 14b are arranged so that their axes of rotation perpendicularly intersecting with each other and deflect an incoming laser beam so as to scan a scan field in X and Y directions perpendicularly intersect with each other. The scanning device 9 is provided with focusing means such as an fθ lens system for focusing the laser beam in a given scan field.

There has been known a laser processing system which is provided with a three-dimensional scanning device 14 as shown in FIG. 3. The scanning device 14 comprises a Z-axis scanner comprising a motor driven lens system capable of varying its focal distance which is referred to as a working distance in a direction of height of the work.

It is usual to use a computer program in order to create three dimensional laser processing data for implementation of three dimensional processing, such as three dimensional printing, by the laser processing system. However, because the three dimensional processing data requires a greater number of parameters regarding print locations as compared with two dimensional processing data, it is hard for users experienced only in creating two-dimensional laser processing data to create three dimensional processing data by use of the laser processing data setting program just as they intended.

SUMMARY OF THE INVENTION

It is therefore an object of the present invention to provide a method of and a laser processing condition setting system, and a laser processing system which enables to check up on whether settings are properly specified to let a processing pattern fall within a processable surface area of a work.

The foregoing objects and features of the present invention are accomplished by a laser processing system for processing a work surface within a working area with a predetermined processing pattern by the use of a laser beam. The laser processing system comprises laser generating means for generating a laser beam, scanning means for scanning a work surface with the laser bean within a scanning area, control means for controlling the a laser generating means and the scanning means so as to apply the laser processing to the work surface according to laser processing conditions, processing condition setting means for setting the laser processing conditions by specifying a three-dimensional profile of the work surface and a processing pattern, data generating means for generating laser processing data for the work surface according to the laser processing conditions; and display means for displaying and editing a representation of the laser processing data in two dimensions, wherein the scanning means comprises a beam expander for varying a distance at which the laser beam generated by the laser generating means is focused, a first scanner for deflecting the laser beam coming from the beam expander in a first direction to scan the work surface within the scanning area in the first direction, and a second scanner for deflecting the laser beam reflected by the first scanner in a second direction perpendicular to the first direction to scan the work surface within the scanning area in the second direction, and the processing condition setting means is enabled to set a three dimensional profile of the work surface and the processing pattern while the work surface is displayed in two dimensions in the display means.

The display means may be capable of changing a display of the work surface from a two dimensional display to a three dimensional display, displaying a display screen or window for displaying the work surface in three dimensions while displaying the work surface in two dimensions therein, or displays the work surface in two dimensions in a scanning plane therein. Further, the display means is capable of displaying the work surface in three dimensions selectively in an X-Y coordinate plane, a Y-Z coordinate plane and a Z-X coordinate plane.

The laser processing system may comprise switching means for switching the display means between a three dimensional edit mode in which three dimensional processing data is edited and a two dimensional edit mode in which three dimensional processing data is exclusively edited. The two dimensional edit mode is preferably chosen by default when the laser processing system is activated. Further, the laser processing system may comprises defective area detection means for detecting a defective work surface area of the work surface that is only defectively processable or unprocessable with the laser beam under the printing conditions by making a calculation based on the three-dimensional profile of the work surface and an angle at which the laser beam is expected to impinge onto the work surface, and warning means for hiding the processing pattern specified by the processing condition setting means on the display means when the processing pattern cuts across at least partly the defective work surface area.

According to another embodiment, a data setting system for setting processing data based on a processing pattern with which a laser processing system processes a work surface within a working area with a laser beam comprises processing condition setting means for setting the laser processing conditions by specifying a three-dimensional profile of the work surface and a processing pattern, data generating means for generating laser processing data for the work surface according to the laser processing conditions, and display means for displaying and editing a representation of the laser processing data in two dimensions, wherein the processing condition setting means is enabled to set a three dimensional profile of the work surface and the processing pattern while the work surface is displayed in two dimensions in the display means.

According to another embodiment, a method of setting laser processing data according to a processing pattern based on which a laser processing system processes a work surface within a working area with the processing pattern by the use of a laser beam comprises the steps of displaying a work surface within a working area in two dimensions in a display screen three dimensional, setting a three-dimensional profile of the work surface and a processing pattern as the laser processing conditions while displaying the work surface in two dimensions in the display screen, and displaying the work surface in three dimensions by either way of switching the work displayed in the display screen from a two dimensional representation to a three dimensional representation and displaying a three dimensional display screen for displaying the work surface in three dimensions in the display screen while displaying the work surface in two dimensions in the display screen.

According to another embodiment, a computer program for setting laser processing data according to a processing pattern based on which a laser processing system processes a work surface within a working area with the processing pattern by the use of a laser beam comprises a function of displaying a work surface within a working area in two dimensions in a display screen, a function of setting a three-dimensional profile of the work surface and a processing pattern as the laser processing conditions while displaying the work surface in two dimensions in the display screen, and a function of displaying the work surface in three dimensions by either way of switching the work displayed in the display screen from a two dimensional representation to a three dimensional representation and displaying a three dimensional display screen for displaying the work surface in three dimensions in the display screen while displaying the work surface in two dimensions in the display screen.

The computer-readable storage medium or a storage device carries a computer program as set forth above stored therein. The computer-readable storage medium includes magnetic disks such as CD-ROM, CD-R, CD-RW, a flexible disk, a magnetic tape, DVD-ROM, DVD-RAM, DVD-R, DVD+R, DVD-RW, DVD+RW, Blue-ray, (trade name), FD and DVD; optical disks, magnetic optical disks, semiconductor memories and other medium capable of storing a computer program. The program includes a program which is downloaded through network communications such as an internet, as well as a program stored on the storage medium. The storage medium includes dedicated or multipurpose equipments in which the computer program is mounted in a viable state in the form of software or firmware. Processing and functions of the computer program may be executed by program software which a computer executes The functions may further be realized by hardware such as a predetermined gate array such as FPGA and ASIC or in the mixed form of program software and a partial hardware module which realizes hardware partially.

According to still another embodiment, a computer program product directly loadable into an internal memory of a digital computer or stored on a computer-usable medium or a computer-readable medium has the computer program as set forth above stored thereon.

According to a further embodiment, a computer program means for setting laser processing data according to a processing pattern based on which a laser processing system processes a work surface within a working area with the processing pattern by the use of a laser beam comprises means for performing a function of displaying a work surface within a working area in two dimensions in a display screen, means for performing a function of setting a three-dimensional profile of the work surface and a processing pattern as the laser processing conditions while displaying the work surface in two dimensions in the display screen, and means for performing a function of displaying the work surface in three dimensions by either way of switching the work displayed in the display screen from a two dimensional representation to a three dimensional representation and displaying a three dimensional display screen for displaying the work surface in three dimensions in the display screen while displaying the work surface in two dimensions in the display screen.

The laser processing data setting system allows users to edit three-dimensional laser processing data in two dimensions. As a consequence, the laser processing data setting system enables even users who are unfamiliar with three-dimensional data editing to achieve complicated of processing data setting with a three dimensional representation. Since the display means can be changed between a two dimensional display mode and a three dimensional display mode, or otherwise, can coincidentally display a two dimensional representation and a three dimensional representation of the processing data as appropriate, it is facilitated to perform confirmatory operation according to data setting operation.

Furthermore, a two dimensional representation of the processing data is displayed in plane, namely an X-Y plane, Y-Z plane and Z-X plane, as viewed from a view point or a laser irradiation source, it can be recognized how a processing pattern deforms or distorts. For example, in the case where a barcode is printed on a cylindrical or columnar work surface, it is easily recognized how narrow spaces distort. A three dimensional representation of the processing data can be quickly changed to a display in a desired plane. This facilitates confirmatory operation of a view point. The exclusive edit mode which excludes users from three dimensional data editing and is enabled by default upon activation of the laser processing data setting system is convenient for users who are unfamiliar with three-dimensional data editing.

Detection of a warning about a defective work surface area of a work and surface facilitates confirmatory operation as to whether a processing pattern falls within a processable work surface area as desired. The confirmatory operation which is made even during processing data setting saves users the trouble of setting processing data and enables users to efficiently achieve processing data setting, so that a user-friendly environment for processing data setting is realized.

BRIEF DESCRIPTION OF THE DRAWINGS

The foregoing and other objects and features of the present invention will be clearly understood from the following detailed description when reading with reference to the accompanying drawings wherein same or similar parts or mechanisms are denoted by the same reference numerals throughout the drawings and in which:

FIG. 14 is a photographic illustration showing a user interface window, namely an edit display window, of a laser processing data setting program which displays an object in a 2D edit mode;

FIG. 15 is a photographic illustration of the edit display window which displays three print blocks;

FIG. 40 is a photographic illustration of the edit display window in a 3D view mode in which a work is displayed as viewed obliquely from above;

FIG. 41 is a photographic illustration of the edit display window in a 3D view mode in which a work is displayed as viewed from rear;

FIG. 92 is a table listing items which are selectively specified in layout adjustment;

FIGS. 96A and 96B are illustrations for demonstrating a tracking function of a Z-axis scanner while laser irradiation is enabled; and FIGS. 97A and 97B are illustrations for demonstrating a tracking function of a Z-axis scanner while laser irradiation is disabled.

DETAILED DESCRIPTION OF THE PREFERRED EMBODIMENTS

Figure 1:
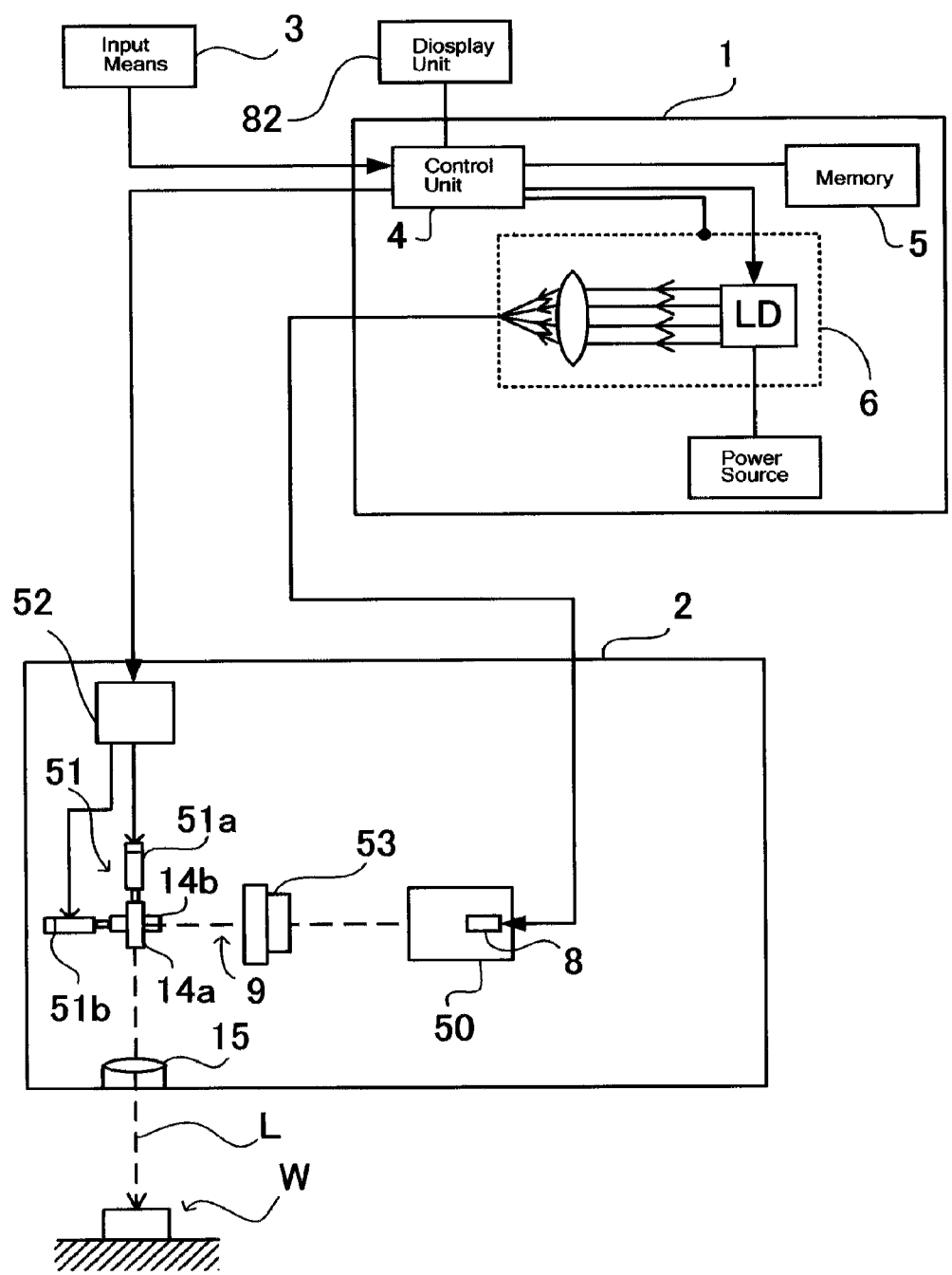
FIG. 1 is a block diagram schematically illustrating a laser processing system according to an embodiment.
Figure 2:
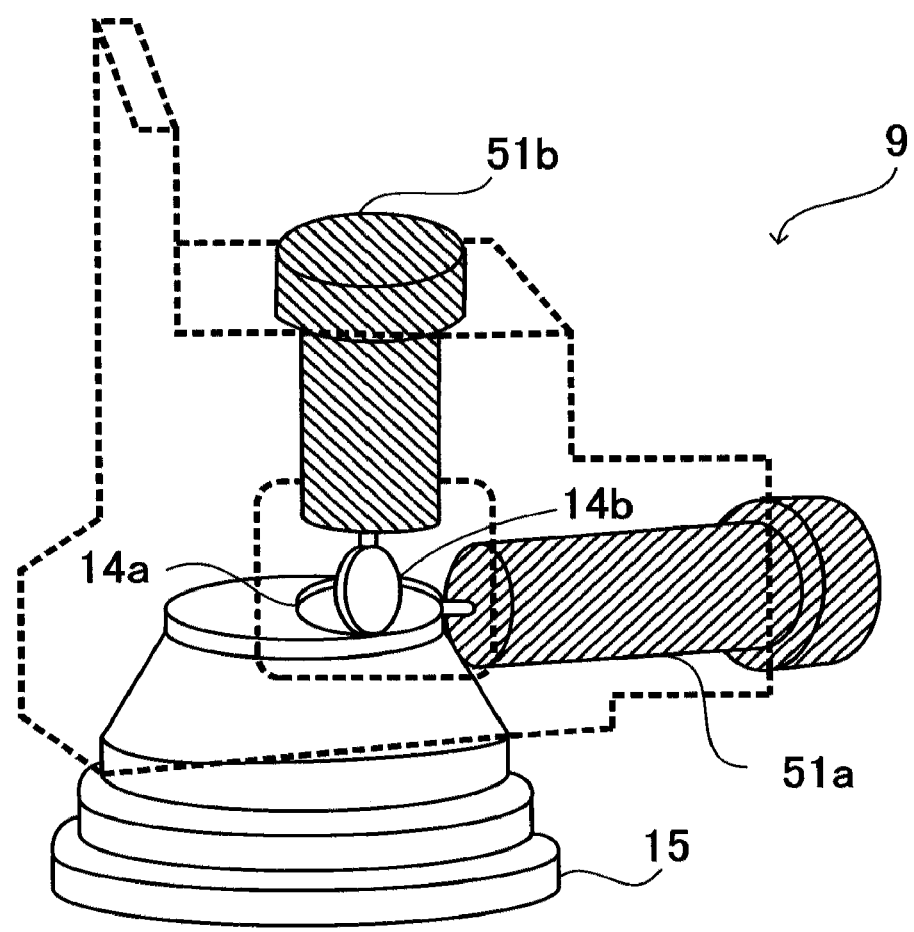
FIG. 2 is a perspective view showing a layout of an X-Y scanner.
Figure 3:
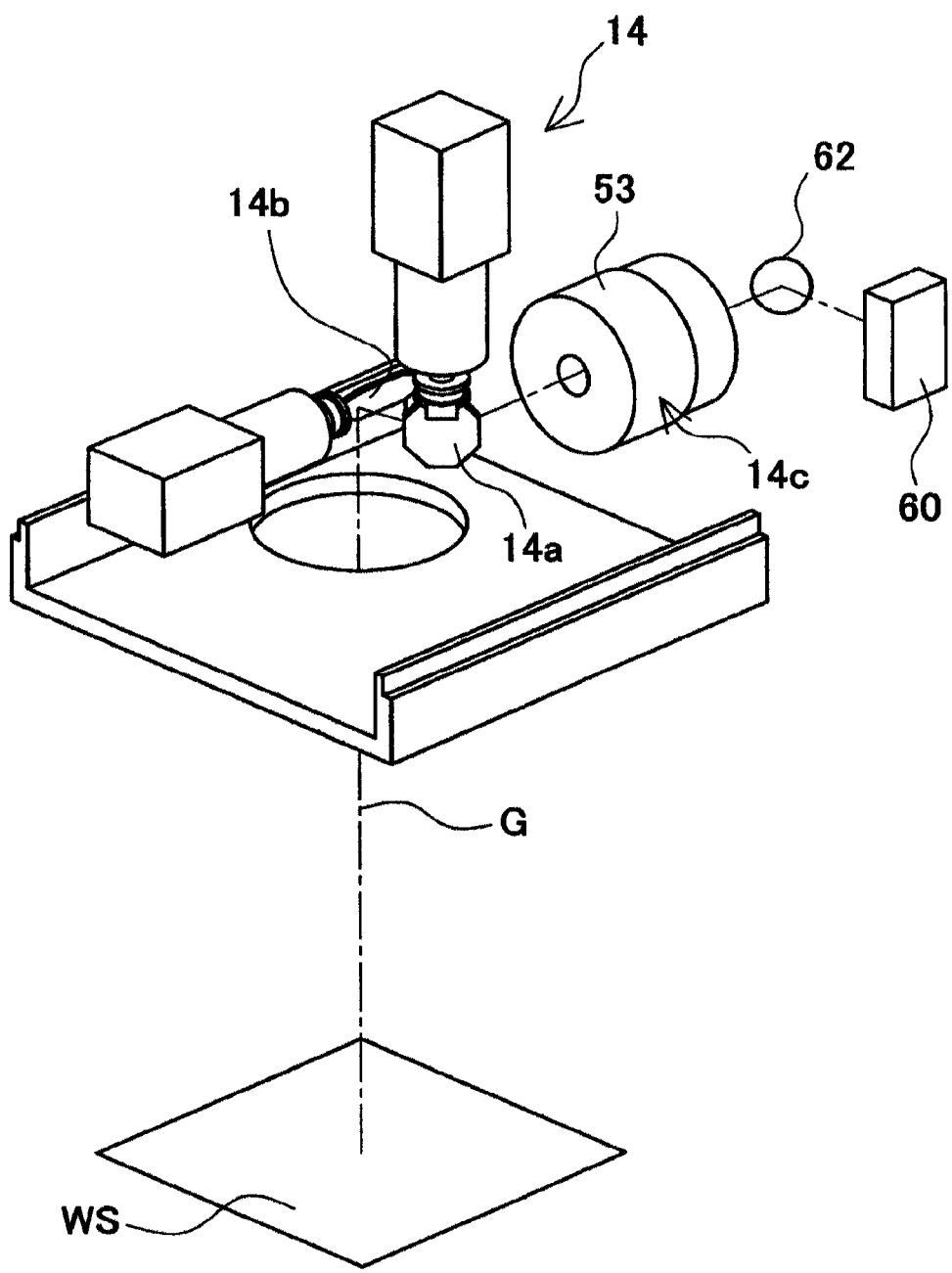
FIG. 3 is a perspective view showing a layout of X-axis, Y-axis and Z-axis scanners.

Hereinafter, embodiments will be concretely described with reference to the accompanying drawings. Although the following description is directed to a method of and a system for setting processing conditions of a laser processing system such as a laser marker which performs processing such as printing or marking including characters, symbols and graphics on work with a laser beam, a computer program for setting processing conditions for a laser processing system, a computer-readable recording medium or device on which laser processing conditions are recorded, nevertheless, the it should be appreciated that the present invention has broader applications and is not limited to this particular embodiments.

Further, in the following description, various changes and modifications may be made in form, size, relative arrangement of constituent components and means of the described system and apparatus unless otherwise specified distinctively. It is intended that all matter contained in the description and as shown in the accompanying drawings shall be interpreted as illustrative and not in a limiting sense unless otherwise specified distinctively. The same or similar components or means of the described system and apparatus in the accompanying drawings are referred by the same names and denoted by the same or similar reference numerals. Some components and means of the described system and apparatus are illustrated with exaggeration for clear understanding in the accompanying drawings. Further, some components and means of the described system and apparatus may be formed in the form of an integral part, or vice versa.

In the following description, "connection" of the laser processing system to a computer, a printer, external memory devices and other peripheral equipments which are used for operating, controlling, inputting and outputting information or data to and displaying information or data on the laser processing apparatus is made by means of electrical communication through wired connection such as serial connection, parallel connection or a network. Examples of the serial connection include IEEE1394, RS-232x, RS-422, RS-423, RS-485, USB, PS2 and the like, examples of the network includes 10BASE-T, 100BASE-TX, 1000BASE-T and the like. The connection is not limited to wired connection and may be of wireless connection, including a wireless LAN such as IEEE802, 1x and OFDM, and radio frequency communication, infrared communication or optical communication such as Bluetooth (trademark). The memory device for storing data of an object and settings of the system or apparatus may be any processor-readable medium, including but not limited to a memory card, a magnetic disk, an optical disk, a magnetic optical disk, a semiconductor memory, etc. and any combination of two or more of the foregoing.

Although a laser marker is exemplified as a typical laser processing system, nevertheless, embodiments of the present invention are suitable for use on all types of laser-assisted processing systems or apparatus including laser oscillators, laser processing devices for boring, marking, trimming, scribing, surface finishing, light source devices such as a light source for read and write of high-density optical disk such as DVD and Blue-ray (trademark), a light source for a laser printer, an illumination lit source, a light source for a display equipment, and various medical equipments. Further, in the following embodiment, the laser marker is described as used for printing. However, the present invention is suitable for use on all types of laser-assisted processing, including fusion or exfoliation of a subject surface, surface oxidization, surface shaving, discoloring and the like.

As utilized hereinafter, the term "printing" shall mean and refer to printing or marking of characters, symbols and graphics, and besides any processing described above.

The term "processing pattern" or "print pattern" as used herein shall mean and refer to various "characters" such as a variety of characters and numerical characters, and "symbols" such as signs, pictograms, icons, logos, barcodes, two-dimensional codes and combinations of two or more of them, and besides line drawings. In particular, the term "character" and "symbol" as used herein shall mean and refer to optically readable characters and symbols. Examples of the two-dimensional code, stack type or matrix type, include a QR code, a micro QR code, a data matrix or data code, a Veri code, an Aztec code, PDF417, a Maxi code, a composite code, an RSS (Reduced Space Symbology) code such as RSS14, RSS Stacked, RSS Limited, RSS Expanded, etc. The composite code, which is a composition of a bar code and a stack type two dimensional code, may be of any type having EAN/UPC (WAN-13, EAN-8, UPC-A, UPC-E), EAN/UPC128 or a RSS family (RSS14, RSS Limited, RSS Expanded) as a base barcode. As additional code may be one of two dimensional symbols, including MicroPDF417 and PDF417. In the following example, a combination of a barcode and a micro QR code which is a two dimensional matrix code is employed.

Referring to the accompanying drawings in detail, and in particular, to FIG. 1 showing a laser processing system 100 in accordance with an embodiment of the present invention, the laser processing system 100 comprises a laser control unit 1, a laser output unit 2 and an input unit 3. The input unit 3 is connected to the laser control unit 1, and information necessary to set job control data of the laser output unit 2 is entered via input unit 3 and sent to the laser control unit 1. The setting information includes operating conditions of the laser output unit 2, marking job information such as a print pattern to be printed on a work surface and the like. The input unit 3 is a console including a keyboard and a mouse. In order to check up on settings, a display unit 82 such as an LCD device or a CRT may be provided to display the setting information entered through the input unit 3 for checking. A touch panel is available for a terminal device serving both as an input device and a display.

The laser control unit 1 comprises at least a controller 4, a memory device 5, a laser excitation unit 6 and a power source 7. The data of settings are inputted via the input unit 3, sent to the controller 4 and are stored in a data storage medium of the memory device 5. The controller 4 reads out data representing the settings from the data storage medium of the memory device 5 as needed to drive the laser excitation unit 6 for excitation of a laser medium 8, such as a laser rod, of the laser output unit 2 according to control signals representing a processing pattern such as a mark or a text to be printed. The data storage medium may be a built-in type memory, preferably a semiconductor memory such as RAM or ROM. The storage medium may be of a removable type such as a semiconductor memory card including a PC card and a SD card or a memory card including a hard disc. When the memory device 5 comprises a memory card which can be easily rewritten by an external equipment such as a computer, data setting is performed without connecting the input unit 3 to the control unit 1 by writing the contents set by a computer in the memory card and placing the memory card in the control unit 1. The laser processing system 100 is quite easily configured with the memory card placed in the memory device 5 without keying in data for desired job control through the input unit 3. Write or rewrite of data in the memory card can be easily carried out by the use of an external equipment such as a computer. Typically, a semiconductor memory is employed because of high data read/write rate, vibration-proof structure and prevention of data disappearance due to a crush.

The controller 4 provides scan signals for driving a scanner 9 of the laser output unit 2 through a laser excitation device 6 so as to scan a work surface with a laser beam L. Specifically, the power source 7, which is a constant voltage power source, supplies a specified constant voltage to the laser excitation device 6. The scan signals for controlling a marking or print job of the laser output unit 2 comprise pulse width modulation (PWM) signals corresponding to pulse widths of the laser beam. In this instance, the intensity of laser beam depends on a duty ratio, or on both a frequency and a scanning rate, according to a frequency of the PMW.

Figure 4:
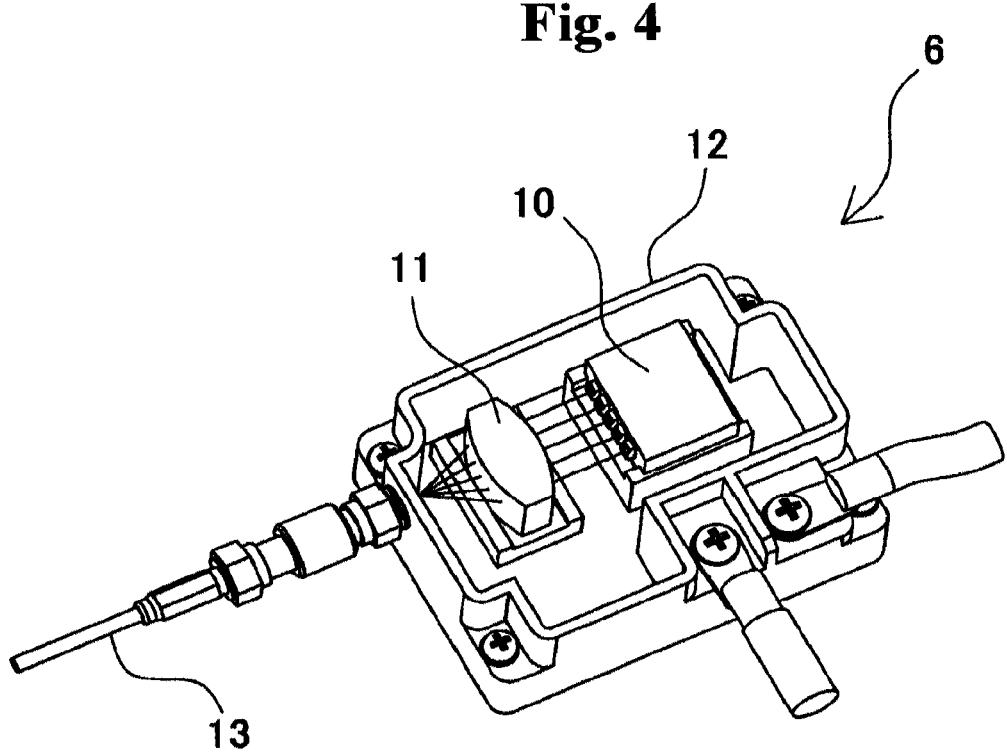
FIG. 4 is a perspective view showing an internal arrangement of a laser excitation unit.

As specifically shown in FIG. 4 by way of example, the laser excitation device 6 comprises a laser excitation light source 10 such as a semiconductor laser or a lamp and a focusing lens system (schematically depicted by a single lens) 11 fixedly installed in a casing 12. This casing 12, which is made of a metal having good thermal condition such as brass, effectively releases heat generated by the laser excitation light source 10. The laser excitation light source 10 comprises a laser diode array made up of a plurality of laser diodes 10a arranged in a straight row. Laser beams L emanating from the respective laser diodes 10a are focused on an incident end of an optical fiber cable 13 by the focusing lens system 11 and exit as an excitation beam from the optical fiber cable 13. The optical fiber cable 13 is optically connected to the laser medium 8 directly or through a coupling fiber and (not shown).

The laser output unit 2 includes a laser oscillator schematically shown by reference numeral 50 for exciting the laser medium 8 and causing it to oscillate to generate a laser beam L in what is called an end-pumping excitation method, a scanner 9 for scanning a work surface area three dimensionally which will be described in detail in connection with FIGS. 5 to 7 later, and a drive circuit 52 for driving the scanner 9. The scanning device 14 comprises X-axis, Y-axis and Z-axis scanners 14a, 14b and 14c which is built in a beam expander 53 and an fθ lens (not shown). The laser oscillator 50 comprises, in addition to the laser medium 8, an output mirror and a total reflection mirror oppositely disposed at a specified distance, an aperture disposed between these mirrors and a Q-switching cell, all of which are arranged in a given path of an induced emission light. The induced emission light from the laser medium 8 is amplified by multiple reflections between the output mirror and the total reflection mirror, switched at a short cycle, selected in mode by the aperture, and then exits as a laser beam L from the laser oscillator 50 through the output mirror. The laser oscillator 50 is known in various forms and may take any form well known in the art. The laser media 8 used in this embodiment is an Nd:YVO$_4$ solid state laser rod which has absorption spectra whose central wavelength is 809 nm. In order to excite the Nd—YVO$_4$ solid state laser rod, the laser diodes 10a are adjusted to emit a laser beam L at a wavelength of 809 nm. Solid state laser mediums available for the laser medium 8 include a rare earth-doped YAG, LiSrF, LiCaF, YLF, NAB, KNP, LNP, NYAB, NPP, GGG and the like. It is practicable to convert a wavelength of the laser beam from the solid state laser medium by the use of a wavelength conversion element in combination with the solid state laser medium. A fiber laser in which a fiber is employed for the laser medium in place of a bulk may be applied too. Further, the laser medium 8 is not bounded by a solid state laser medium and it is practicable to use a gas laser such as a carbon dioxide gas laser. It is also practicable to exclude the laser medium 8 by the use of a wavelength conversion element for converting a wavelength of the laser diode 10a of the laser excitation light source 10. Available examples of the wavelength conversion element include KTP(KTiP O$_4$); organic non-linear optical media and inorganic non-linear optical media such as KN(KNbO$_3$), KAP(KASpO$_4$), BBO and LBO; and bulk type polarizing-inverting elements such as LiNbO$_3$, PPLN (Periodically Polled Lithium Niobate), LiTaO$_3$ and the like. Further, it is allowed to use a laser excitation semiconductor laser of an up-conversion type using a fluoride fiber doped with a rare earth such as Ho, Er, Tm, Sm, Nd and the like.

Figure 5:
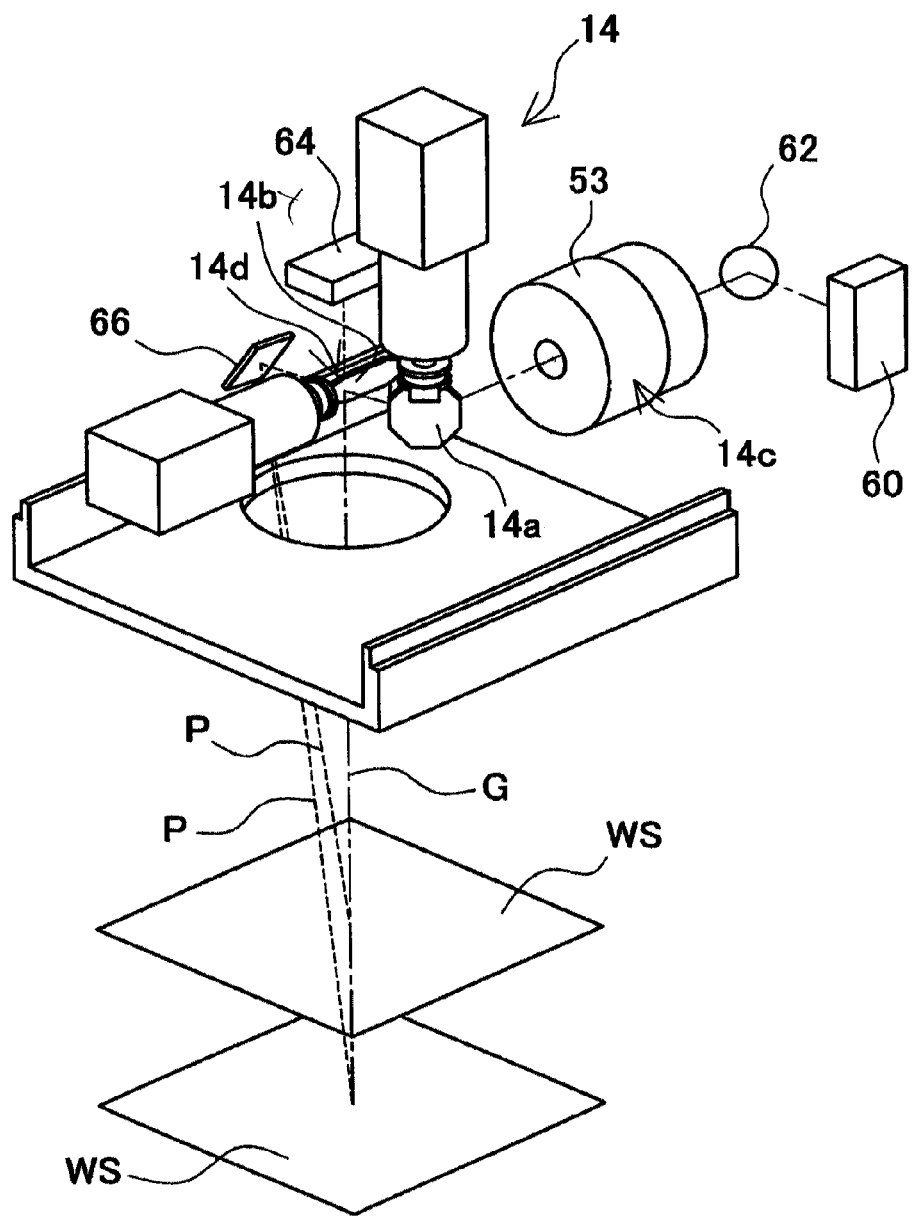
FIG. 5 is a perspective view of a marking head including the laser beam scanner of a laser marking system according to an embodiment of the present invention.
Figure 6:
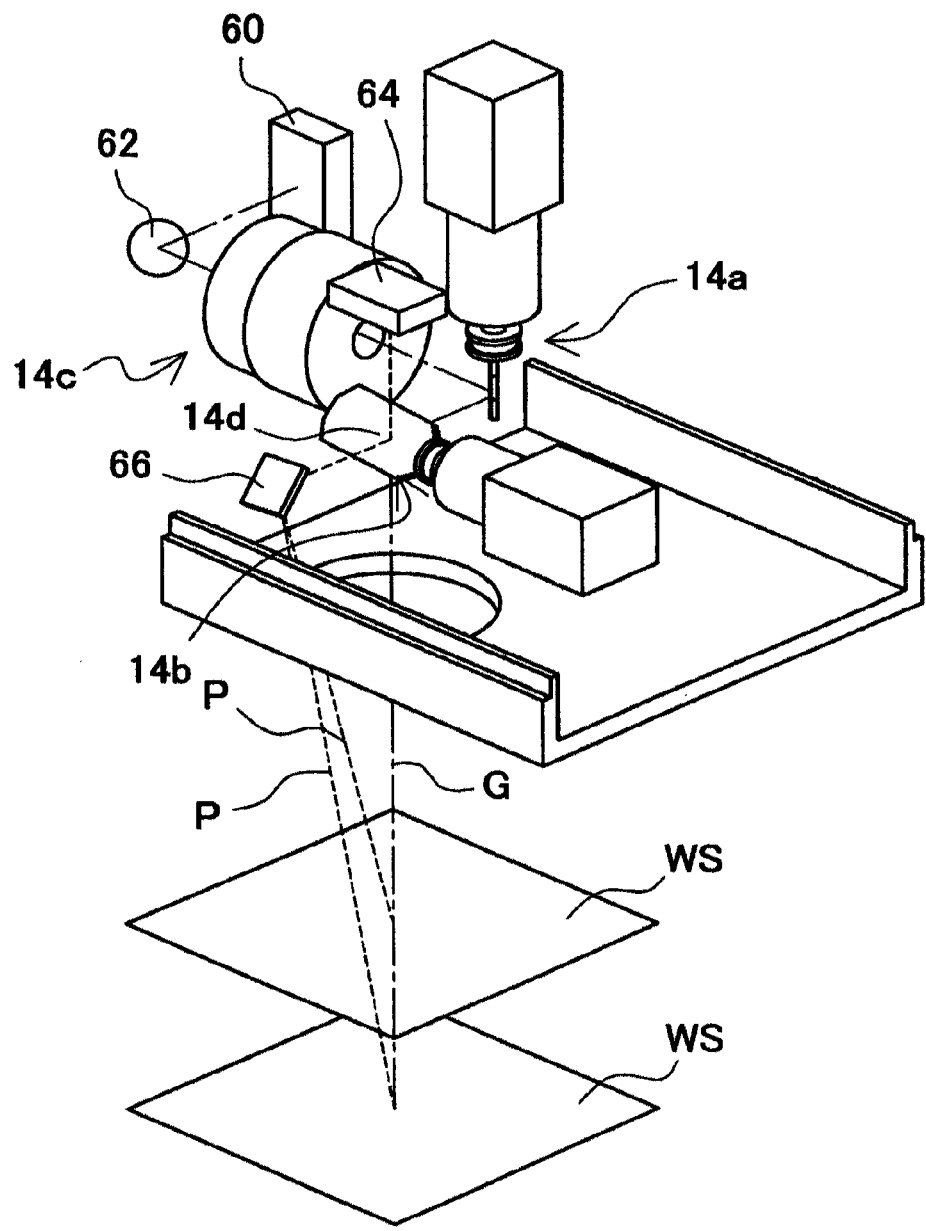
FIG. 6 is a perspective rear view of the marking head.
Figure 7:
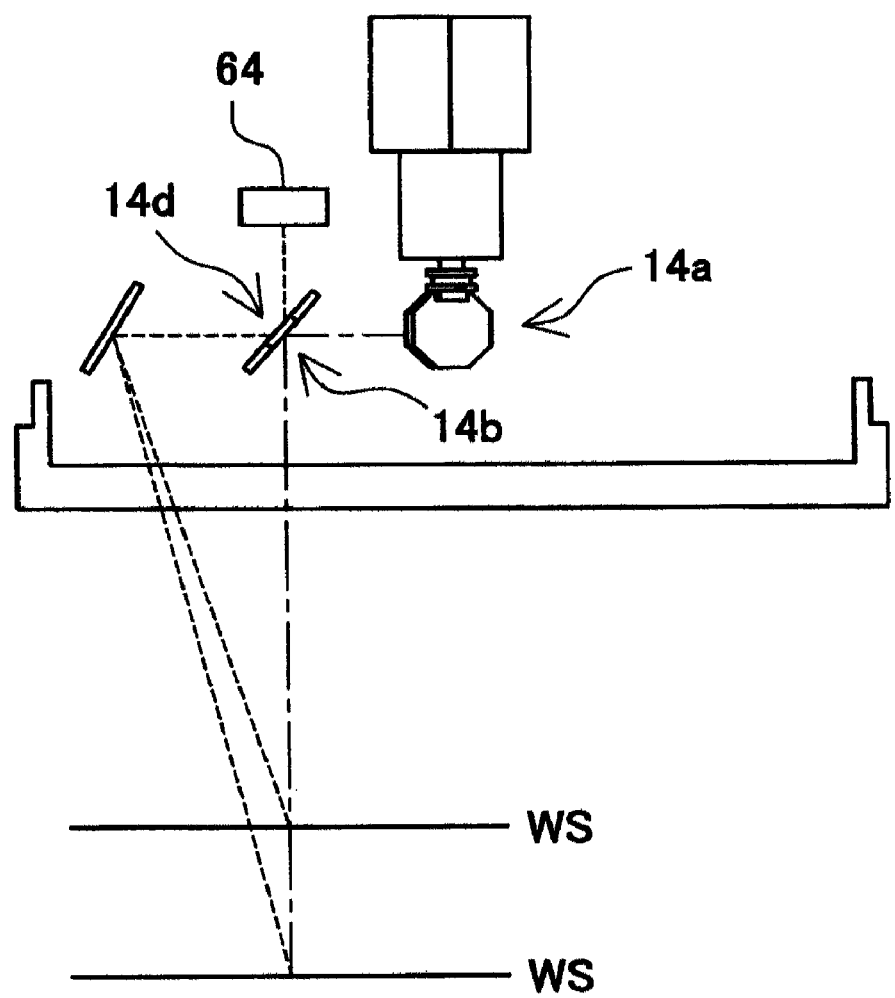
FIG. 7 is a side view of the marking head.

Referring to FIGS. 5 to 7, the scanning 14 comprises an X-axis scanner 14a, a Y-axis scanner 14b and a Z-axis scanner 14c built in a beam expander 53. The beam expander 53 has an optical axis coaxial with the laser beam L emanating from the laser medium 8. The X-axis scanner 14c and the Y-axis scanner 14b have scanning directions perpendicular to each other. The Z-axis scanner 14c has a scanning direction perpendicular to both scanning directions of the X-axis scanner 14c and the Y-axis scanner 14b. The X-axis scanner 14c and the Y-axis scanner 14b scan a working area WS in two dimensions with the laser beam L emanating from the laser medium 8. The Z-axis scanner 14c scans the work surface area WS in an axial direction with the laser beam L by varying a working distance or focal distance of the laser beam L through the beam expander 53. In this instance, it goes without saying that the X-axis, the Y-axis and the Z-axis scanner can function in the same manner if replaced one another. In FIGS. 5 through 7, an fθ lens, which is a focusing lens system, is not shown.

Figure 8A:
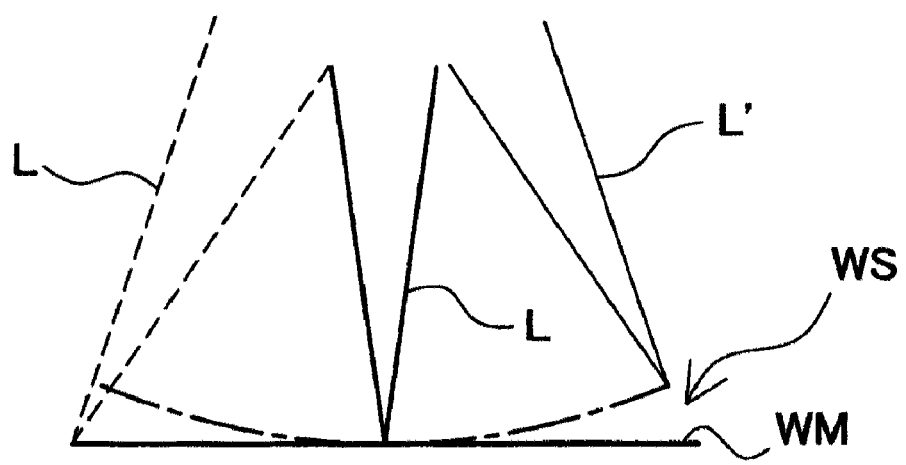
FIG. 8A is an illustration showing a scan line of a laser beam with respect to a work surface.
Figure 8B:
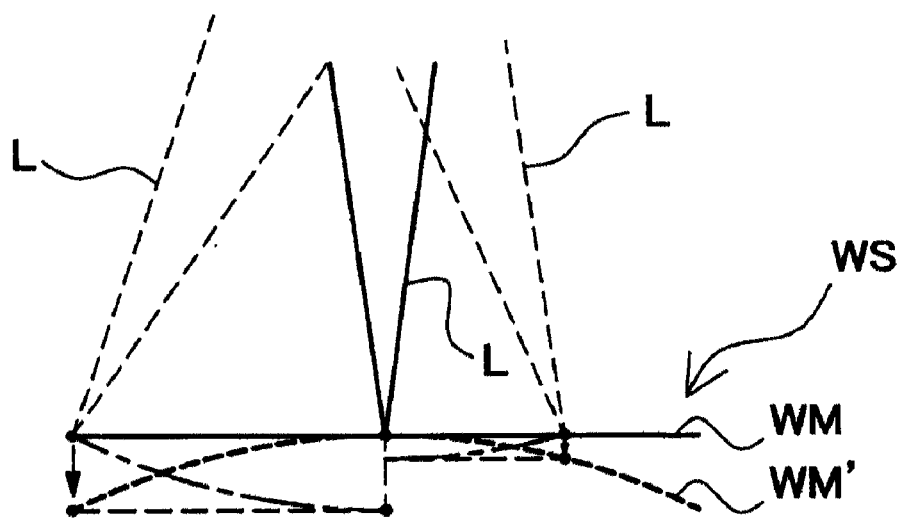
FIG. 8B is an illustration showing a corrected scan line of a laser beam with respect to a work surface.

Because the laser processing system focuses a laser beam L on a working plane by the use of the second mirror, i.e. the Y-axis scanner, it is usual to dispose an fθ lens between the second mirror and the working plane so as thereby to make Z-directional correction. Specifically, the fθ lens focuses the laser beam L always onto a plane work surface. As shown in FIG. 8A, in the case where the laser beam L is adjusted to focus on a plane surface in plane with the work surface WM, as an incident angle of the laser beam L incident upon the work surface WM becomes smaller, a focused spot of the laser beam L becomes remote from the work surface WM as shown by a sign L', resulting in a decrease processing accuracy. For the grounds, the fθ lens is used to increasingly vary an offset of the focused spot of the laser beam L from the work surface (i.e. a distance of the focused spot of the laser beam L from the work surface) according to the incident angle upon the work surface WM as shown in FIG. 8B. In other words, the laser beam L is adjusted to focus on a convex surface WM' by the fθ lens so as thereby to keep the focused spot of the laser beam L on the work surface WM.

In the case where a laser marker is required to focus a laser beam L with a spot of a diameter less than 50 μm, it is preferred to use such an fθ lens. On the other hand, in the case where a laser marker is required to focus a laser beam L with a spot of a diameter greater than 50 μm, which is ordinarily about 100 μm, a correction in the Z-direction is performed by the expander in place of an fθ lens. In this way, the fθ lens can be omitted. On the other hand, a spot of a diameter less than 50 μm, the Z-axis scanner is not always sufficiently effective to adjust a focal point, the use of an fθ lens is essential.

The scanning device 14 of this embodiment has three operative modes, namely a small spot scan mode in which the fθ lens is used, a standard spot scan mode in which the Z-axis scanner is used in place of the fθ lens and a wide spot scan mode in which Z-axis scanner is used in place the fθ lens. In the standard and wide spot scan modes, the expander of the Z-axis scanner 14c correctively varies a foal distance so as to keep a focused spot on the work surface. That is, the offset of focused spot, which is a Z coordinate, depends unconditionally on X and Y coordinates. Therefore, the laser spot is always focused on a work surface by moving the Z-axis scanner so as to adjust a focused spot to a Z coordinate correlated with X-axis and Y-axis coordinates. The correlation data is stored in the memory 5A (see FIG. 13A), or otherwise, may be stored in and transferred from the memory device 5 of the laser control unit 1 of the laser processing system 100. In this way, since the focused spot of the laser beam L moves in the Z-axis direction according to movements in the X-axis and the Y-axis direction, it is enabled to expose a work surface to a focused spot of the laser beam L uniformly in the working zone WS.

Each of the scanners 14*a*, 14*b* and 14*c* is made up of a galvanometer mirror comprising a total reflection mirror and a motor for rotating a reflective surface about an axis of a rotary shaft of the motor. The scanners 14*a*, 4*b*, 14*c* are provided with a rotational position sensor for detecting a rotational position of a rotary shaft of the motor and providing a signal representing a rotational position of the rotary shaft. The scanner drive circuit 52 (see FIG. 1) drives the X-axis, Y-axis and Z-axis scanners 14*a*, 14*b* and 14*c* according to control signals provided by the controller 4 of the laser control unit 1. For example, the scanner drive circuit 52 controls drive currents to the respective scanners 14*a*, 14*b* and 14*c* according to control signals provided by the controller 4 of the laser control unit 1. Further, the scanner drive circuit 52 has a function of adjusting a time rate of rotational angle of the scanner with respect to the control signal. This adjustment function can be embodied by a semiconductor element such as a variable resistor operative to change parameters for the scanner drive circuit 52.

Figure 9:
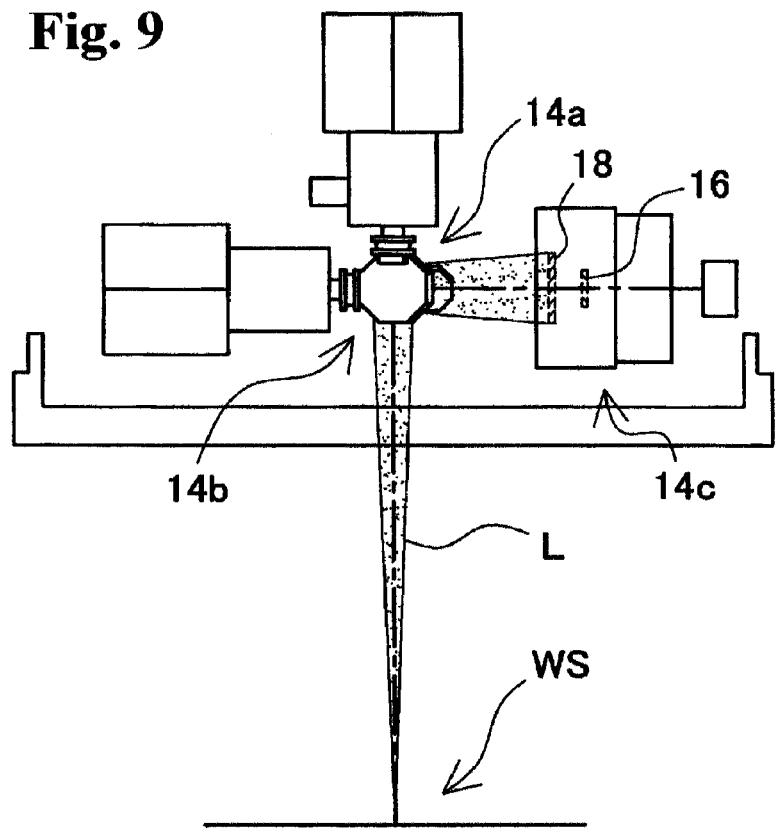
FIG. 9 is a side view of the laser beam scanner with a laser beam adjusted at a long focal distance.
Figure 10:
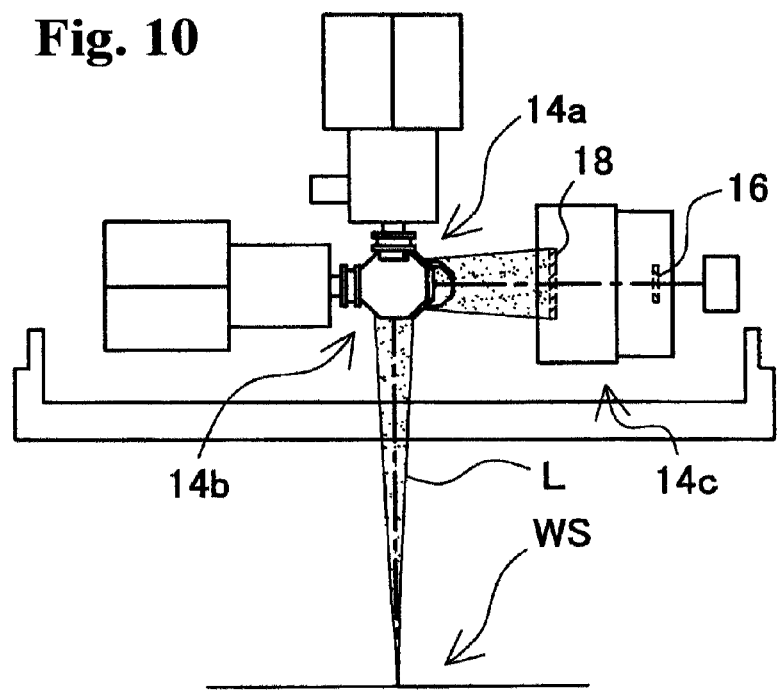
FIG. 10 is a side view of the laser beam scanner with a laser beam adjusted at a short focal distance.
Figure 11A:
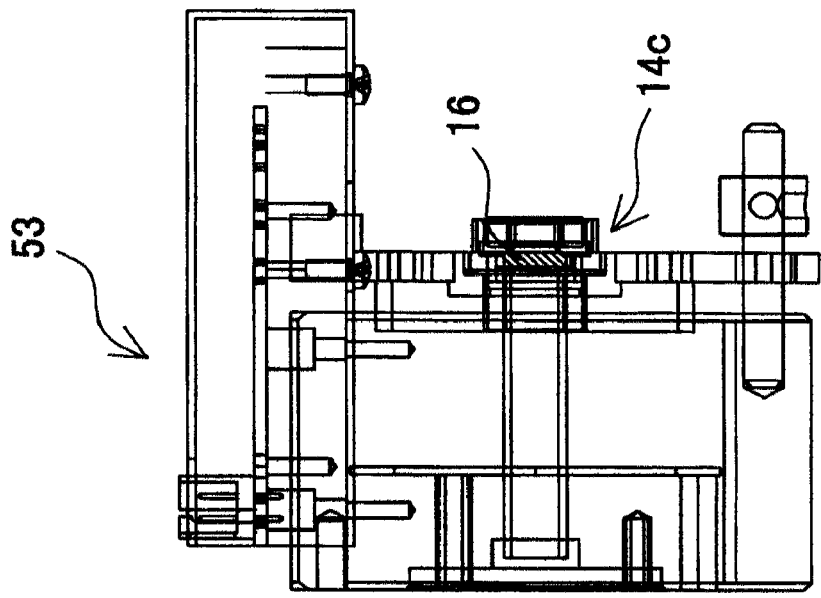
FIGS. 11A and 11B are front and side views of the Z-axis scanner, respectively.
Figure 11B:
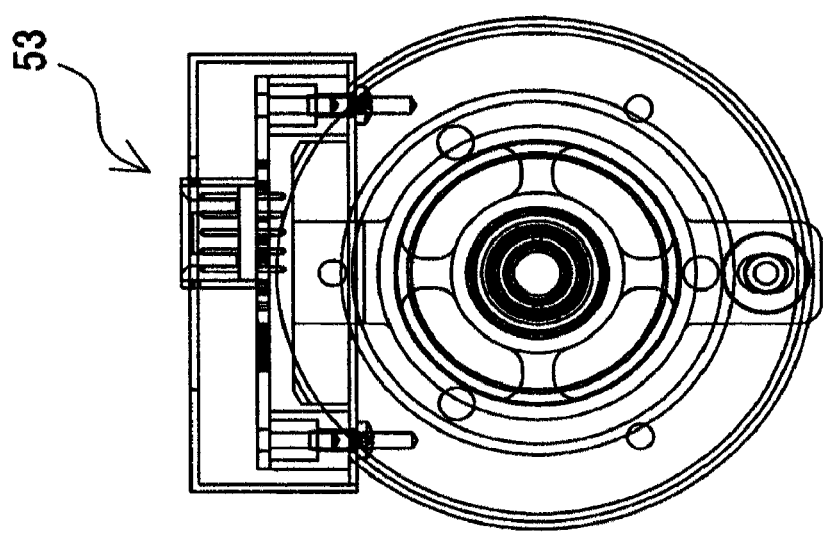

Referring to FIGS. 9 to 11, the Z-axis scanner 14*c* is accompanied by the beam expander 53 which varies a focal length so as to adjust a spot size of the laser beam L on a given work surface area as small as possible. The expander 53, which comprises two lenses or lens groups at incident and exit sides, respectively, varies its focal length by changing a relative axial distance between the two lenses. In other words, the beam expander 53 varies a focal distance (which is hereinafter referred to as a working distance in some cases) at which a minimum size of the beam spot of laser beam L is formed on a given work surface. In order to effectively vary the focal distance, the beam expander 53 is disposed before the galvanometer mirror of the Z-axis scanner 14*c* as shown in FIG. 5. In order to provide a more specific explanation, reference is made to FIGS. 9 to 11. As shown, the Z-axis scanner 14*c* includes a variable-focal length lens system comprising a movable lens or lens group 16 at an incident side and a stationary lens or lens group 18 at an exit side. The movable lens 16 is axially moved back and forth by a driving mechanism including a galvanometer (not shown). The drive mechanism includes a movable element for holding the lens 16 and a coil and magnet assembly for causing axial movement of the movable element. As shown in FIG. 9, when bringing the lenses 16 and 18 close to each other, the variable-focal length lens system changes its focal length to longer, so as hereby to make a working distance longer. On the other hand, as shown in FIG. 10, when bringing the lenses 16 and 18 far away from each other, the variable-focal length lens system changes its focal length to shorter, so as hereby to make a working distance shorter. In this instance, the stationary lens and the movable lens may be replaced with each other or may be both movable. The three-dimensional laser processing system, which is capable of processing in a direction of work height, besides in length and breadth, may employ a manner of moving a focusing lens or a manner of moving a laser output unit or a laser processing head itself, instead of the Z-axis scanner adjustment. Although the lenses 16 and 18 are movable relatively to each other to vary its focal length, either one of the two lenses 16 and 18 may be fixedly disposed in the path of the laser beam L.

The laser scanner 14 shown in FIGS. 5 and 6 is provided with a distance pointer. As shown in FIGS. 5 and 6, the laser scanner 14 is provided with a distance pointer which comprises optical axis alignment means comprising a light source 60 for producing a guide beam G and an adjustable beam guide element 62 in the form of a reflective mirror and distance pointing means comprising a light source 64 for producing a pointing beam P and a pointer scanner 4*d* in the form of a reflective mirror formed on the back of the Y-axis scanner 14*b* and a stationary mirror 66 for reflecting the pointing beam P toward a scanning area. The beam guide element 62 is adjusted so as to bring the guide beam G into alignment with an optical axis of the laser scanner 14. The distance pointer projects a spot of the pointing beam P on a line along the guide beam G for indicating a focal point at which a scan laser beam should focus.

Although, in the above embodiment, the laser scanner 14 is enabled to perform three-dimensional processing by the use of a focal length or distance adjusting mechanism, it may be permitted to move a work table up and down so as to put a work surface on the work table in a focal plane in which the laser beam is focused. Similarly, the laser scanner may be replaced with a mechanism for moving the work table in X-direction and/or Y-direction. This alteration is suitable for laser processing devices for use with a work table in place of a belt conveyer system.

Figure 12:
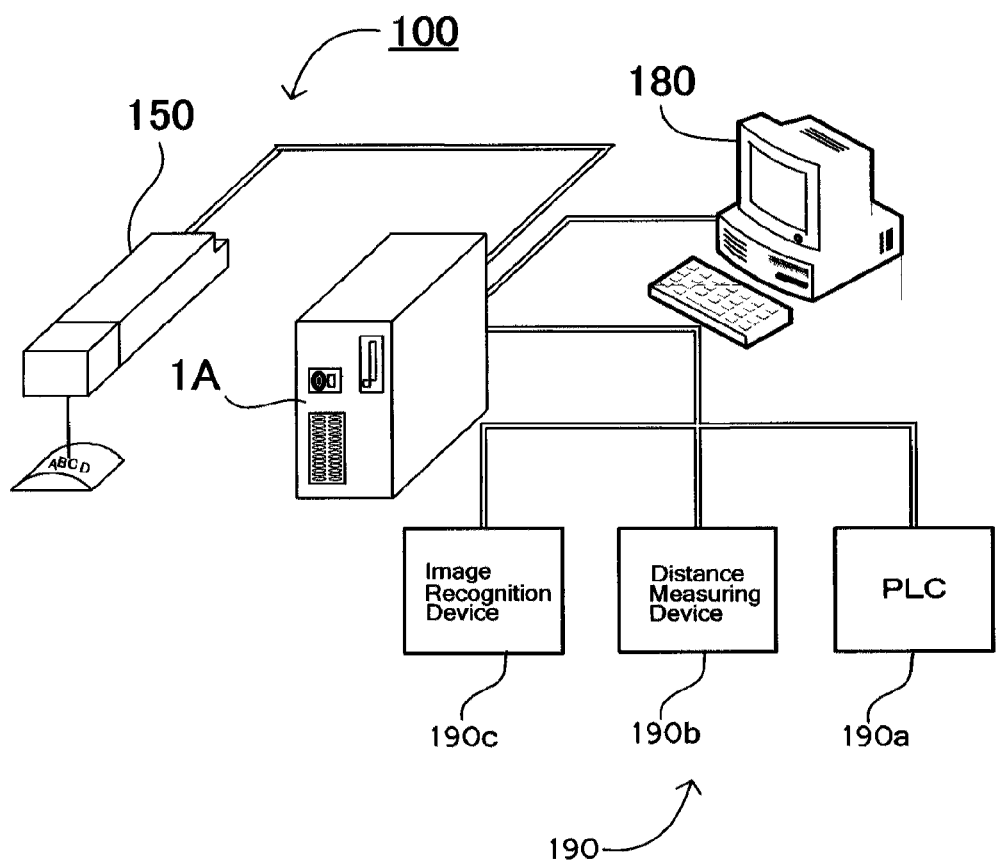
FIG. 12 is a schematic block diagram illustrating a laser marker system capable of printing in three dimensions.

FIG. 12 shows a three-dimensional laser marking system as a laser processing apparatus according to an embodiment. The laser marking system comprises at last a laser marking head 150 as a laser output unit, a control unit 1A connected to and controlling the laser marking head 150, and a laser processing data setting system 180 connected to the control unit 1A for data communication with the control unit 1A through which three-dimensional laser processing data representing a print pattern is set to the laser control system 180. In this embodiment, the laser processing data setting system 180 comprises a computer on which a three-dimensional laser processing data setting program is installed. The laser processing data setting system 180 may be comprised by a programmable logic controller (PLC) equipped with a touch panel or other specialized hardware, as well as computer. The laser processing data setting system 180 may be used as an integrated controller for performing the function of laser processing data setting and the function of operation control of a laser processing device such as the laser marking head. Furthermore, the laser processing data setting system 180 may be provided separately from the laser processing device or may be integrated as a single means with the laser processing device. For example, the laser processing data setting system 180 may be provided in the form of a laser processing data setting circuit incorporated into the laser processing device.

The control unit 1A is further connected to external equipments such as a programmable logic controller (PLC) 190*a*, a distance measuring device 190*b* and an image recognition device 190*c*, as well as a photo diode (PD) sensor and other sensors (not shown). The programmable logic controller (PLC) 190*a* controls the system according to a given sequence logic. The image recognition device 190*c*, which may comprise an image sensor, detects attributes such as type, position and the like of a work conveyed in a processing line. The distance measuring device 190*b*, which may be a displacement pickup 190*b*, acquires information about a distance between a work and the marking head 150. This external equipment is connected to the control unit 1A for data communication.

Figure 13A:
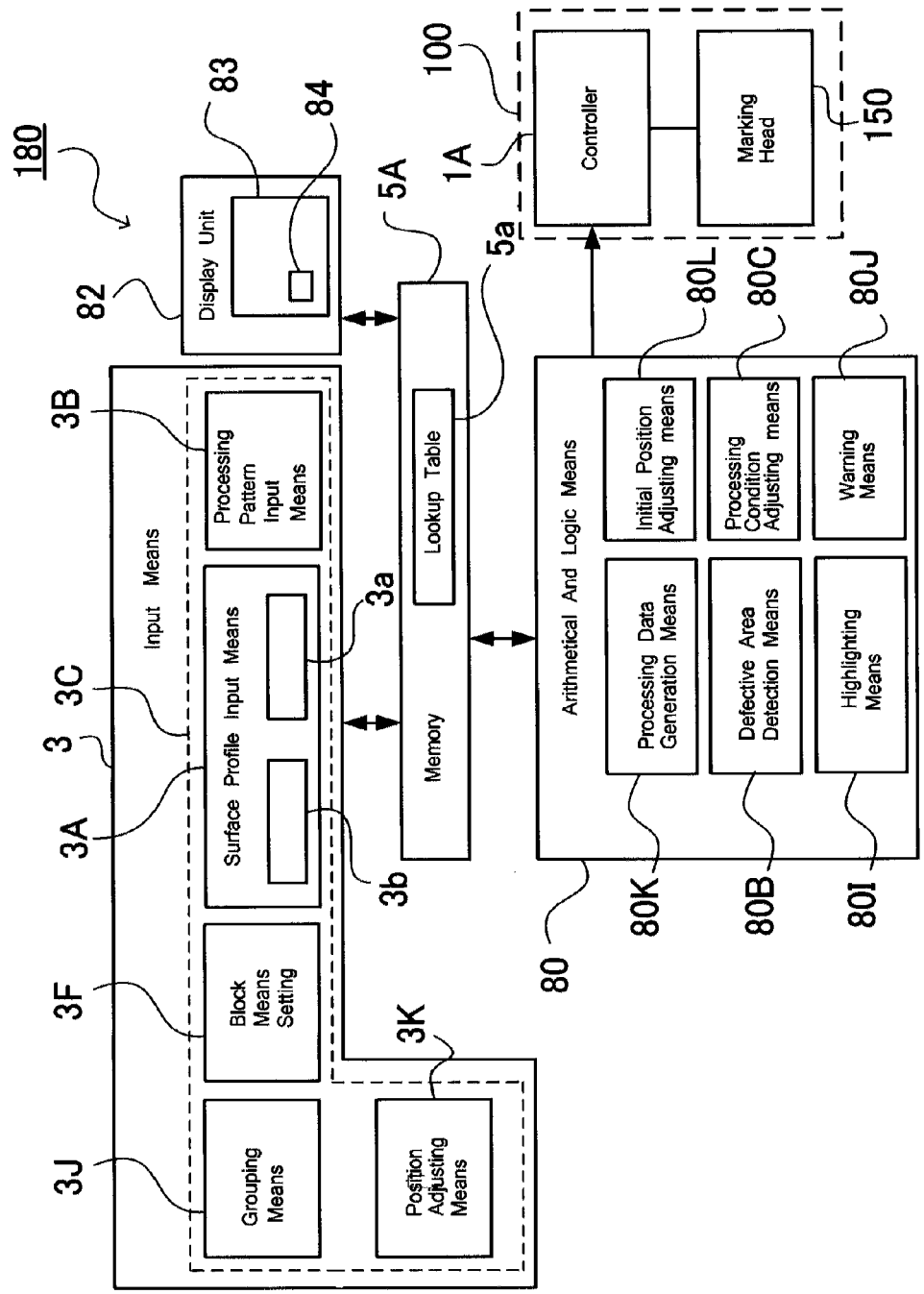
FIG. 13A is a schematic block diagram illustrating a system architecture of a laser processing data setting system.

Referring to FIG. 13A illustrating the architecture of the marking data setting system 180 for setting laser marking or printing data to perform printing of a planar print pattern in three dimensions as an example of the laser processing apparatus, the laser processing data setting system 180 comprises an input unit 3 through which information about an intended three-dimensional printing job is entered, an arithmetical and logic unit 80 for generating laser processing or printing data based the information entered through the input unit 3, a display unit 82 for displaying a representation of the generated laser printing data, and a memory device 5A for storing the laser printing data. The memory device 5A has a reference table 5a maintaining a plurality of combinations of processing parameters which are correlated with one another. The display unit 82 includes an object display section 83 for displaying a work surface of an object in three dimensions and a head display section 84 for displaying a laser marking head when displaying a work surface of an object on the object display section 83. The input unit 3 includes a processing condition setting means 3C for inputting printing conditions necessary to perform given printing in a desired pattern. Specifically, the processing condition setting means 3C performs the function of inputting information about a profile of three-dimensional work surface via work surface profile input means 3A, the function of inputting information about a process pattern such as a print pattern via processing pattern input means 3B, the function of creating a process block of a plurality of process patterns for block processing via process block generating means 3F, the function of grouping of the blocks established by the process block generating means 3F via process block grouping means 3J, and the function of adjusting a position of a processing pattern on a work surface via position adjusting means 3K. Furthermore, the work surface profile input means 3A performs the functions of selectively specifying elemental profiles via elemental profile specifying means 3a and the function of importing information about three dimensional data representing a profile of a work surface from an external equipment via 3D data input means 3b. The memory section 5A, which corresponds to the memory device 5 shown in FIG. 1 and stores data representing the information about a profile of three-dimensional work surface, a given process or print pattern, processing patterns and the like inputted through the input unit 3, may comprise a semiconductor memory, as well as a storage medium such as a fixed storage device. The display unit 82 may be exclusively provided for the three-dimensional laser processing system or may be a monitor of a computer connected to the three-dimensional laser processing system.

The arithmetical and logic unit 80, which comprises a large-scale integrated circuit or an integrated circuit for data processing, has a processing data generation means 80K for generating actual processing data, an initial position setting means 80L for determining an initial end position on a work surface to which a representation of three dimensional processing data is justified on the display unit 82, a defective surface area detection means 80B for detecting a defective work surface area which is only defectively processable or unprocessable by performing calculations, a highlighting means 80I for displaying a work surface with a defective work surface areas highlighted differently from a processable work surface area, and a warning means 80J for providing a warning that a processing pattern is seized with a defective work surface area even pertly when setting the processing pattern through the processing condition setting means 3C. If necessary, the arithmetical and logic unit 80 may have a processing condition adjusting means 80C for adjusting processing conditions so as to enable laser processing to be applied to the defective work surface area and coordinate conversion means for converting information about a plane processing pattern into special three-dimensional special coordinate data so as to make the processing pattern virtually fit a three-dimensional work surface.

Figure 13B:
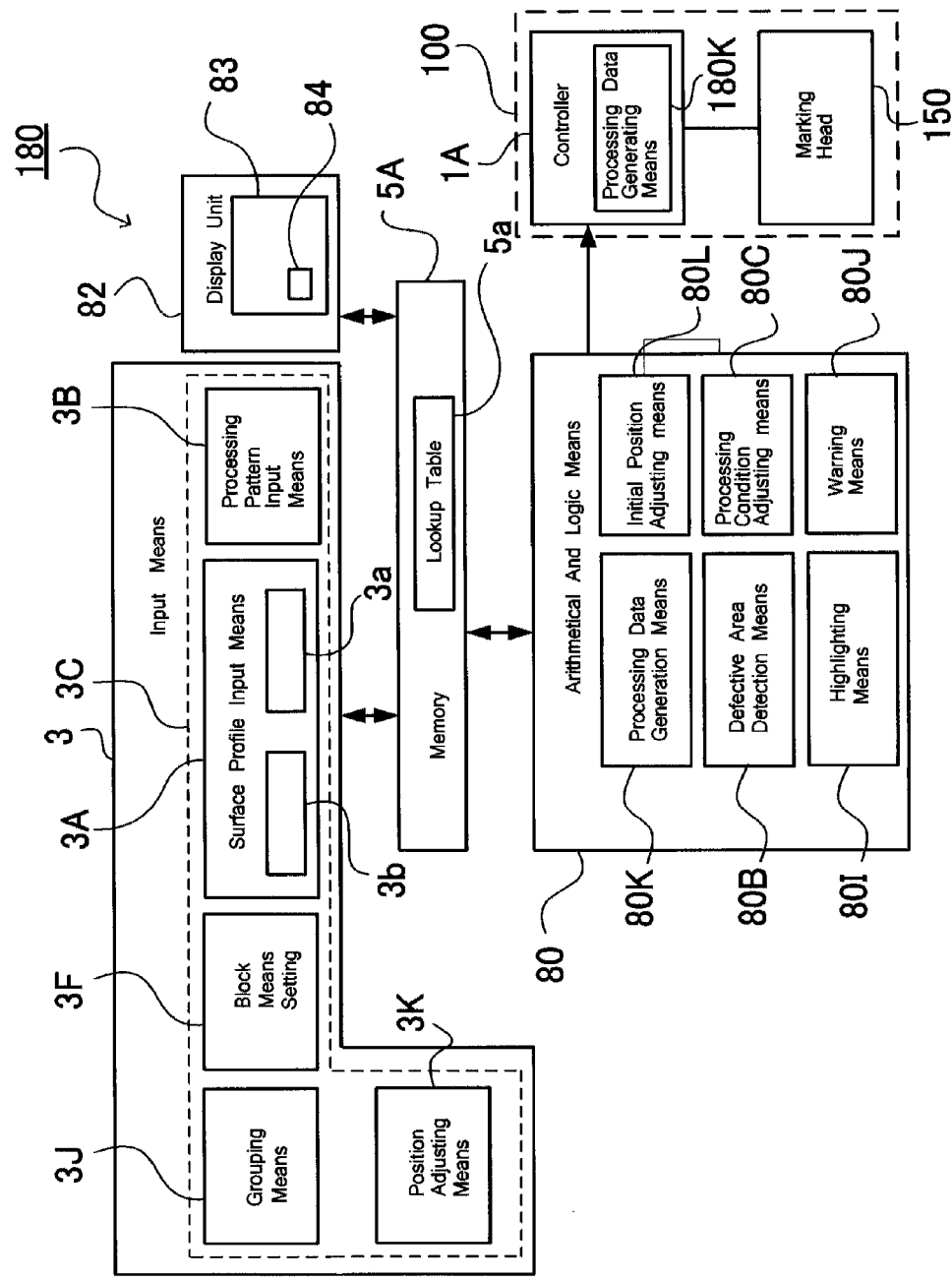
FIG. 13B is a schematic block diagram illustrating a variation of the system architecture shown in FIG. 13A.
Figure 13C:
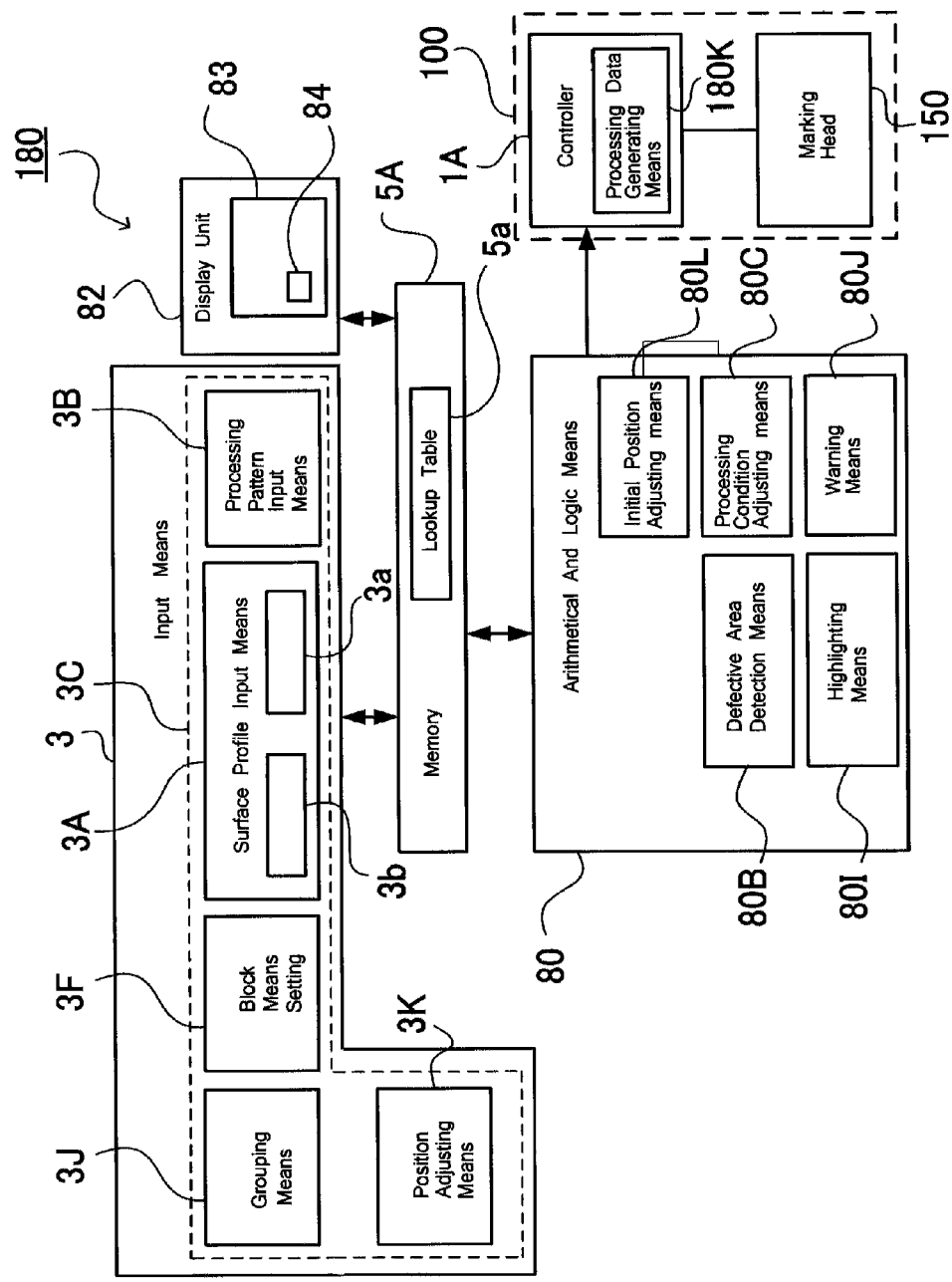
FIG. 13C is a schematic block diagram illustrating another variation of the system architecture shown in FIG. 13A.

Although, in FIG. 13A, the laser processing data setting system 180 is made up by dedicated hardware, however, laser processing data setting may be performed by the use of software. In particular, as shown in FIG. 12, a general purpose computer with a laser processing data setting program installed therein may be used. Furthermore, although the laser processing data setting system 180 and the laser processing apparatus 100 are separately provided, they may be integrated as one unit. The processing data generation means 80K is incorporated in the laser processing data setting system 180. That is, the function of the processing data generation means 80K is realized by a general-purpose computer with the laser processing data setting program installed therein which is used as the laser processing data setting system 180. However, as shown in FIG. 13B, processing data generation means 180K may be incorporated in the control unit 1A of the laser processing system 100 in addition to the processing data generation means 80K of the laser processing data setting system 180. This functional feature allows both of the laser processing data setting system 180 and the laser processing system 100 to individually generate laser processing data and to transfer, edit and display the laser processing data, respectively. In the embodiment shown in FIG. 13B, the processing data generation means 180K of the laser processing system 100 generates laser processing data and transfer it to the processing data generating means 80K of the laser processing data setting system 180 and the display unit 82. Furthermore, as shown in FIG. 13C, it is, of course, practicable to provide only the processing data generation means 180K incorporated in the control unit 1A of the laser processing system 100.

The following description is directed to a sequence of generating a print pattern from character information inputted through the processing condition setting means 3C by means of execution of a laser processing data setting program. In making explanation to the sequence, reference is made to FIGS. 14 and 15 illustrating a user interface window by way of example. In the individual user interface windows, a layout of dialog boxes, buttons, tab keys and the like of the user interface window may be appropriately changed in location, shape, size, color, pattern and/or the like. The layout of elements of the window may be changed so as to be suitable for clear view, easy assessment and easy judgment. For example, it is not prevented to use a separate window for details setting and/or to open a plurality of windows or dialog boxes incidentally. Operation of buttons and dialog boxes, selection of commands and numerals in boxes are made through the input unit 3 connected to a computer in which the laser processing data setting program is installed. In the following description, the term "press a button" includes pressing a button on physically direct contact with it, or clicking a button through the input unit. The input/output device forming the input unit 3 may be unified with the computer, as well as connected to the computer through wireless communication or cable communication. The input/output device may be any commercially available pointing device, including a mouse, a keyboard, a slide pad, a track point, a tablet, a joystick, a console, a jog dial, a digitizer, a light pen, a ten-key keyboard, a touch pad, etc. and may be used not only for management of the program, but also for operation of the hardware of the laser processing apparatus. Furthermore, it can be made to display a user interface window on a touch screen or a touch panel used as a screen of the display unit 82 so as to enable users to touch the window physically with a finger for buttons operation. It can also be made to use a voice input device or other existing devices, individually or in combination.

The laser processing data setting program is designed to edit three-dimensional laser processing data. However, in consideration of users who are unfamiliar with three-dimensional data editing, the laser processing data setting program may be designed to run in two edit modes, namely a two-dimensional edit mode (2D edit mode) and a three-dimensional edit mode (3D edit mode). The 2D edit mode, which is a fool-proof default mode on startup of the laser processing data setting program, prevents users not good at 3D data editing from being confused. In this case, as shown for example in FIGS. 14 and 15, a current mode indicator 2D or 3D appear alternately in a current mode indication box 270 by pressing an edit mode switch button 272. It is practicable to configure the laser processing data setting program so that a default edit mode is selectively switched between 2D and 3D edit modes. This configuration makes it easy for advanced users to select the 3D edit mode automatically on startup of the laser processing data setting program. On the other hand, the edit mode switch button 272 is marked with 3D meaning that a current window is changeable to the 3D edit mode when the current window is in the 2D edit mode or 2D meaning that a current window is changeable to the 2D edit mode when the current window is in the 3D edit mode. According to the 2D edit mode which limits or excludes 3D display and 3D editing of an object, the edit and display window allows users to set and edit two-dimensional processing data only, so that the edit and display window is simplified and provides improved operationality. The 2D edit mode allows users to carry out preliminary editing of two-dimensional processing data on the edit display window in the 3D edit mode, not directly on the 3D edit display mode which regular users are unaccustomed to, and subsequently to reedit the two-dimensional processing data on the edit display window in the 3D edit mode so as thereby to achieve three-dimensional processing data. In this way, the edit display window facilities operation and provides improved operationality.

The edit display windows in the 2D edit mode and the 3D edit mode window shown in FIGS. 14 and 15, respectively, have almost similar appearances. When the 2D edit mode window appears, a 3D Setting tab 204i for setting a three-dimensional profile grays out and is disabled. The 3D Setting tab 204i is enabled upon a switch from the 2D edit mode window (FIG. 14) to the 3D edit mode window (FIG. 15). In this way, the user interface window is switched smoothly from the 2D edit mode to the 3D edit mode, and vice versa, by putting restrictions on settable items but without accompanying significant alterations in appearance.

As just described above, since the user interface window is almost the same in the 2D edit mode and the 3D edit mode, three-dimensional laser processing data can be set up and edited in the same knack as the two-dimensional laser processing data. In three-dimensional laser processing data setting, a character size and a profile of a print pattern are specified in the 3D mode user interface window the same as the 2D mode user interface window. Subsequently, information about three-dimensional profile is combined with the settings of the two-dimensional profile in order to provide three-dimensional laser processing data. In this instance, the user can set actual print data while seeing a full-frontal two-dimensional representation of the laser processing data as viewed on a side of the laser processing head and a three-dimensional representation of the processing data as viewed in any specific direction which are alternately hanged. The user interface windows enables users experienced only in two-dimensional laser processing data setting and editing to set up and edit three-dimensional laser processing data in a simple way.

Explaining elements forming the processing condition setting means 3C of the user interface window with reference to FIGS. 14 and 15, the user interface window includes an edit display window 202 at the left-hand side thereof and a Print Pattern input dialog box 204 at the right-hand side thereof. The edit display window 202 displays editing print pattern data. The Print Pattern input input dialog box 204 includes various buttons, tab keys and areas for specifying printing conditions. Specifically, there are provided in the window setting items selection tabs, including a Basic Setting tab 204h, the 3D Setting tab 204i and a Details Setting tab 204j, which are selectively enabled. In the Print Pattern input dialog box 204 shown in FIG. 14, the Basic Setting tab 204h is enabled by default, and the remaining tabs 204i and 204j are hidden. There are further provided in the Print Pattern input dialog box 204 several menus boxes and boxes, namely a Print Category select box 204a, a Text box 204b, a Details input input dialog box 204c and a Print Type menu box 204q. In the Print Type menu 204a, a print category which the user wants to specify is selected from a pull-down menu including Character String, Symbol•Logo and Printer Operation. In FIG. 14, Character String is selected by default. In the Character Data menu box 204d, a print type which a user wants to specify is selected from a pull-down menu including Character, Barcode, 2D Code and RSS•CC (Reduced Space Symbology•Composite Code). In the Type menu box 204q, a particular type is specified from a pull-down menu according to the selected print category. The type menu shows various font types when Character is selected; CODE39, ITF, 2 of 5, NW7, JAN, Code 28 and the like when Barcode is selected; QR code, a micro QR code, Data Matrix and the like for the 2D code; and RSS-14, CC-A, RSS Stacked, RSS Stacked CCA, RSS Limited, RSS Limited CC-A and the like when RSS•CC is selected. In the Text box 204b, characters which the user wants are typed in. When Character is selected as a print type in the Character Data menu box 204d, the typed-in characters are printed in a string as they are. On the other hand, when Symbol is selected as a print type in the Character Data menu box 204d, the typed characters are encoded in print pattern according to a selected type of symbol. The print pattern is generated in the processing condition setting means 3C, or otherwise may be generated in the processing data generation means 80K of the arithmetical and logic unit 80. In Details input input dialog box 204c, there are provided three tabs, namely Print Data tab 204e, Size•Position tab 204f and Printing conditions tub 402g, for specifying details of printing conditions. In the 2D mode edit display window 202 shown in FIG. 14, a QR code is selected in the Character Data menu box 204d, and, correspondingly, a cell size, a line thickness of character, a percentage of error correction and a version number are quantified. There are further provided check boxes for selection of Auto Mode, Reverse and Password.

Figure 16:
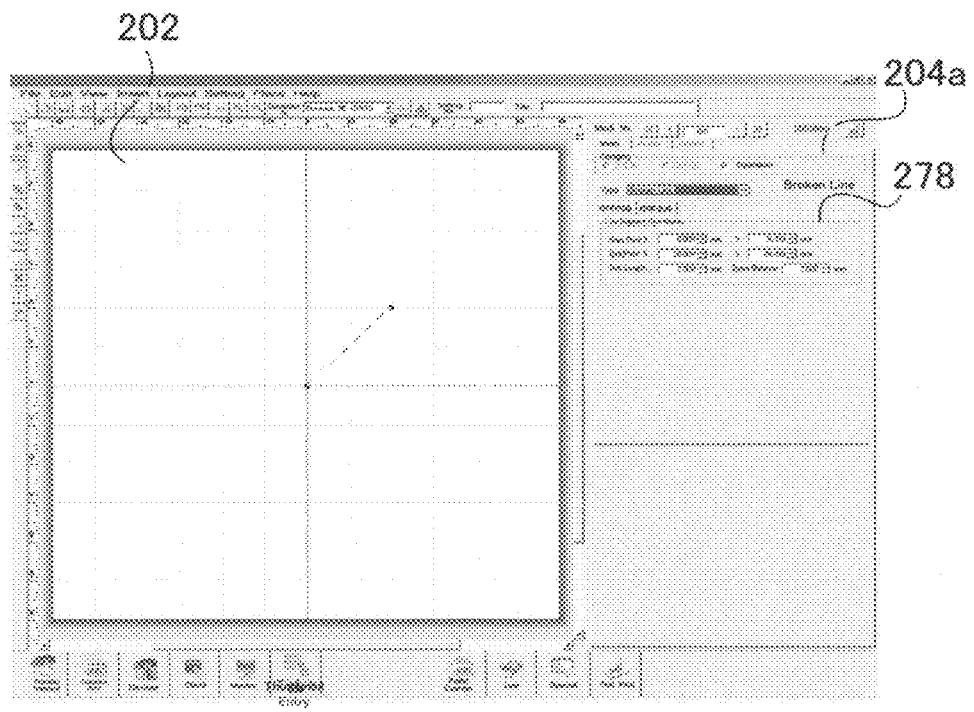
FIG. 16 is a photographic illustration of an edit display window in which a broken line is chosen as operation of a processing apparatus.
Figure 17:
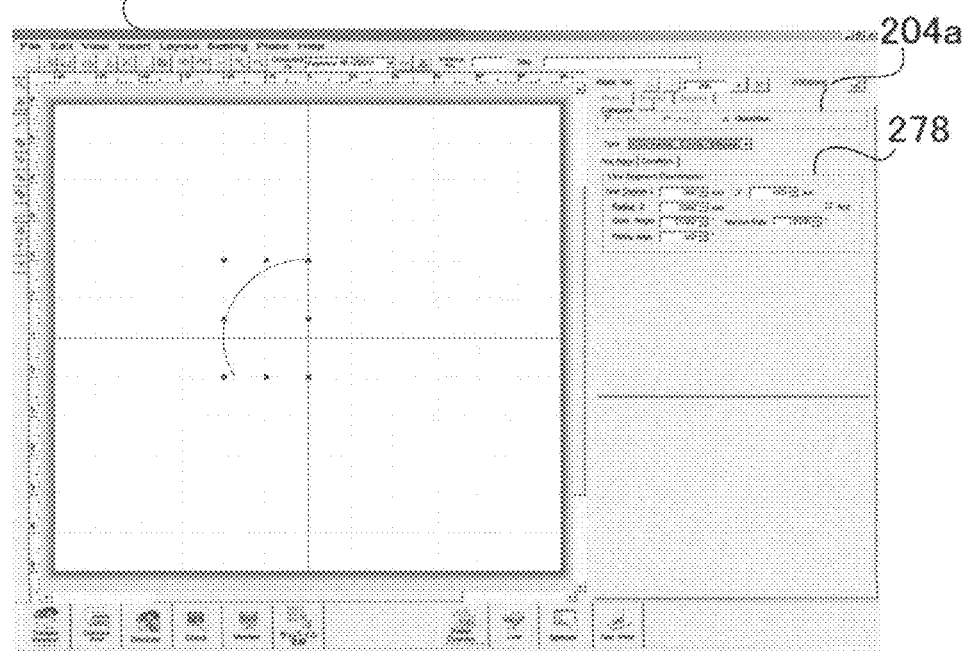
FIG. 17 is a photographic illustration of an edit display window in which a counterclockwise circle/ellipse is chosen as operation of a processing apparatus.
Figure 18:
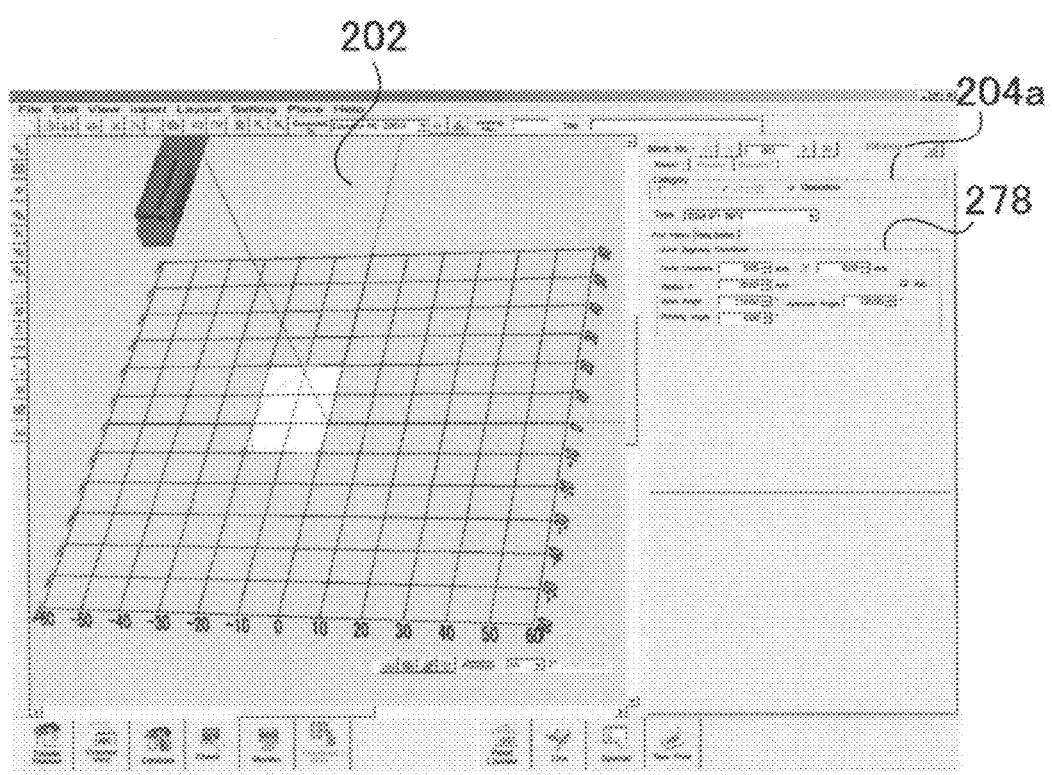
FIG. 18 is a photographic illustration of the edit display window shown in FIG. 67 which is changed to a 3D edit mode.

When selecting Printer Operation in the Print Category menu box 204a, it is enabled to select an print style in a pull-down operation menu including Fixed Point, Straight Line, Broken Line, Clockwise Circle/Ellipse, Counterclockwise Circle/Ellipse, Centered Point and the like. In the Printer Operation category, Details setting box 278c appears in place of the Details input dialog box 204c for specifying a locus of line, such as a straight line, a circular arc or the like, in coordinates as shown. For example, FIG. 16 shows the edit display window 202 in which Broken Line is selected. FIG. 17 shows the edit display window 202 in which Clockwise Circle/Ellipse is selected. FIG. 18 shows the edit display window 202 in 3D edit mode in which a line is displayed in three dimensions.

Figure 19:
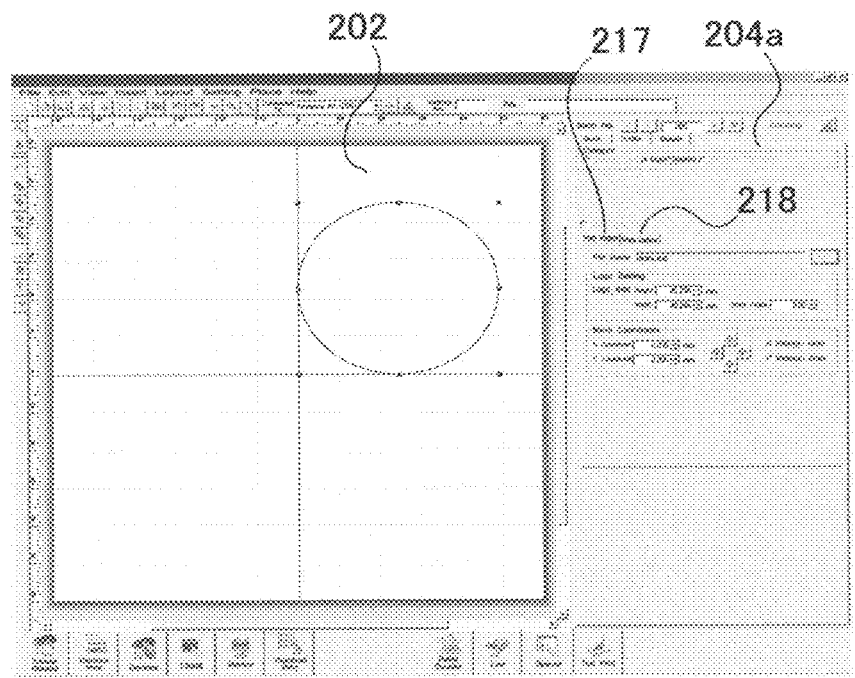
FIG. 19 is a photographic illustration of the edit display window for specifying a data file.
Figure 20:
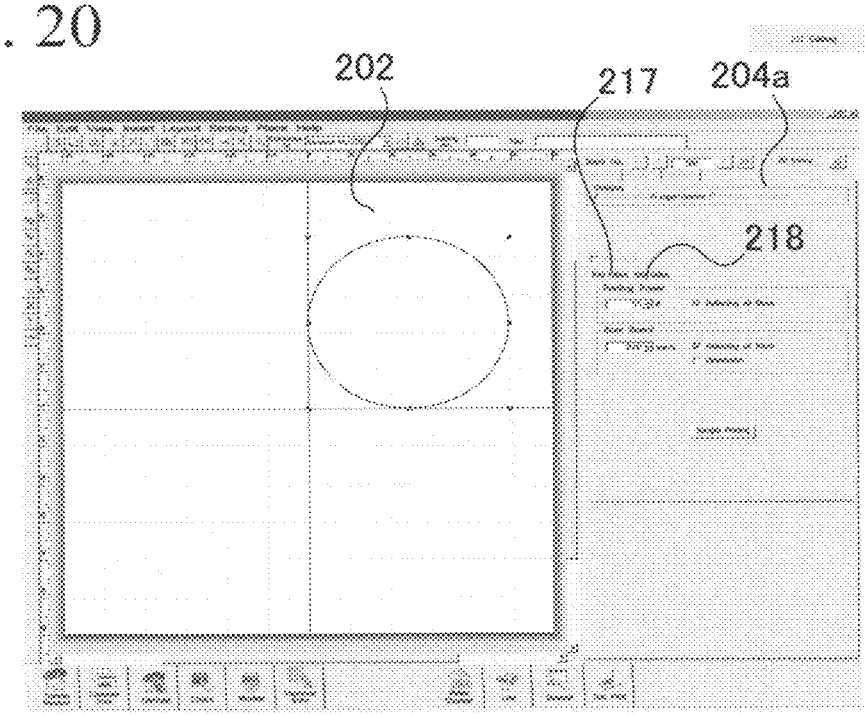
FIG. 20 is a photographic illustration of the edit display window for specifying a print pattern.

The laser processing system is not applied only to character printing but to printing of image data representing symbols such as logos and graphics shown in FIGS. 19 and 20. Specifically, when choosing "Logo•Graphics" in a Category menu box 204a, a print pattern dialog tab 217 and a print condition setting tab 218 appear. In the print pattern dialog tab 217 shown in FIG. 19, the user specifies an external file name to be imported and details of a selected print pattern. It is convenient to previously provide external files of logos and graphics in the form of raster image data or vector graphics data. Further, in the print condition setting tab 218 shown in FIG. 20, the user specifies details of printing conditions.

Figure 21:
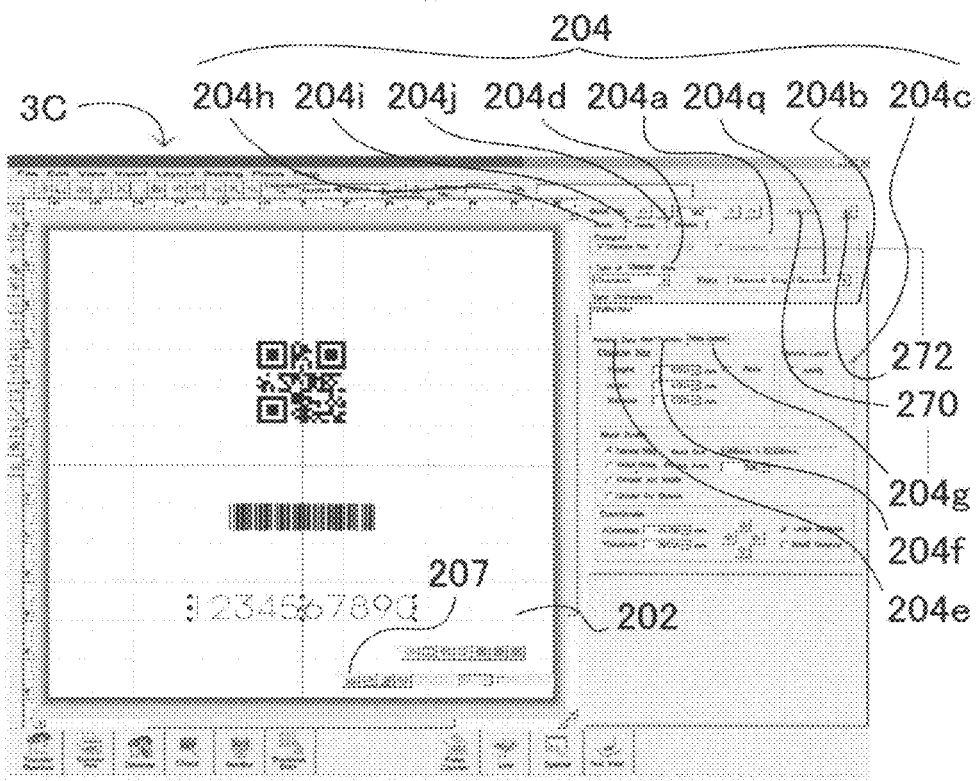
FIG. 21 is a photographic illustration of the edit display window for laying out print blocks.

In this way, print pattern data regarding a print block is established. A plurality of print blocks may be provided. That is, a work surface area or print area is divided into a plurality print blocks for printings under different printing conditions, respectively. It can be made to set a plurality of print blocks on a single work and, at the same time, one print block on each of a plurality of works within the work surface area. As shown in FIGS. 14 and 15, setting of a print block is made by block setting means such as a Block Number spin box 216 with Number Change buttons which are located above the Print Pattern input dialog box 204, namely an Increment button marked with ">", a Decrement button marked with "<", a Maximize button marked with ">>" and a Minimize button marked with "<<" for changing a block number. In order to specify a block number in the Block Number spin box 216, the Increment button or the Decrement button is pressed to change a block number by one increment or one decrement, respectively. When pressing the Maximize button or the Minimize button, the current block number in the Block Number spin box 216 jumps to a minimum block number, e.g. 0 in this embodiment or to a maximum block number, e.g. 255 in this embodiment, respectively. Otherwise, it can be made to specify a block number by entering a desired block number in the Block Number spin box 216. The edit display window 202 shown in FIG. 14 displays a QR code by specifying a block number of 000. The edit display window 202 shown in FIG. 15 is provided with three print blocks set therein in which a QR code, a barcode and a character string are displayed by specifying block numbers of 000, 001 and 002, respectively. When enabling the Print Data tab 204e, the print data dialog panel appears for specifying a height of barcode, a narrow space width, bar thickness, a thickness ratio of fine and heavy bars and the like. As appropriate, Check Digit and Reverse can be specified. A layout of print blocks can be desirably changed by adjustment of locations of the print blocks (centering of print blocks, right and left justification of print blocks, even distribution of print blocks), superposition ordering of print blocks and positioning of print blocks. For example, FIG. 21 shows three print blocks which are justified centrally in a transverse direction and distributed evenly in a vertical direction in the edit display window 202. It can be made to position a print block by coordinates. For example, FIG. 21 shows a character string specified by a block number specified by typing X and Y coordinates in numerical value in Size Position boxes of a Size•Position panel which appears when the Size•Position tab 204f is enabled. The Size•Position panel includes buttons for specifying a character format including a character height, a character width, a character spacing and the like. It can be also made to specify writing directions and inner and outer diameters of a column when printing a three-dimensional columnar work surface.

Figure 22:
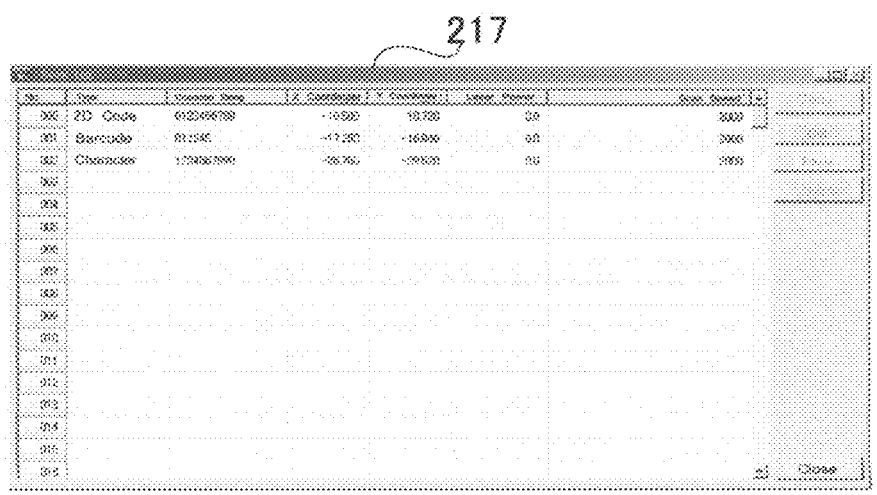
FIG. 22 is a photographic illustration of the edit display window for displaying a print block list.
Figure 23:
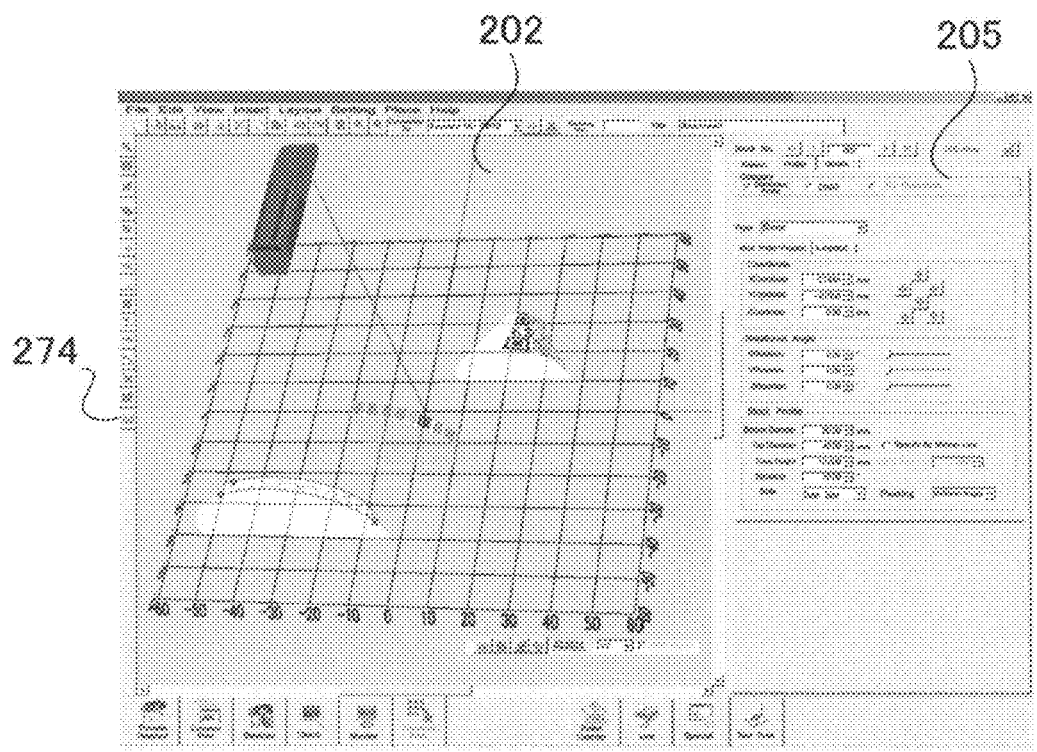
FIG. 23 is a photographic illustration of the edit display window in which a plurality of print blocks which are subject to batch transformation.
Figure 24:
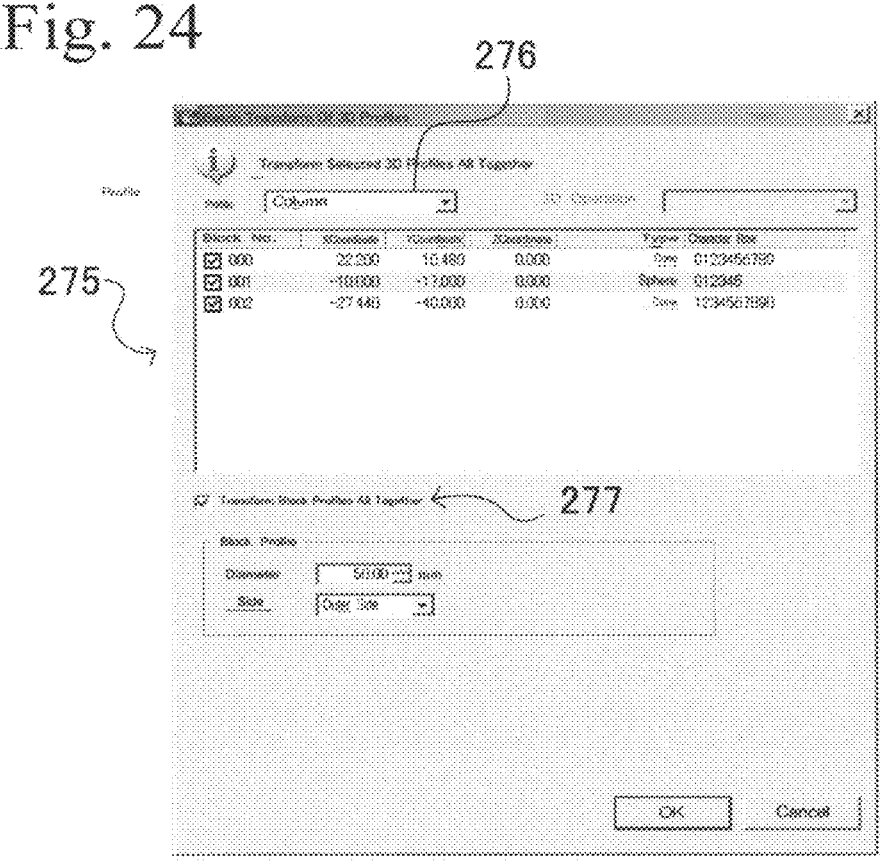
FIG. 24 is a photographic illustration showing a 3D profile batch transformation dialog box.
Figure 25:
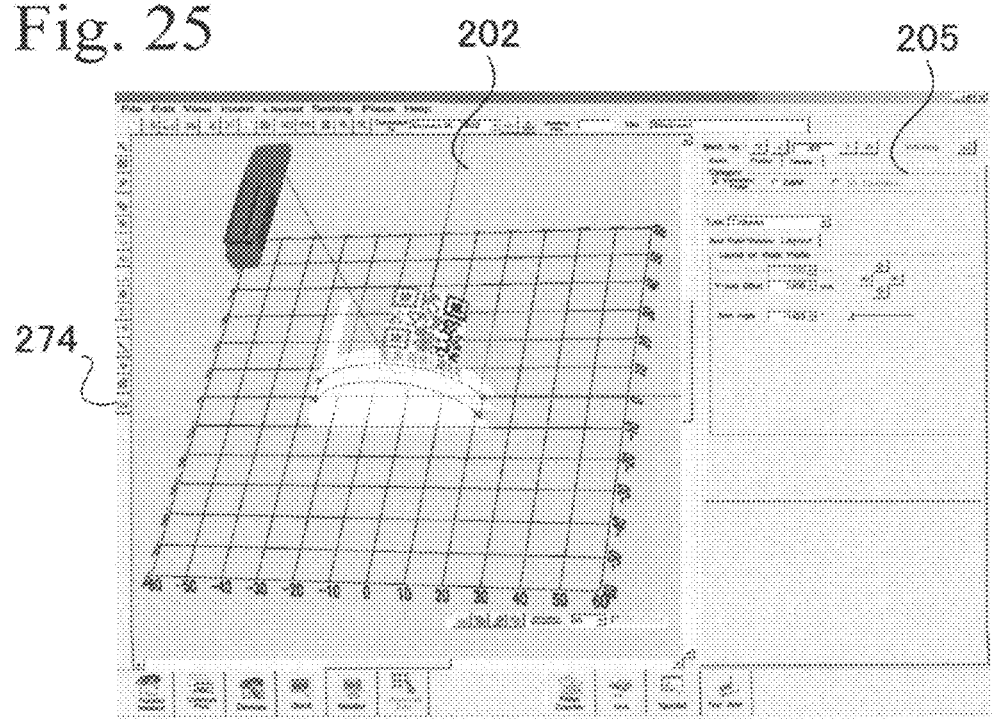
FIG. 25 is a photographic illustration showing a edit display window in which print blocks are batch transformed according to settings specified in the 3D profile batch transformation dialog box shown in FIG. 24.
Figure 71:
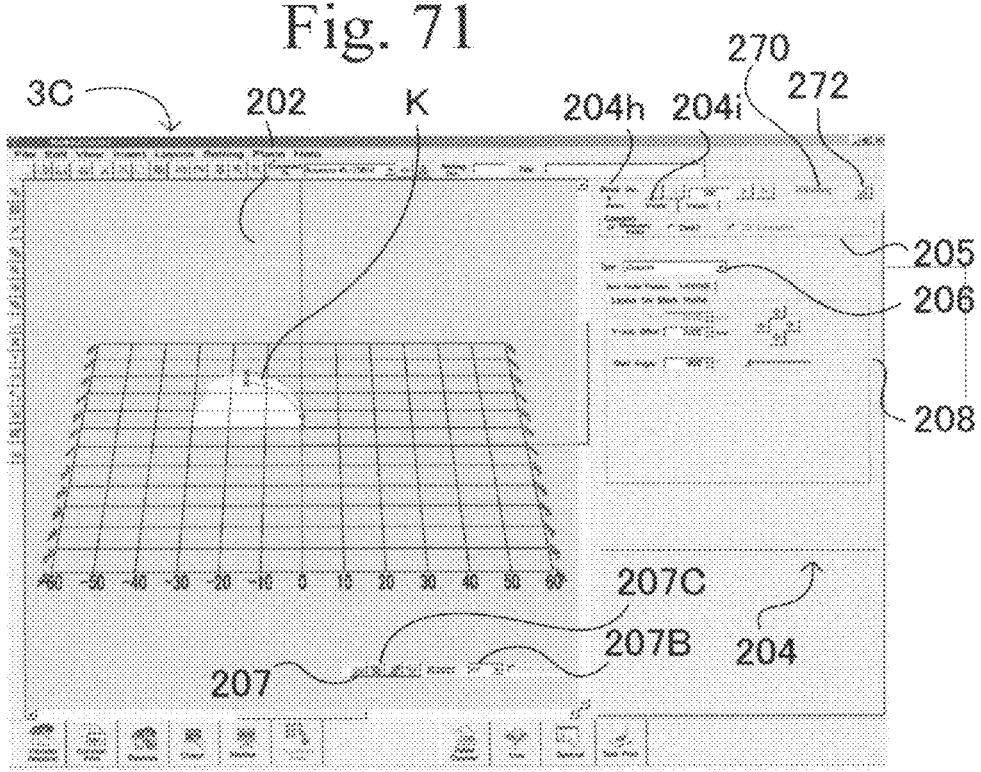
FIG. 71 is a photographic illustration of the edit display window in a 3D edit mode in which a unprintable area of a work is displayed.

FIG. 22 shows a block list window. This block list window appears when selecting an Edit command in the menu bar (see FIG. 15) to display a pull-down menu and then selecting Block List in the menu. In the block list, reset of a specified print block, deletion of specified print block, addition of a new print block can be made. It can be made to execute a batch transformation of profiles of print blocks. In the case where the user wants to make a transformation of three print blocks comprising two circular cones and one sphere such as shown in FIG. 23 by way of example into three columnar print blocks, when pressing a button 274 for 3D Profile Batch Transformation which is located at the bottom of a tool bar at a left side of the edit display window 202, a 3D Profile Batch Transformation window 275 appears as shown in FIG. 24. The 3D Profile Batch Transformation window 275 includes a current print block list which describes individual print blocks together with a block number, position coordinates, a graphic type and a character string. After choosing any of the print blocks which the user wants to transform by checking a check box of the print block, a profile into which the user wants to transform the selected print block is selected from a pull-down menu of a Profile menu box 276 including a plane, a column, a sphere, a circular cone, 3D processing machine, ZMAP, etc. When the user wants to transform all of the print blocks into a specific profile collectively, after choosing Bach Transforming Block Profiles check box 277, the user specifies details of the profile in the dialog box. Regarding the example shown in FIG. 24, the user chooses a column as a profile to which the user wants to transform the selected print block, in the Profile menu box 276, and, thereafter, specifies a diameter and a print surface in a Diameter spin box and a Print Side menu box in the Block Profile Bach Transformation dialog box. When an OK button is pressed, an edit display window 202 appears to display three columnar print blocks having the same diameters all together as shown in FIG. 71. This batch transformation function facilitates easy operation and is laborsaving in print block transformation.

Figure 26:
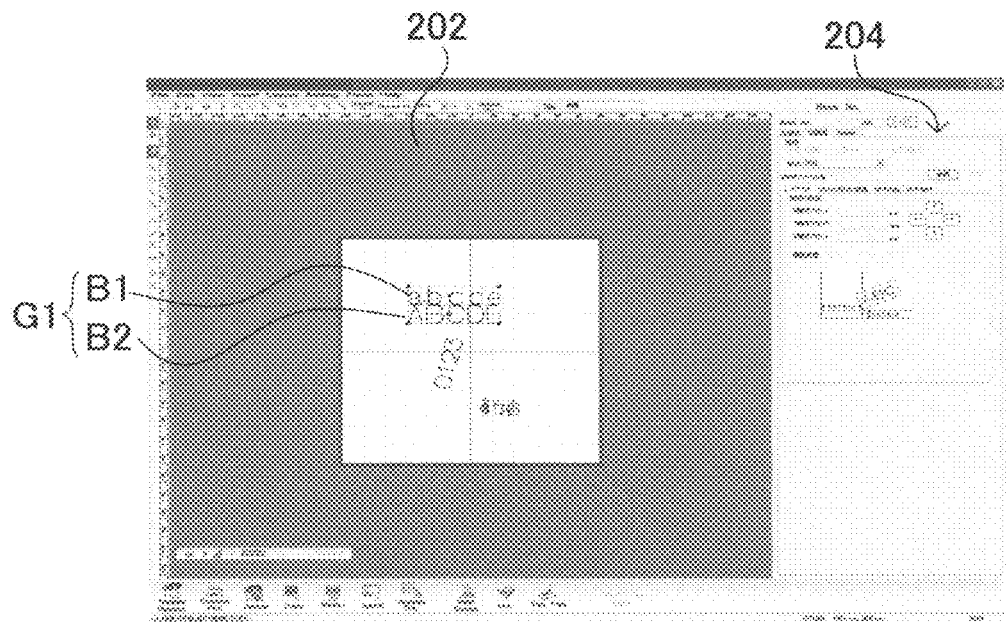
FIG. 26 is a photographic illustration of the edit display window in which a plurality of print blocks are displayed I two dimensions.
Figure 27:
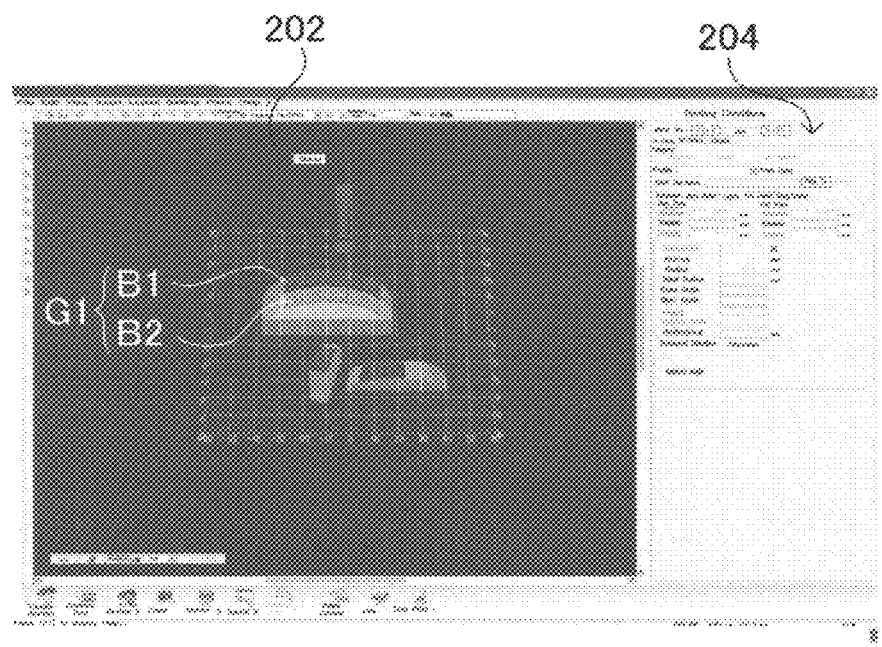
FIG. 27 is a photographic illustration of the edit display window in which the print blocks shown in FIG. 57 are displayed in three dimensions.

FIGS. 26 to 34 illustrate a function of grouping a plurality of print blocks into one print group in order to set up printing conditions such as laser power and scan speed by group. FIGS. 26 and 27 show edit display windows 202 in which a plurality of print blocks generated through the print block generating means 3F are displayed in two and three dimensions, respectively. In this instance, one print block allows a single line of print only. Therefore, when it is requested to print two or more lines in one print block, a plurality of print blocks are established side by side as they are in one unified print block. As shown in FIGS. 26 and 27, a columnar print block of a character string "abcde" (print block B1 which is identified by a block number 000) and a columnar print block of a character string "ABCDE" (print block B2 which is identified by a block number 001) are established on a columnar work surface and set up vertically side by side. Printing conditions are specified for the individual print blocks B1 and B2. In the past, users were required to specify printing conditions by print block. In such a case, since the print blocks B1 and B2 are applied to a single work, many printing conditions are often common to both print blocks B1 and B2. If specifying the same printing conditions by print block in the conventional way, the printing condition specifying operation is somewhat troublesome. In particular, in the case where a large number of print blocks are established, the same printing conditions have to be entered over and over again. This is a time consuming operation. In order to avoid this problem, the processing block grouping means 3J is used to group a plurality of print blocks into one print group so as thereby to enable users to specify printing conditions by print group.

Figure 28:
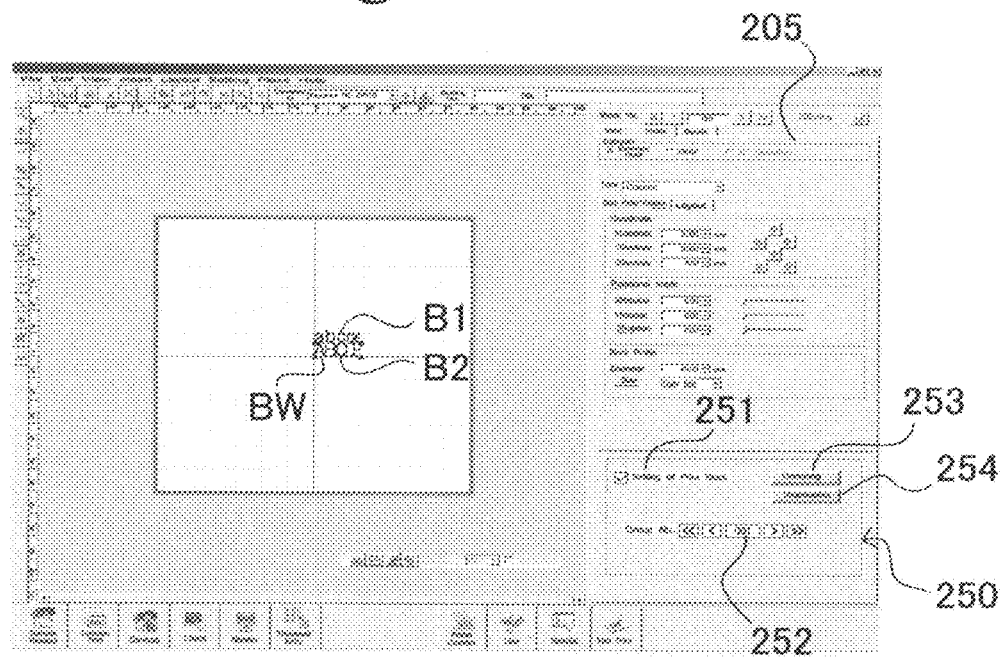
FIG. 28 is a photographic illustration of the edit display window in which print blocks are displayed in two dimensions.
Figure 29:
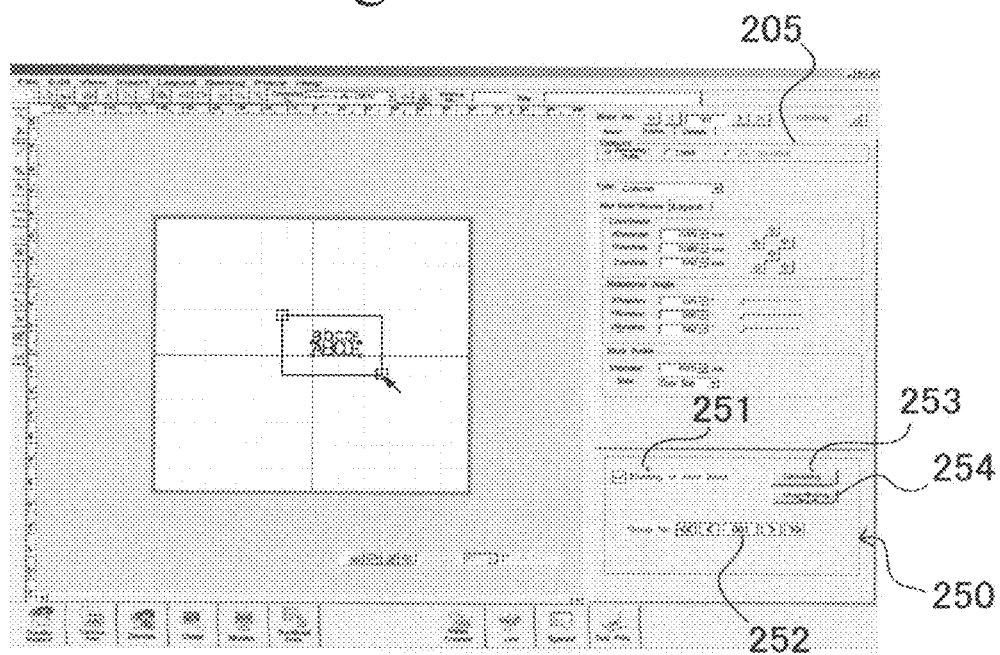
FIG. 29 is a photographic illustration of the edit display window in which print patterns are unified into a block by the use of a mouse.
Figure 30:
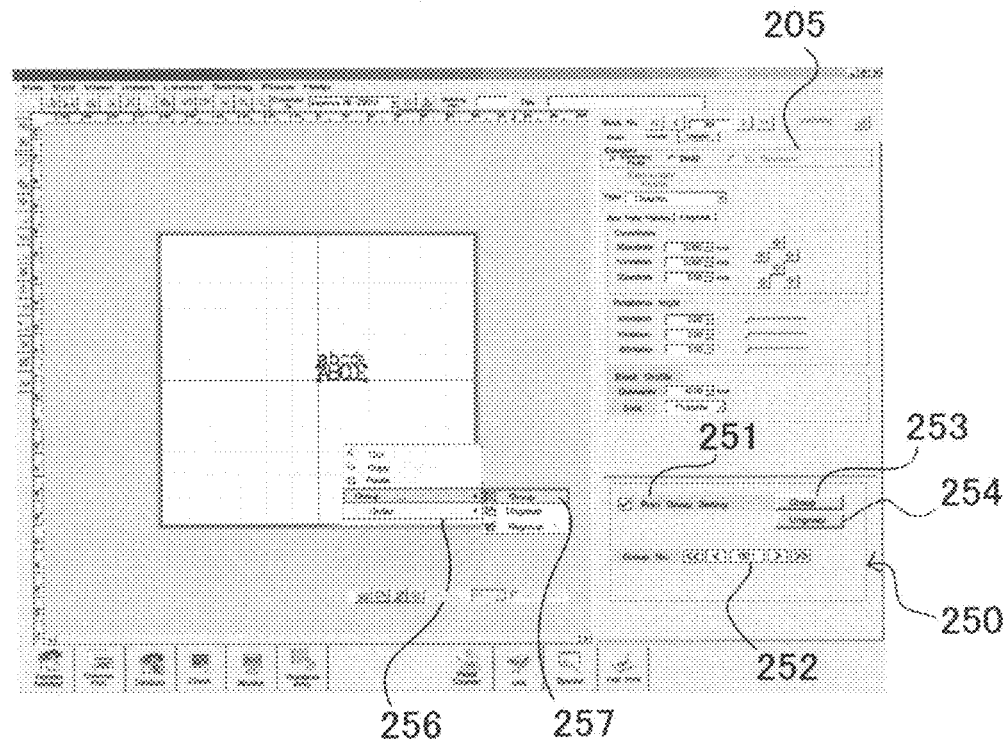
FIG. 30 is a photographic illustration of the edit display window in which print blocks are grouped by the use of a pop-up menu.
Figure 31:
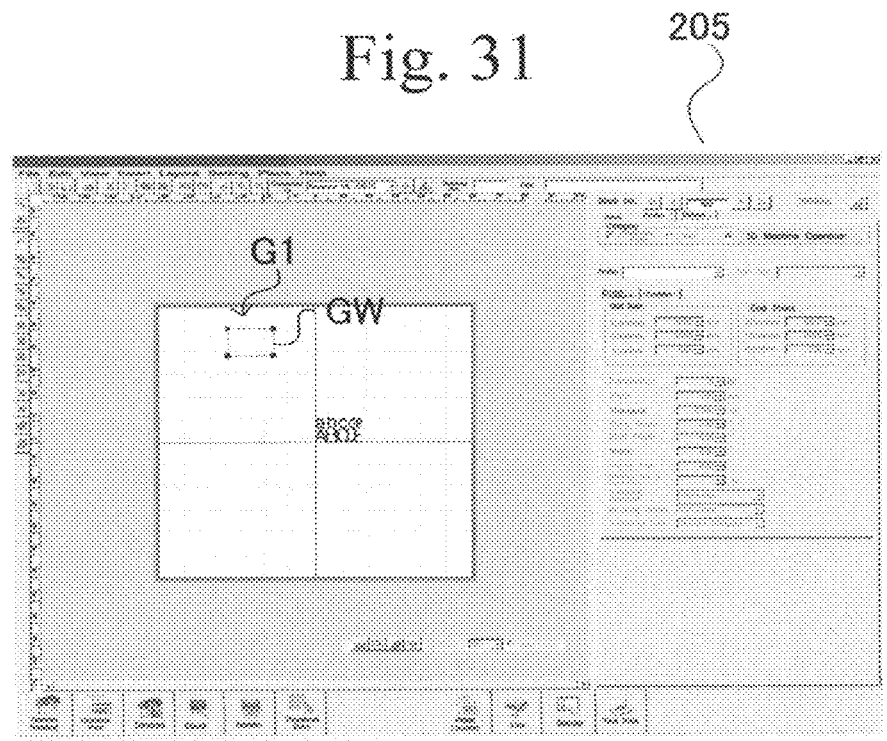
FIG. 31 is a photographic illustration of the edit display window in which a print block is specified.
Figure 32:
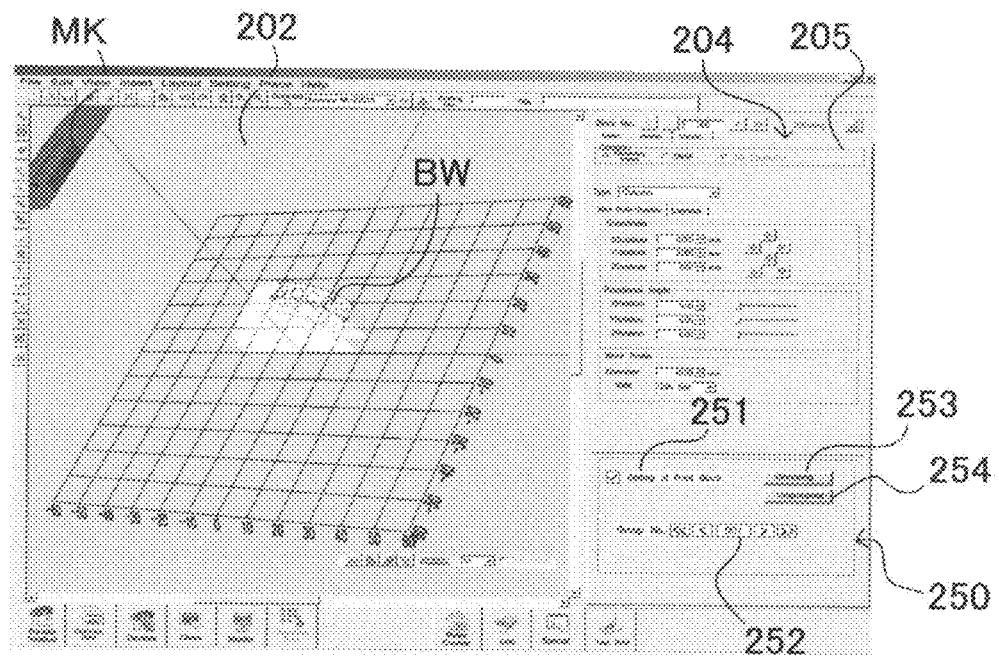
FIG. 32 is a photographic illustration of the edit display window in which the print block shown in FIG. 31 is displayed in three dimensions.

As shown in FIG. 28, after choosing a Print Block Grouping check box in the Grouping dialog box 250 and selecting a print block which the user wants to group by its print block number, a group number is specified in Group Number spin box 252. Selection of a print block which is required to be grouped is achieved by defining a work surface area including the print block in the edit display window 202 using a pointing device such as a mouse pointer as shown in FIG. 29 and then pressing Group button 253. After defining the work surface area, or otherwise pointing a plurality of print blocks which the user wants to group with a mouse pointer, the user presses a right mouse button to call a pop-up menu 256. As shown in FIG. 30, when selecting Grouping in the pop-up menu 256, a pull-down menu 257 listing Grouping, Ungrouping and Regrouping appears. Then, the Grouping is selected in the pull-down menu 257. Every time several print blocks are grouped, a group number is automatically assigned to groups from 000 in order of grouping. In this embodiment, grouping is permitted up to 245 groups. This grouping function enables users to specify printing conditions collectively by group. In an example shown in FIG. 59, print blocks B1 and B2 are pointed to be grouped as a group G1 in the edit display window 202 in the 2D edit mode and a group number (000 in this example) is assigned to the group by specifying a number in a Grouping dialog box 250 of the Print Pattern input dialog box 204. As a result, a print group frame or box GW appears to indicate an area of the print block group G1 which encloses double character strings which are grouped. As shown in FIGS. 30 and 31, the frame or box may be changed from a print block frame or box BW enclosing a singe print block to a print group frame or box GW enclosing grouped print blocks. In this way, two character strings "abcde" and "ABCDE" are handled as though they are one. The image of frame or box may be identical or may be different in appearance between the print block frame or box and the print group frame or box. When displaying the print block frame or box BW by a fine line and the print group frame or box GW by a bold line, these print block frame or box BW and print group frame or box GW are sharply distinctive. Furthermore, these frames or boxes may be differed by line styles such as solid line and broken line, line colors, or the like. It is desirable to achieve the grouping operation in the edit display window 202 in the 2D edit mode as shown in FIG. 28 since the 2D representation of a print block is simple and easy in selection. However, it is practicable to achieve the grouping operation in the edit display window 202 in the 3D edit mode as shown in FIG. 29.

Figure 33:
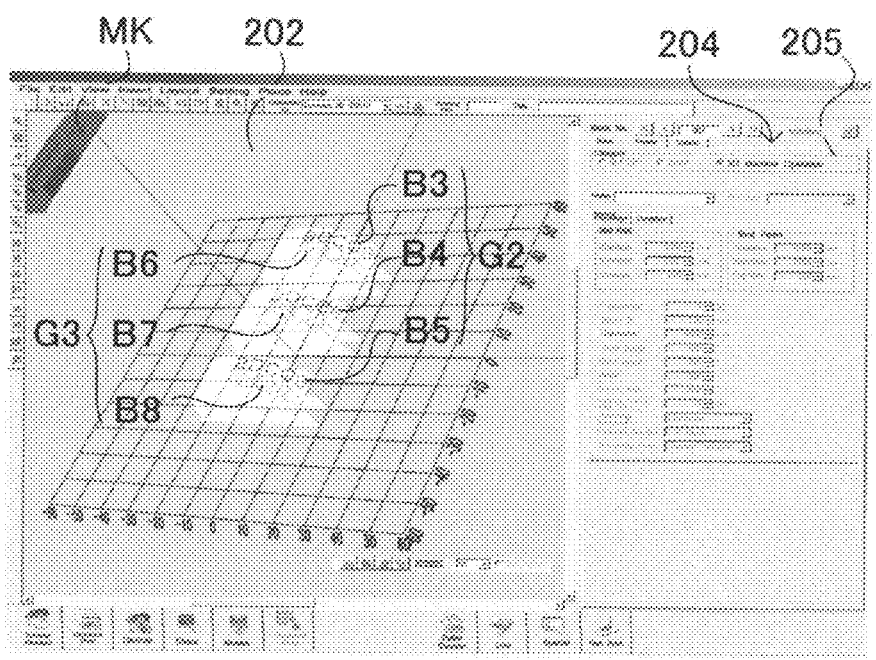
FIG. 33 is a photographic illustration of the edit display window in which a plurality of print blocks separated away from one another are grouped.
Figure 34:
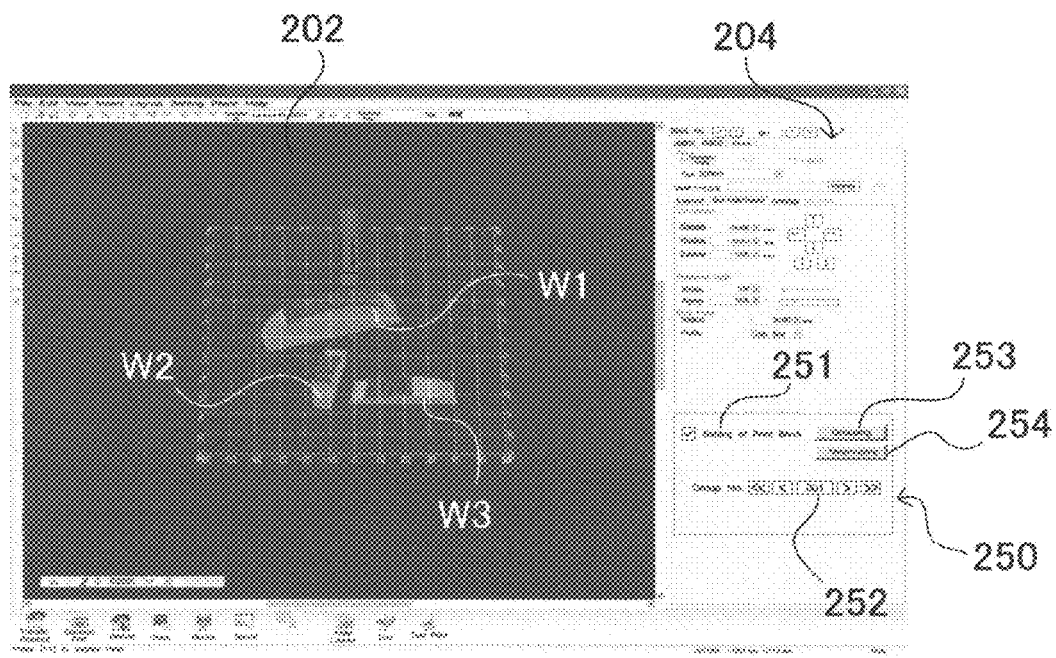
FIG. 34 is a photographic illustration of the edit display window in which a plurality of print blocks are grouped.
Figure 61:
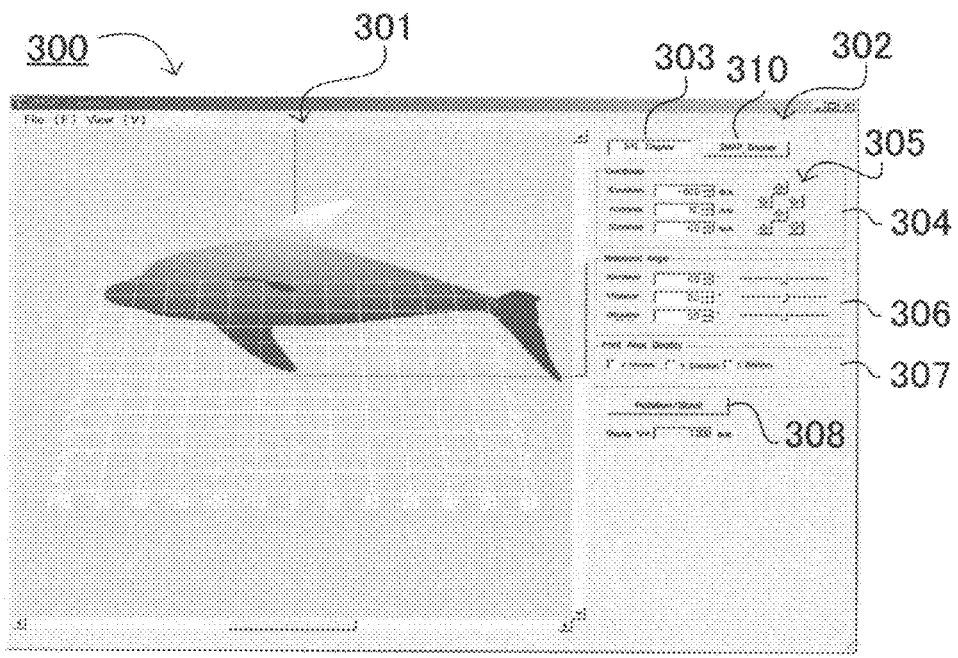
FIG. 61 is a photographic illustration of the edit display window in which a representation of three dimensional data is moved in a Y-axis direction.

The grouping function is effective not only to group print blocks or print groups adjacent one another but to group print blocks or print groups spaced from one another. As shown in FIG. 33 showing the case where three groups each of which comprises double character strings "abcde" and "ABCDE" are printed on a surface of a can, three print blocks of character string "abcde" B3, B4 and B5 are grouped into one group G2, and three print blocks of character string "ABCDE" B6, B7 and B8 are grouped into one group G3. This grouping enables to specify print density differently between the character strings "abcde" and "ABCDE". In this way, print blocks can be grouped by printing condition, as well as by print pattern such as characters, logos or the like. FIG. 34 illustrates the case where a plurality of print blocks are grouped into different groups for two or more works. Specifically, as shown, different print patterns are printed on works W1, W2 and W3, and a group of double character strings "abcde" and "ABCDE" is printed on the work W1. The works W2 and W3 may be printed in identical print patterns and under the same conditions. Accordingly, a plurality of works and a plurality of print blocks can be grouped together in any combination. The grouped print blocks or print groups can be ungrouped by pressing Ungroup button 254 in the Grouping dialog box 250 shown in FIG. 59 or selecting the ungroup function in the pull-down menu 257 as shown in FIG. 61. The ungroup function is convenient in such a case where the user wants to ungroup one or more print blocks grouped in one in order to be specified differently in printing condition from the remaining print blocks.

Referring back to FIG. 14, plane work surface profiling is possibly performed through the work surface profile input means 3A (see FIG. 13A) in the following ways.

(1) A Method of Drawing a Three-Dimensional Work by the Use of a 3D Graphic Design Program.

This method uses drawing tools such as a line tool, a curve tool, box tool, etc. functionally similar to existing three-dimensional CAD software, three-dimensional modeling software and drawing software in order to create a three-dimensional graphic image. This method is casually used by users skilled in the task of three-dimensional graphics drawing but is difficult to understand and/or for users who are unfamiliar with three-dimensional data editing.

(2) A Method of Defining a Three-Dimensional Work Surface Profile by Specifying Geometric Parameters in the Form of a Dialog.

This method uses wizard software to define a three-dimensional graphic image through an interactive dialog. This method is casually used because no knowledge and experience of three-dimensional graphics drawing is required. For example, the method is in need of specifying an elemental profile for a work profile and parameters for defining the profile only. Specifically, a user is required only to select a desired work profile from an option menu and to specify parameters for the selected work profile. Necessary parameters to be specified by the user are position coordinates of a control point and a direction of a normal vector when an oblique plane is selected, position coordinates of a control point, an outer diameter and a direction of a center axis when a column is selected, and position coordinates of a center and a diameter when a sphere is selected.

(3) A Method of Choosing an Elemental Profile and Specifying Parameters of the Elemental Profile.

Not limited to interactive modes, a pseudo profiling method which represents a work surface by an elemental profile is available. That is, users are requested to selectively specify prepared elemental profiles such as a column-shaped profile, a cone-shaped profile, a sphere-shaped profile and the like, and subsequently to specify numeric values of parameters defining the selected profile. In this way, a work surface profile is easily altered from a 2D representation to a 3D representation. This pseudo profiling method facilitates specifying operation of a three-dimensional profile of a work surface.

(4) A Method of Importing a 3D Data File Prepared for a Work Surface Profile and Converting it.

This method uses a 3D data file of a work surface provided separately by a 3D CAD program and converts it into a 2D data file. Because 3D data files previously provided are available, this method saves a user a lot of labor. In this instance, readable data file formats include various generalized file formats such as a DXF format, an IGES format, an STEP LP format, an STL format, a GKS format and the like. Furthermore, a format exclusive to an application such as a DGW format may be used for 3D data file conversion.

(5) A Method of Defining a Height Directly in Two Dimensional Data.

Figure 35:
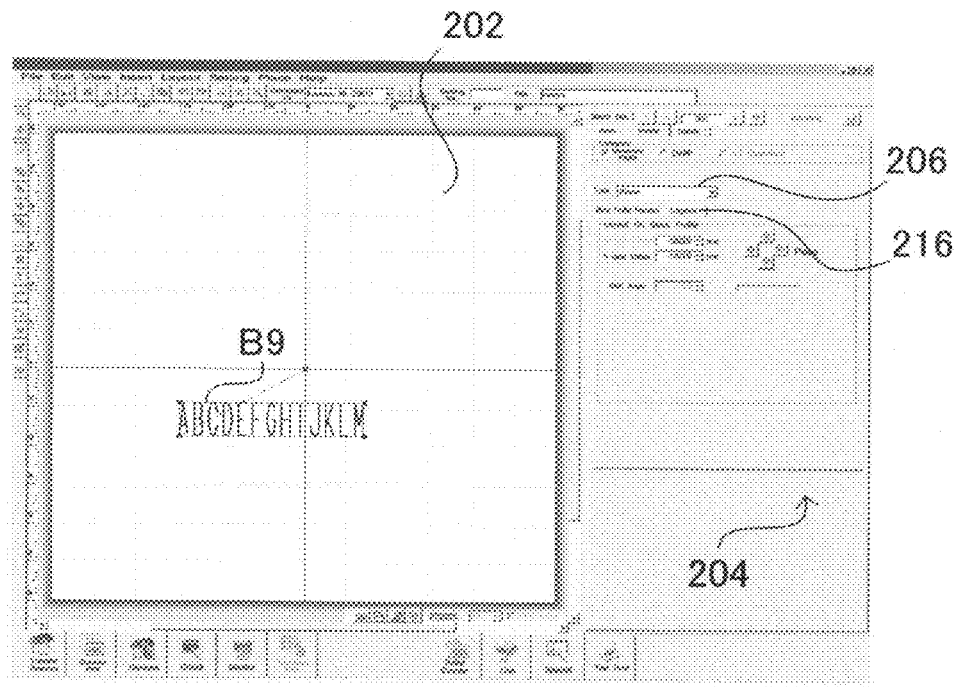
FIG. 35 is a photographic illustration showing a print pattern when an inclined surface is specified as a print surface.
Figure 36:
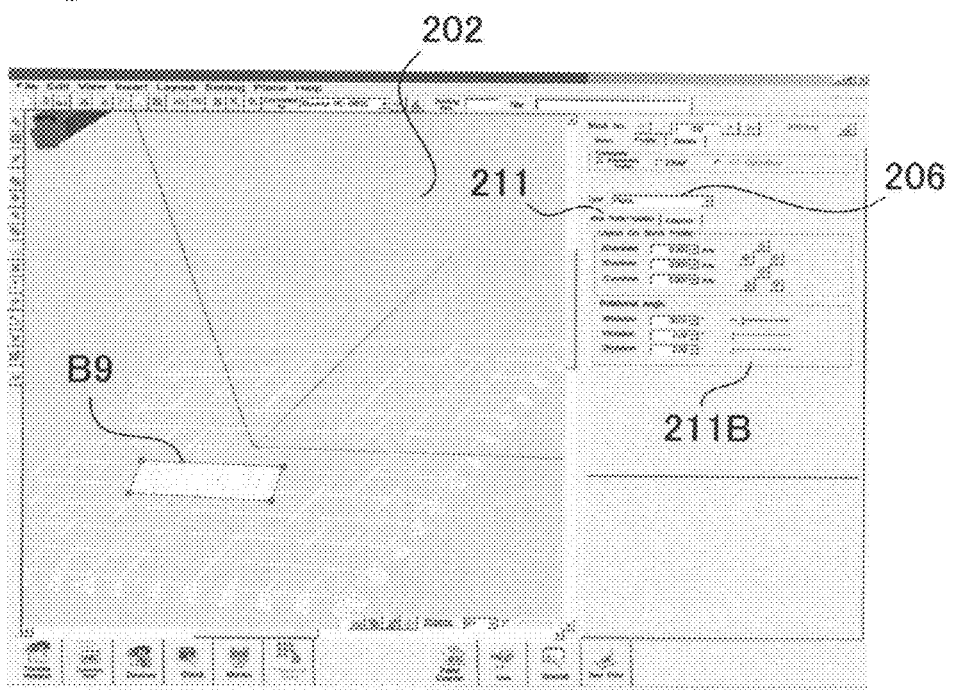
FIG. 36 a photographic illustration showing the inclined surface specified as a print surface in FIG. 35.

This method involves numerical data about a height and an inclination in the direction of height in two dimensional data representing a print pattern. In an example shown in FIGS. 35 and 36 in which a print block B9 comprising a character string "ABCDEFGHIJKLM" is printed on an inclined work surface, after choosing a Basic Setting tab and then specifying Basic Profile in the Category menu box in the Print Pattern input dialog box 204, a plane is specified in a Type menu box to display a plane work surface in two dimensions in the edit display window 202 as shown in FIG. 35. While displaying a print block B1 in two dimensions in the edit display window 202, a Layout tab 216 is opened to specify X-axis and Y-axis offsets in X and Y offset boxes, respectively. Thereafter, a Block Profile•Layout tab 211 is opened to specify angles of rotation in X-, Y, and Z rotational angle boxes 211B to display a layout of the as shown in FIG. 36. An angle of rotation can be specified by choosing a value in a spin box by a scroll arrow or a scroll slide. In FIG. 36, the print block B1 is displayed when specifying an angle of rotation in the X-axis. This method is, on one hand, advantageous to a representation of a simply stepped profile or an inclined profile and, on the other hand, not adequate to a representation of a complicated profile.

(6) A Method of Importing an Actual Image of a Work Surface Through an Image Recognition Device Such as an Image Sensor.

This method automatically acquires data by importing an image of a work surface through an image sensor or the like.

In this embodiment, the methods (3) and (4) are employed in this embodiment.

Figure 37:
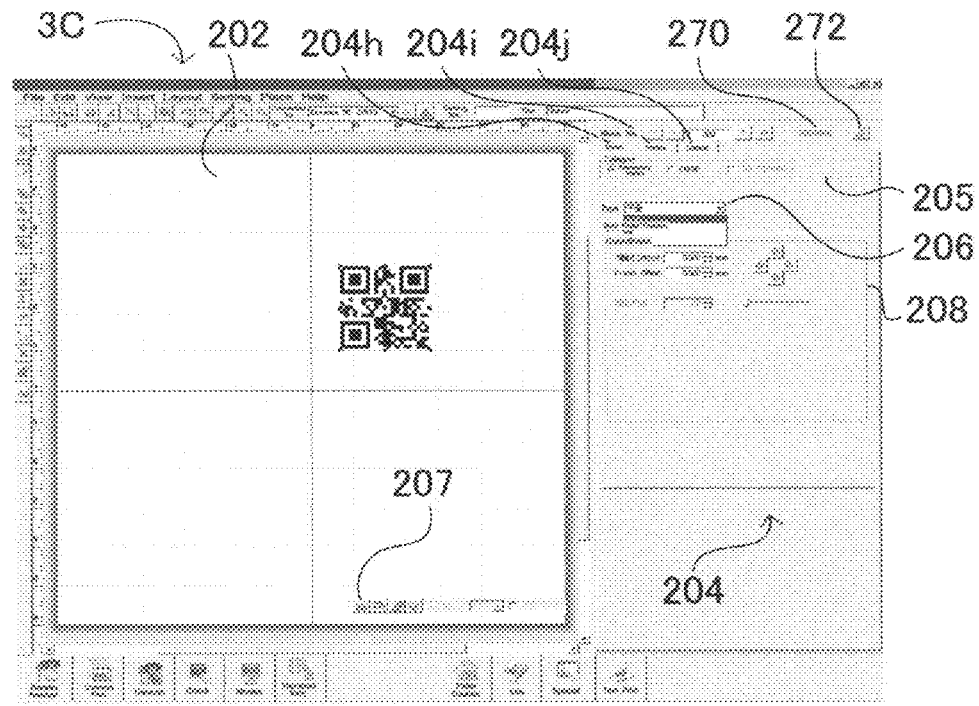
FIG. 37 is a photographic illustration of the edit display window switched to a 3D edit mode from a 2D edit mode shown in FIG. 14.
Figure 38:
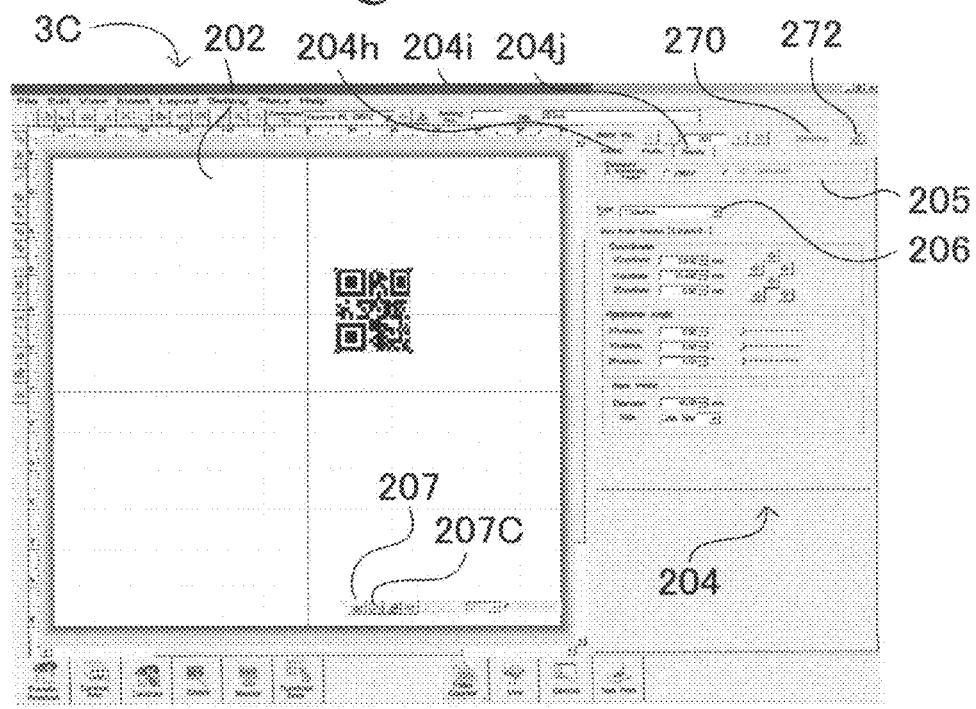
FIG. 38 is a photographic illustration of the edit display window in which a columnar work is selected and displayed.
Figure 39:
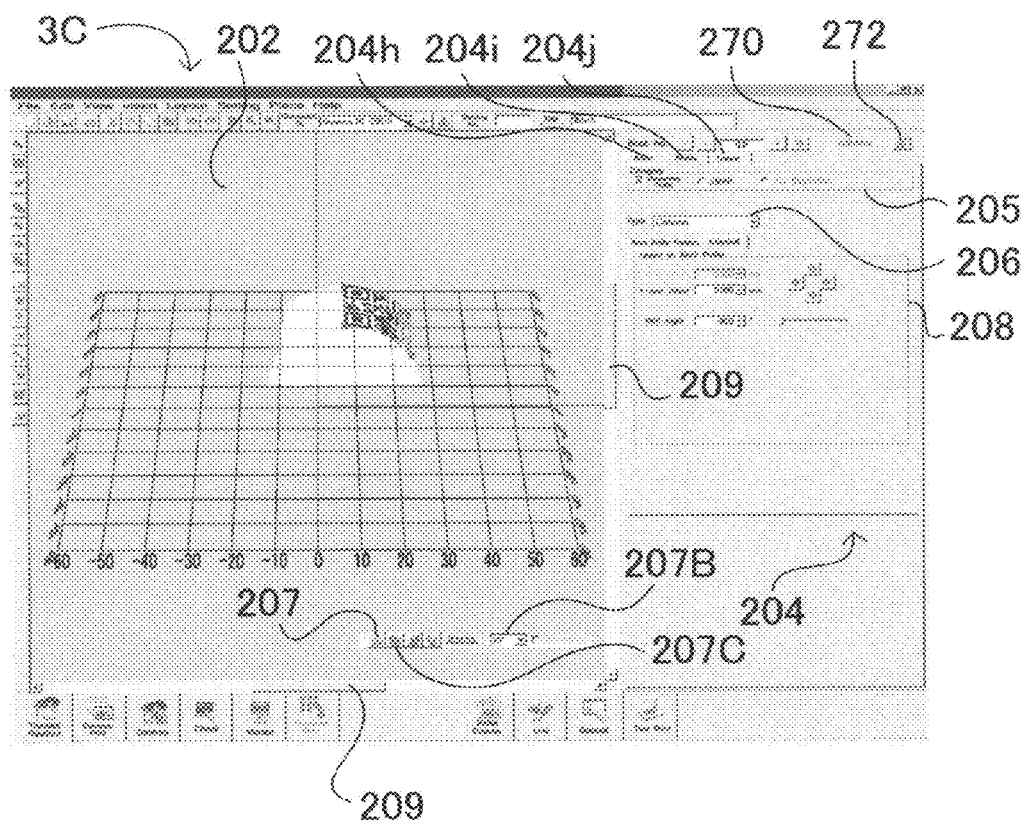
FIG. 39 is a photographic illustration of the edit display window for laying out print blocks.

Referring to FIGS. 37 to 39 showing the method (3), there are provided means for selecting a profile from prepared elemental graphics and means for reading a data file of 3D profile. When enabling the Profile Setting tab 204*i* in the Print Pattern input dialog box 204 (see FIG. 14), the edit display window shows a profile menu box including Elemental Graphic, ZMAP and Machine Operation as shown in FIG. 37. The Elemental Profile is selected by default. When the Elemental Profile is selected, a pop-up menu 206 appears to list types of elemental graphics such as a plane, a column, a sphere, a cone, etc. which are highlighted by selection. Plane is selected by default and highlighted in the Profile menu box 206. When selecting Column as shown in FIG. 38, the edit display windows 202 changes an object from plane-shaped to column-shaped. That is, a QR code to be printed on a columnar work surface is displayed in a plane with X-Y coordinate system. As a consequence, the displayed QR code diminishes in width as closing to the right end. When the user wants to display an object or work surface in three dimensions, the edit display window 202 is altered from a 2D view mode to the 3D view mode shown in FIG. 38 by pressing a View button 207A, thereby displaying a work surface in three dimensions. The edit display window 202 in the 3D view mode shown in FIG. 39 is altered back to the edit display window 202 in the 2D edit mode shown in FIG. 38 by pressing the View button 207A. In this way, the edit display window 202 is alternately changed between the 2D view mode and the 3D view mode. An icon on the View button 207A is altered between an indication of "2D" and an indication of "3D" correspondingly to a switch of the edit splay window 202 between the 2D view mode and the 3D view mode. The print pattern, i.e. the QR code, is enclosed in a frame or box K in the edit splay window 202 in the 3D view mode shown in FIG. 39 similarly in the 2D view mode shown in FIG. 38. The tool bar 207 including the View button 207A is in the form of a floating tool bar which can be freely shifted within the window, it may be hidden as appropriate, or otherwise, may be incorporated in an ordinary fixed tool bar.

Figure 42:
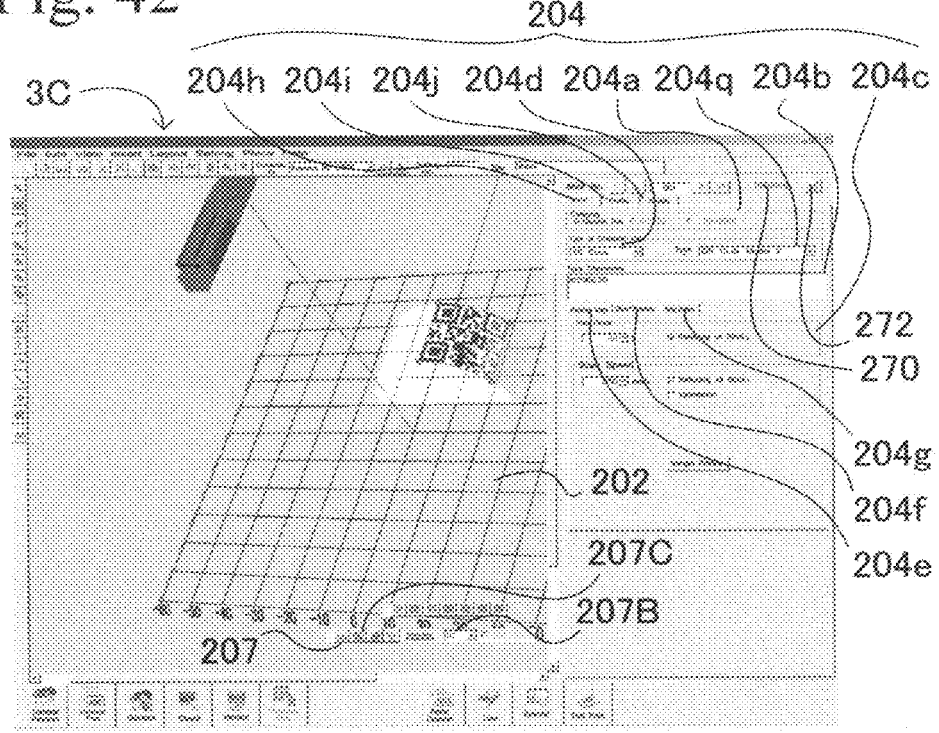
FIG. 42 is a photographic illustration of the edit display window in a 3D view mode which is scrolled left.
Figure 43:
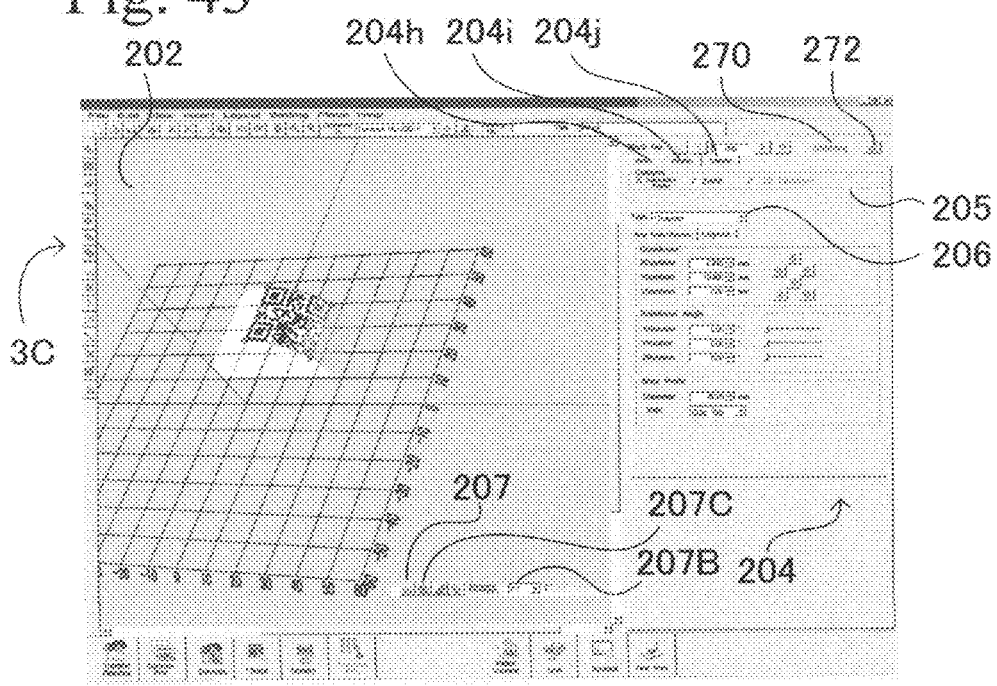
FIG. 43 is a photographic illustration of the edit display window in a 3D view mode which is scrolled right.
Figure 44:
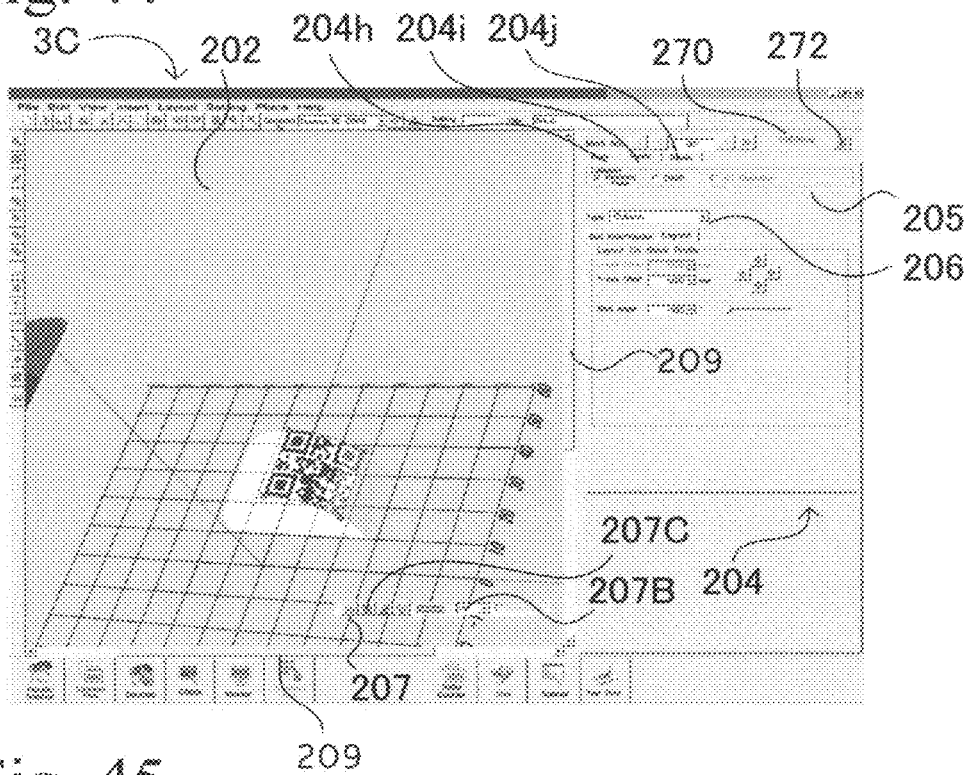
FIG. 44 is a photographic illustration of the edit display window in a 3D view mode which is scrolled up.

FIGS. 40 to 47 show the edit display windows 202 which display an object or work as though the user views it at different view points in the edit display window 202 in the 3D edit mode. Explaining the view point shift function taking a QR code shown in FIG. 38 for example, when pressing the View button (View mode switch button) 207A of the floating tool bar 207 in the edit display window 202 in the 3D edit mode shown in FIG. 38, the edit display window 202 in the 3D edit mode appears as shown in FIG. 39. The view point is shifted at will as shown in FIGS. 40 through 47 by moving a scroll bars 209 up or down and right or left in the edit display window 202 in the 3D view mode shown in FIG. 38. FIG. 40 shows the edit display window 202 in which the work with a QR code is viewed obliquely from above. FIG. 41 shows the edit display window 202 in which the object or content is rotated by 180° and viewed from behind. The view point may be otherwise shifted by dragging any point of the edit display window 202. When pressing a Move/Rotation button of the tool bar 207, the scroll bars 209 are altered from a rotation function to a move function. In this state, when moving the scroll bar 209 up and down or right and left, a viewing field including an object moves up and down or right and left correspondingly in the edit display window 202 as shown in FIGS. 42 and 43. In this way, the scroll bars which are altered between an object rotating function and an object moving function by the Move/Rotation button of the tool bar 207 facilitates operation to change a viewing field, and hence a view point. As a consequence, even users who are unfamiliar with three-dimensional graphic editing are enabled to easily shift a view point.

Figure 45:
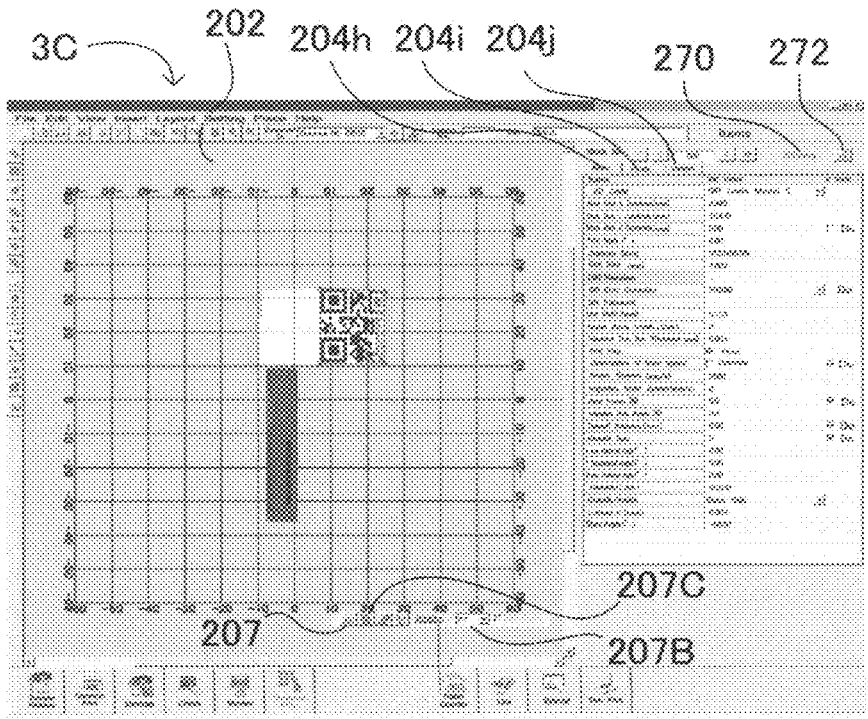
FIG. 45 is a photographic illustration of the edit display window in a 3D view mode in which an X-Y coordinate plane is displayed.
Figure 46:
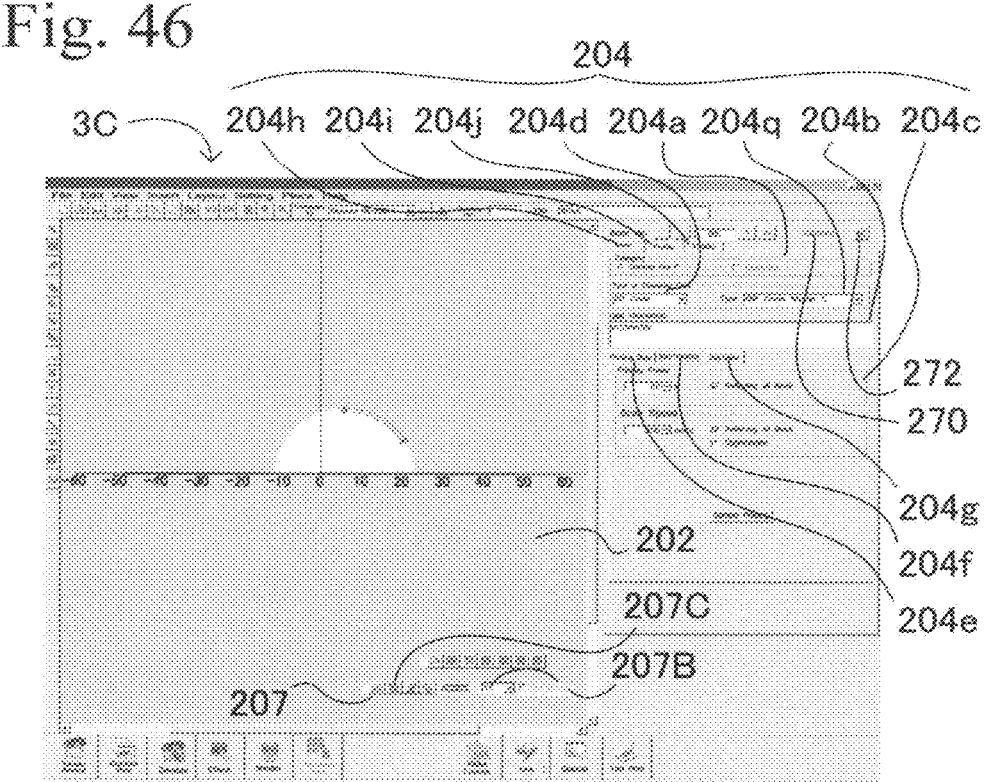
FIG. 46 is a photographic illustration of the edit display window in a 3D view mode in which a Y-Z coordinate plane is displayed.
Figure 47:
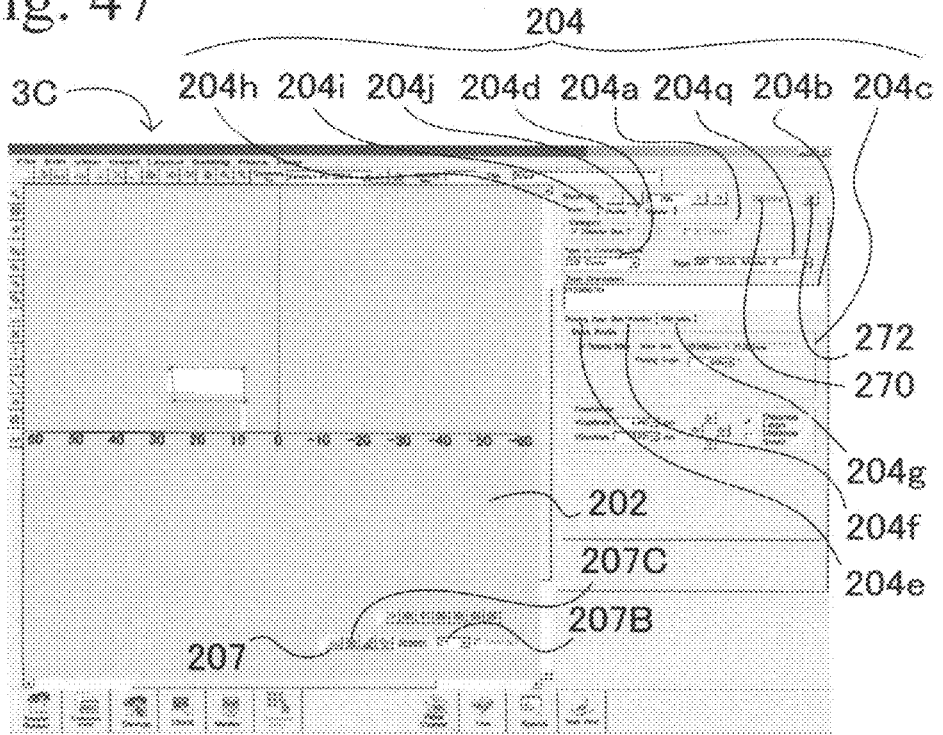
FIG. 47 is a photographic illustration of the edit display window in a 3D view mode in which a Z-X coordinate plane is displayed.

Further, as shown in FIGS. 45 to 47 showing the edit display window 202 which displays an object or work in the 3D display mode as though the user views it at different fixed view points, the fixed view point is changed by pressing a Display Position button 207B of the tool bar 207. Specifically, when pressing the Display Position button 207B in the edit display window 202 shown in FIG. 45 which corresponds to the edit display window 202 shown in FIG. 38 and in which a view point is fixed above an X-Y coordinate plane, the edit display window 202 changes to display a Y-Z coordinate plane as though a view point is above the Y-Z coordinate plane as shown in FIG. 46. When pressing the Display Position button 207B in the edit display window 202 shown in FIG. 46, the edit display window 202 changes to display a Z-X coordinate plane as though a view point is above the Z-X coordinate plane as shown in FIG. 47. In this way, the quick cyclical change of a viewing plane in the 3D view mode is advantageous to a changing a fixed view point.

Figure 48:
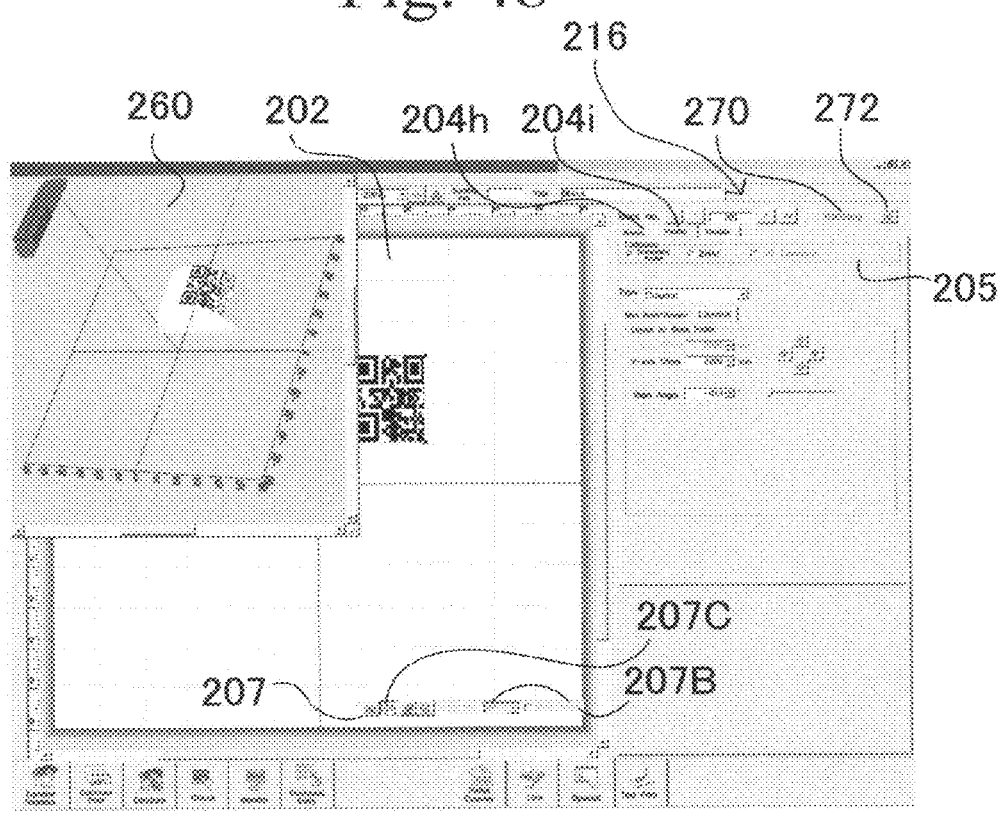
FIG. 48 is a photographic illustration showing a three-dimensional viewer on which a work is displayed in three dimensions.

In the above embodiment, the edit display window 202 is switched over from the 2D edit mode to the 3D edit mode, and vice versa. In case where it is desired to display same objects (same work surface) in both two dimensions and three dimensions, respectively, the laser processing data setting program provides a 3D viewer window 260. When selecting a 3D Viewer Open button 207C in the floating tool bar 207 in the edit display window 202 in the 2D edit mode, a 3D viewer window 260 appears over the edit display window 202 as shown in FIG. 48. The 3D viewer window 260 can be moved to any desired location on the screen by dragging its title bar or any portion thereof and changed in size. A work can be changed in position, rotated and scaled as desired. Since it is not required to open the 3D viewer window 260 while the edit display window 202 is in the 3D edit mode as shown in FIG. 39, the 3D Viewer Open button 207C in the floating tool bar 207 grays out and is disabled to prevent erroneous operation. It is also possible to display a 2D viewer window separately from the edit display window 202. The 3D viewer window 260 may be changed in layout, size and position as desired. In this way, the edit display window 202 and the 3D viewer window 260 are used for the object display section 83 of the display unit 82. The 3D viewer 260 appears with a grid and scales for facilitating easy grasp of a view point. The grid and scales may be hidden as appropriate.

Figure 52:
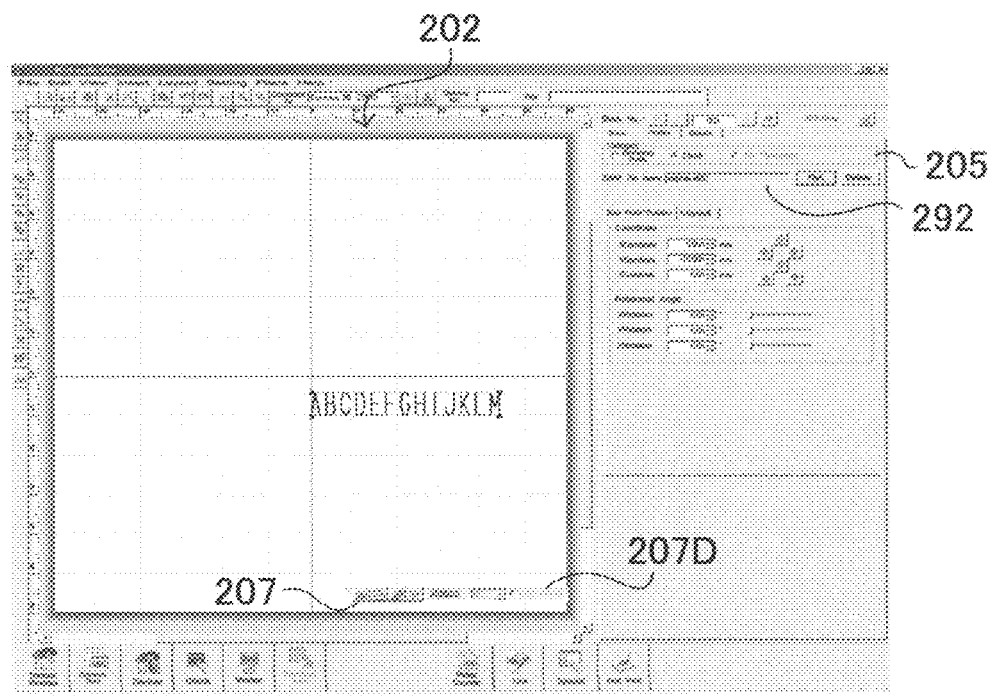
FIG. 52 is a photographic illustration of the edit display window when a ZMAP data file is specified.

FIGS. 49 to 54 show a method of importing a 3D data file prepared for a work surface profile which has been prepared by the use of, for example, a 3D CAD and converting it. This method basically pastes a two dimensional print pattern data to three dimensional profile data. The term "ZMAP" file as used hereinafter shall means and refer to a three dimensional profile data file in a file format which includes information about Z-coordinates in a direction of height for individual X- and Y-coordinates, respectively. After entering a print pattern such as a character string "ABCDEFGHIJKL" in the Text box 204b of the Print Pattern dialog box shown in FIG. 49, the Profile Setting dialog tab is enabled to select a ZMAP option in the Print Category menu box 205 which functions as the 3D data input means 3b. When choosing the ZPAM in the Print Category menu box 205, a ZMAP File Name box 292 appears. Then, the user specifies a file name of a desired ZMAP in the ZMAP File Name box 292. Otherwise, when pressing a REF button 293 on the right-hand side of the ZMAP File Name box 292, an Open File dialog box 294 shown in FIG. 51 appears to list available file names (in this embodiment, only one file name is listed). Then, the user can select a ZMAP file (e.g. dolphin.MD3) which the user wants to import. Whereupon choosing the ZMAP file, the chosen file name "dolphin.MD3" is indicated in the ZMAP File Name box 292 as shown in FIG. 52.

Figure 53:
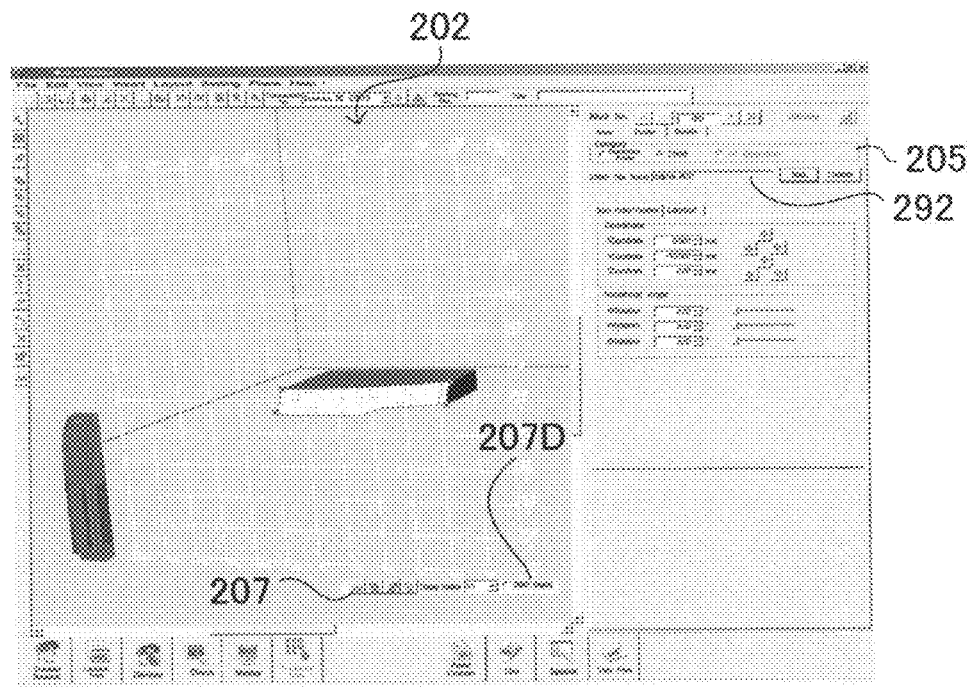
FIG. 53 is a photographic illustration of the edit display window in a 3D view mode in which a work surface is displayed in three dimensions.
Figure 54:
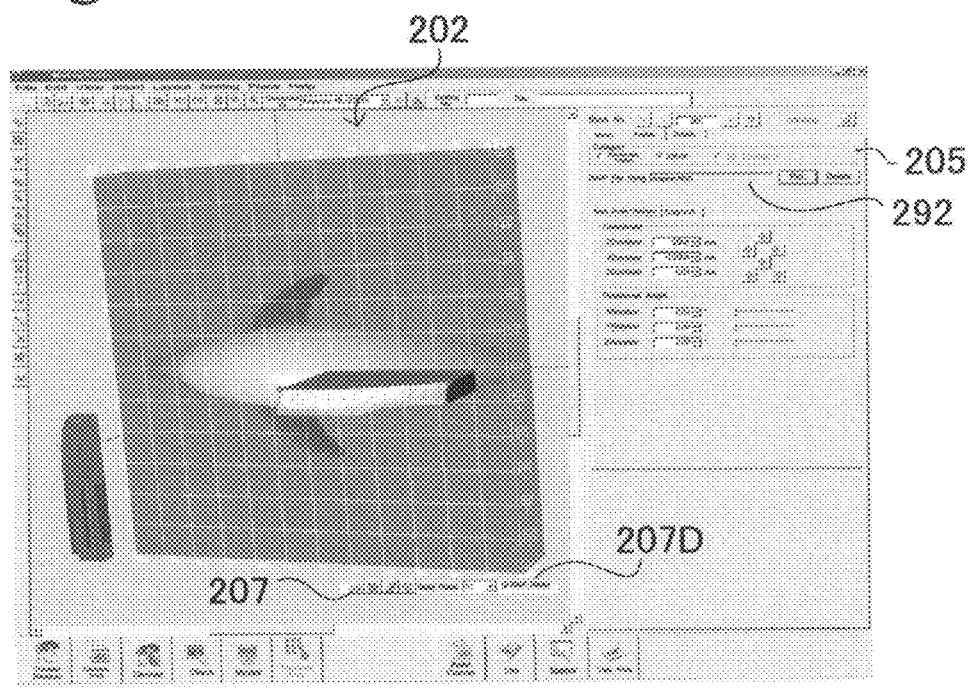
FIG. 54 is a photographic illustration of the edit display window in a 3D view mode in which three dimensional profile data defined by the ZMAP data is displayed on a work surface in three dimensions.

In this state, the edit display window 202 displays the print pattern "ABCDEFGHIJKL" pasted to the three dimensional profile represented by the three dimensional profile data defined by the ZMAP file. When the user wants to look a 3D representation, the edit display window 202 is altered from the 2D view mode to the 3D view mode shown in FIG. 53 by pressing the View button 207A of the floating tool bar 207. As a consequence, the print pattern "ABCDEFGHIJKL" pasted to a specified part of the work surface is displayed in three dimensions in the edit display window 202. Like this, the print pattern "ABCDEFGHIJKL" can be confirmed both in two dimensions and three dimensions. Further, concurrently with specifying a ZMAP data file, a ZPAP Display command box 207D is enabled as shown in FIG. 52. When enabling the ZPAP Display command box while the edit display window 202 is in the 3D view mode as shown in FIG. 53, the edit display window 202 displays the printed print pattern "ABCDEFGHIJKL" laid on a representation (dolphin) of the three dimensional data defined by the specified ZMAP file as shown in FIG. 54. This feature enables users to visually confirm a general appearance of printing.

Pasting of the print pattern to the work is achieved so that a print pattern in an orthogonal projection on a three dimensional work surface can be recaptured in a right pattern when viewed in a specific direction, e.g. head-on, as shown in FIGS. 53 and 54, in other words, so that the print pattern "ABCDEFGHIJKL" displayed in the edit display window 202 in the 2D view mode as a consequence of specifying the file name in the ZMAP File Name box 292 as shown in FIG. 52 remains unchanged even though the edit display window 202 changes from the 2D view mode (FIG. 49) to the 3D view mode (FIGS. 53 and 54), and vice versa. In this instance, three dimensional information about the print pattern is generated by adding information about a height (Z coordinate) at a point on the ZMAP which has having X and Y coordinates to two dimensional information about a point of the print pattern which has X and Y coordinates corresponding to those of the ZMAP point. Because this method uses the two dimensional information about the print pattern on its own and refers to only height information held in the ZMAP file, data processing for changing the print pattern from two dimensional to three dimensional is facilitated. As a consequence, the data conversion is achieved with a reduced load and a high speed. In particular, when a work has a complicated shape, this method is advantageous in light of throughput capacity and speed. Furthermore, because of accurate appearance of a print pattern such as a symbols and characters, this method is advantageous to an application where a printed pattern has to be read or recognized in a definite direction for identification. For example, even when printing a symbol such as a barcode on a curved surface, it is avoided that a printed barcode is misread due to distortion at an end portion of the printed barcode. As a consequence, print patterns are read by optical character readers or optical barcode readers at a high read rate.

In the method of choosing an elemental profile and specifying parameters of the elemental profile, a print pattern is pasted to an elemental pattern developed in plan. That is, a two-dimensional representation of a print pattern in the edit display window 202 changes as shown in FIGS. 37 and 38. This representation is favorable for an application where a printed pattern is read or recognized in indefinite directions, for example an application where a print pattern which does not always need to be recognized for identification like a date of manufacture and a serial number.

As just described above, the Print Category menu box 205 performs the function of switching from the elemental profile specification via the elemental profile specifying means 3a to the ZMAP file specification function via the 3D data input means 3b, and vice versa.

FIGS. 55 to 70 show a procedure for creating ZMAP data from a three-dimensional profile data file provided in the form of general purpose data file in the following procedure. Three-dimensional profile data files can be prepared by the use of commercially available computer programs such as a 3D-CAD program and a 3D-CG program and written in the file format of STL (Stereo Lithography) in this embodiment. The STL file format, which has a data structure in which an object is represented by an aggregation of a number of triangular planes, facilitates data handling. The file format may be of course selected from available file formats general-purpose file formats such as DXF, IDES, STEP and file formats exclusive to specific application software such as DWG, DWF, CDR and AI. It is practicable to enclose a file converter for converting a three-dimensional profile data file into a STL data file. The three dimensional data setting program reads in the STL data file of three-dimensional profile.

Figure 55:
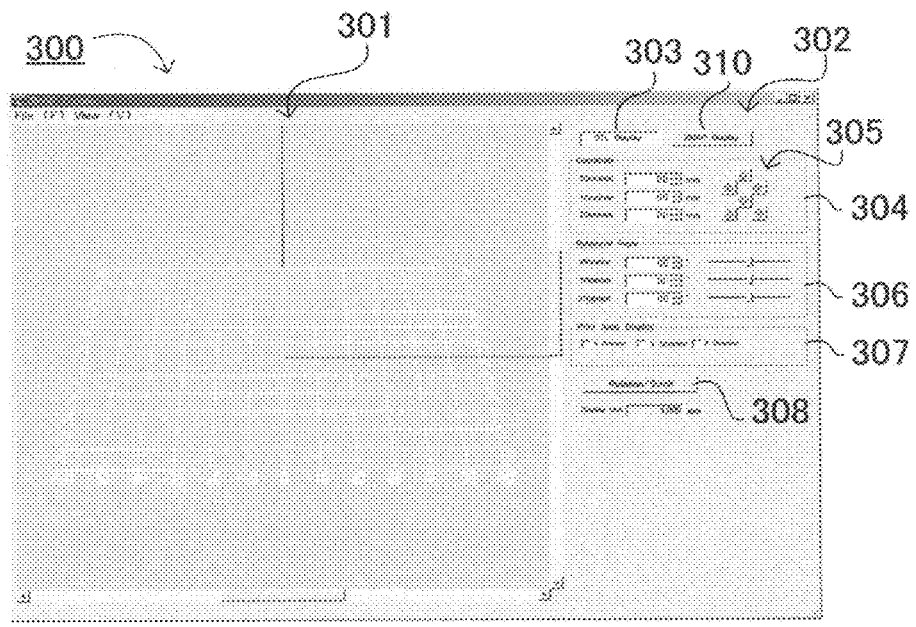
FIG. 55 is a photographic illustration of the edit display window for editing ZMAP data.
Figure 56:
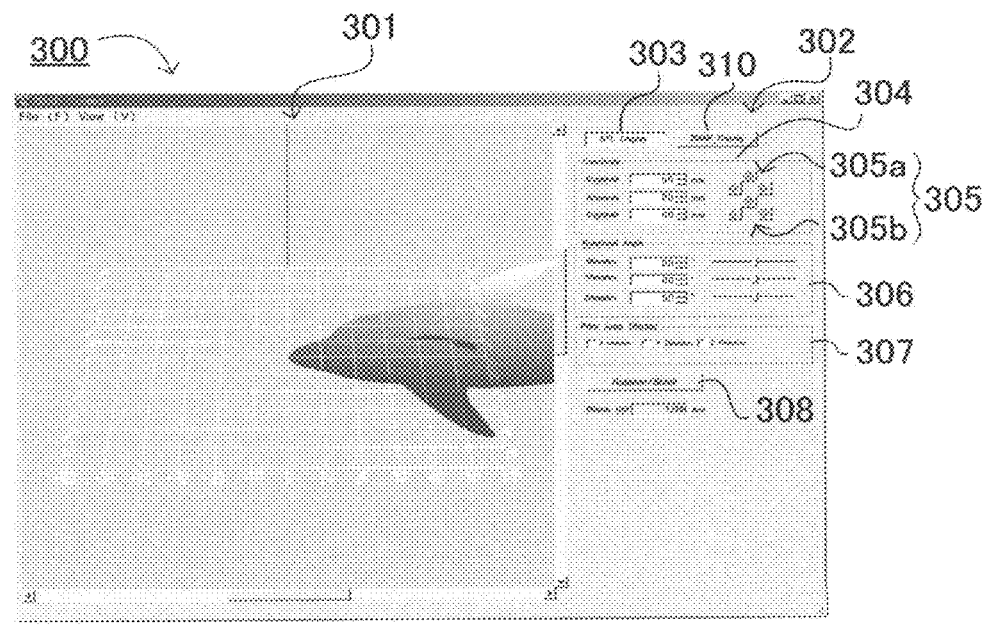
FIG. 56 is a photographic illustration of the edit display window in which an STL data file is opened.
Figure 57:
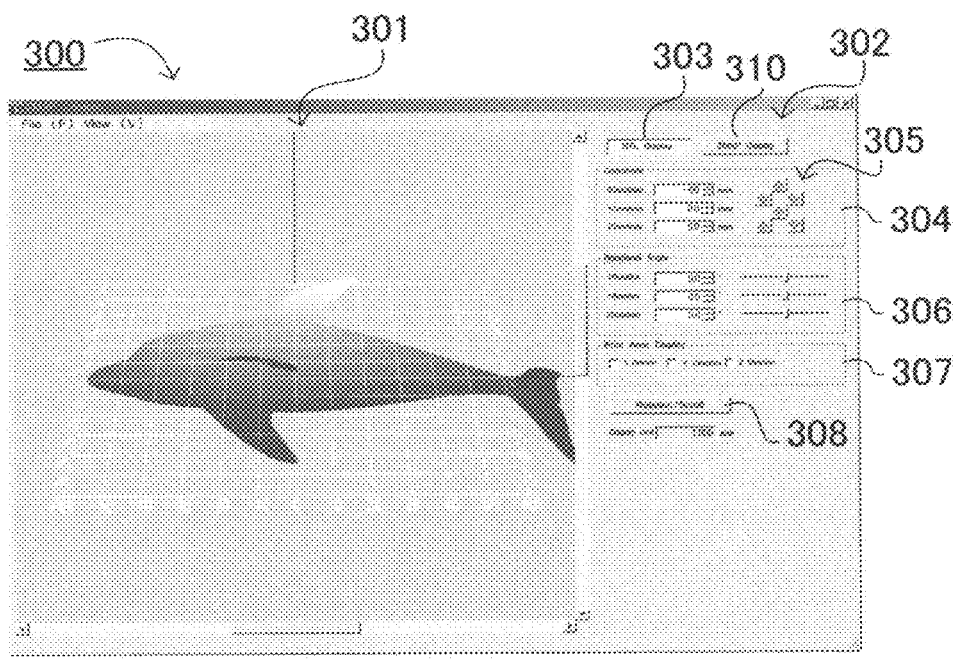
FIG. 57 is a photographic illustration of the edit display window in which a representation of three dimensional data is moved in an X-axis direction.
Figure 58:
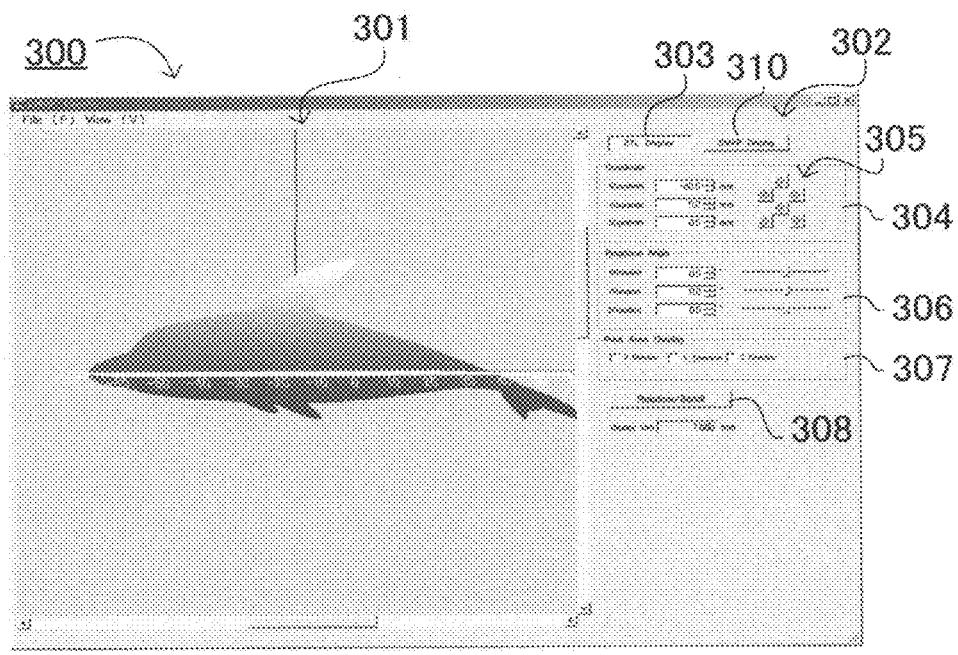
FIG. 58 is a photographic illustration of the edit display window in which the representation of three dimensional data is viewed in a different view point.
Figure 59:
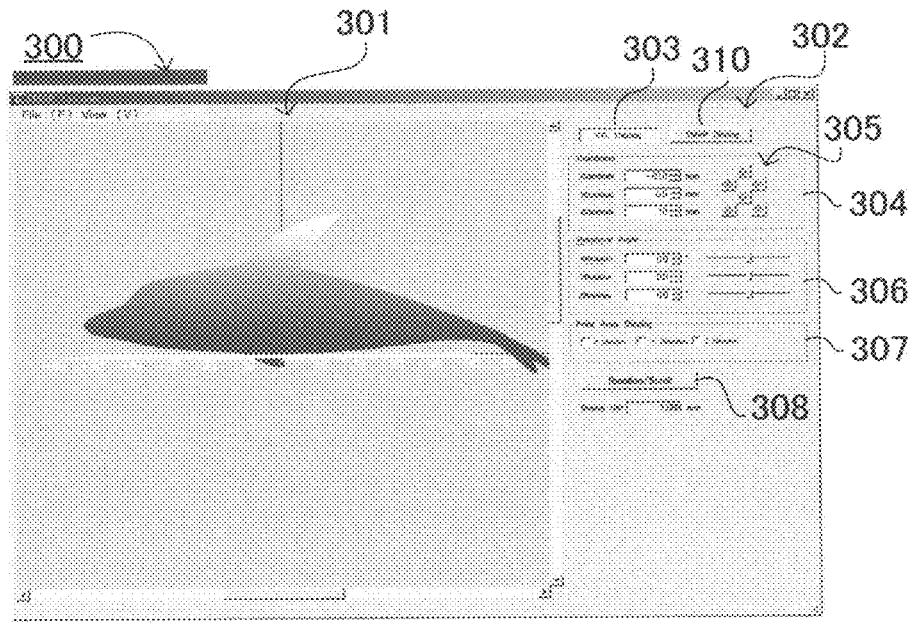
FIG. 59 is a photographic illustration of the edit display window in which a representation of three dimensional data is moved to a positive side in a Z-axis direction.
Figure 60:
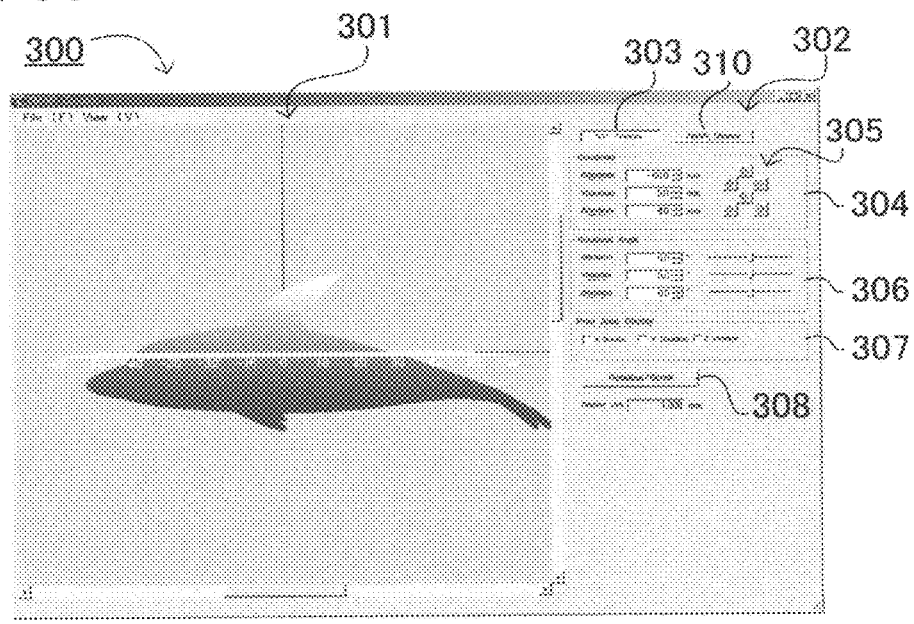
FIG. 60 is a photographic illustration of the edit display window in which a representation of three dimensional data is moved to a negative side in a Z-axis direction.
Figure 62:
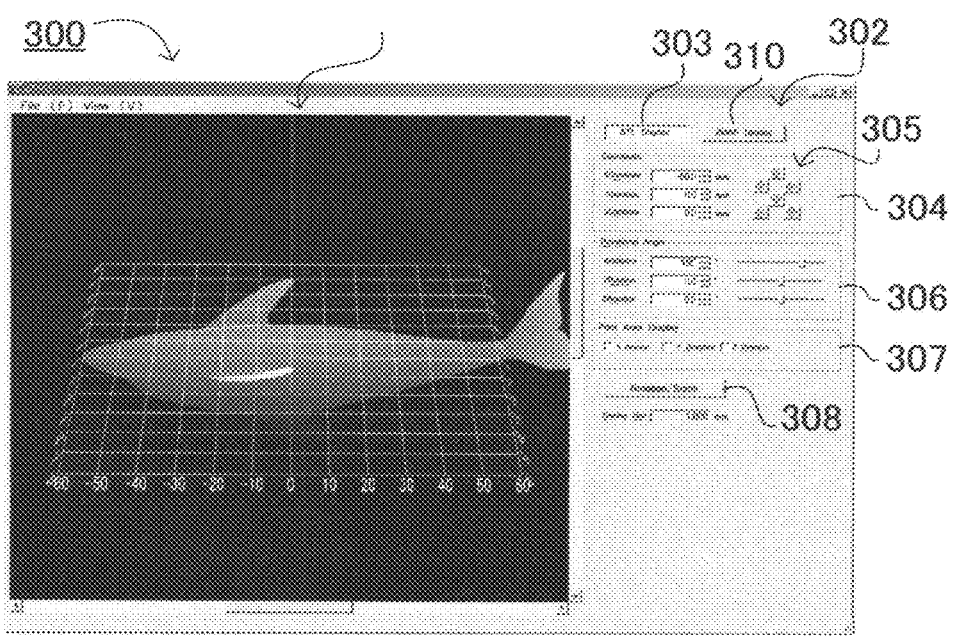
FIG. 62 is a photographic illustration of the edit display window in which a representation of three dimensional data is rotated around an X-axis.
Figure 63:
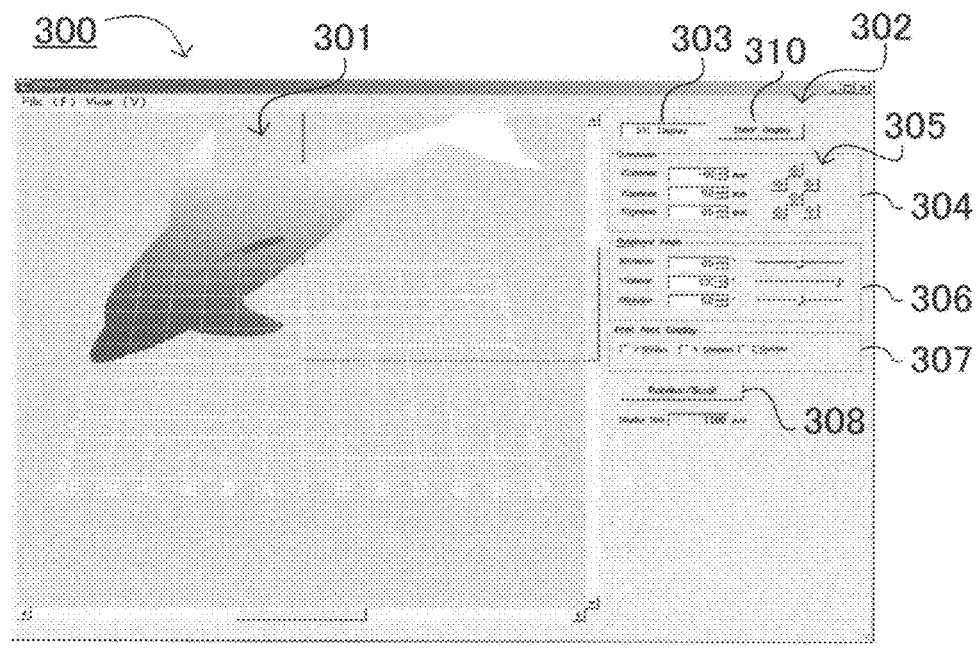
FIG. 63 is a photographic illustration of the edit display window in which a representation of three dimensional data is rotated around a Y-axis.
Figure 64:
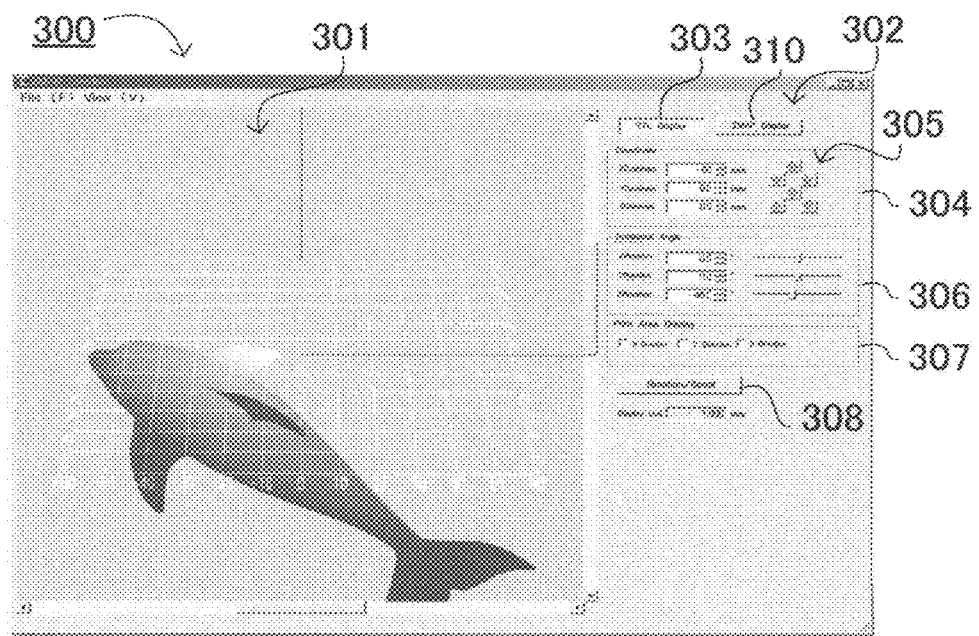
FIG. 64 is a photographic illustration of the edit display window in which a representation of three dimensional data is rotated around a Z-axis.

When choosing a "ZMAP Edit" command in an edit menu, a ZMAP edit window 300 appears in the screen as shown in FIG. 55. The ZMAP edit window 300 includes a view window 301 at the left-hand side which displays a three dimensional representation of three-dimensional profile data and a Posture Adjustment dialog box 302 at the right-hand side in which a posture of the three dimensional representation to be displayed in the view window 301 is specified. When choosing an "Open STL File" command in a file menu, an STL File select dialog box opens. Then, the user specifies a disk to open a list of STL files in the dialog box and specify an STL file which the user wants. FIG. 56 shows the ZMAP edit window 300 with the specified STL file opening in the view window 301. In this state, a STL Display button 303 is made pressed to indicate that the specified STL file is displayed in the view window 301. In this embodiment, a default position of a three-dimensional profile data is such that an extreme end of a representation of the three-dimensional profile data is at original coordinates. However, it is allowed to change the default position. The representation (object) can be displayed in a desired posture which the STL data file is wanted to be converted into a ZMAP data file by changing parameters (coordinates and angles of rotation) for defining a posture of a representation of the STL data file. For example, when specifying −60 mm in an X Coordinate box 304 in the Posture Adjustment dialog box 302 shown in FIG. 56, the object translates −60 mm left in the view window 301 in an X-Y coordinate plane as shown in FIG. 57 and or in X-Z coordinate plane as shown in FIG. 58. In the same way, the object translates 10 mm vertically up as shown in FIG. 59 or down as shown in FIG. 60 by specifying 10 mm or −10 mm in a Z Coordinate box 304 in the Posture Adjustment dialog box 302 shown in FIG. 58, respectively. Further, the object translates 50 mm upward as shown in FIG. 61 by specifying 50 mm in a Y Coordinate box 304 in the Posture Adjustment dialog box 302 shown in FIG. 57. X, Y and Z coordinates are specified by entering numeral values in the X, Y and Z Coordinate boxes 304, or otherwise by using scroll arrow keys 305, respectively. X and Y coordinates are changed by up and down and right and left arrow keys 305*a* arranged crosswise, and a Z coordinate is changed by up and down scroll arrow keys 305*b*. In this way, the user can visually confirm the object moving it in the view window 301. In addition, the object can be rotated independently around X-, Y- and Z-axes in view window 301 by specifying angles of rotation in a Rotational Angle dialog box 306 in the Posture Adjustment dialog box 302 as shown in FIGS. 62, 63 and 64, respectively. Angles of rotation around X-, Y- and Z-axes are specified by entering numeral values in the X, Y and Z Rotation boxes 306, or otherwise by using scroll slide keys 305, respectively.

Figure 65:
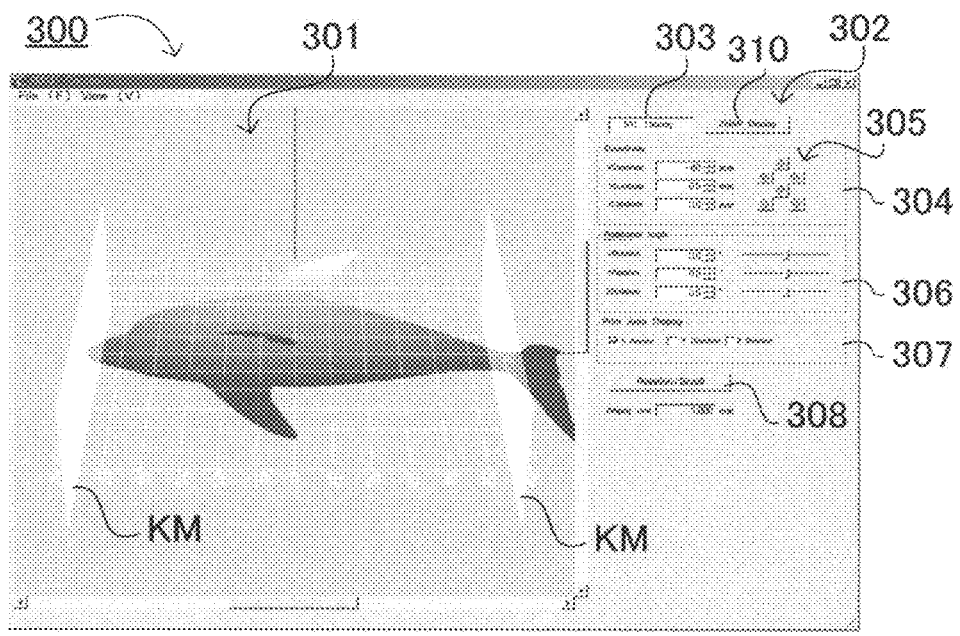
FIG. 65 is a photographic illustration of the edit display window in which boundary representations are displayed to indicate a printable zone in an X direction.
Figure 66:
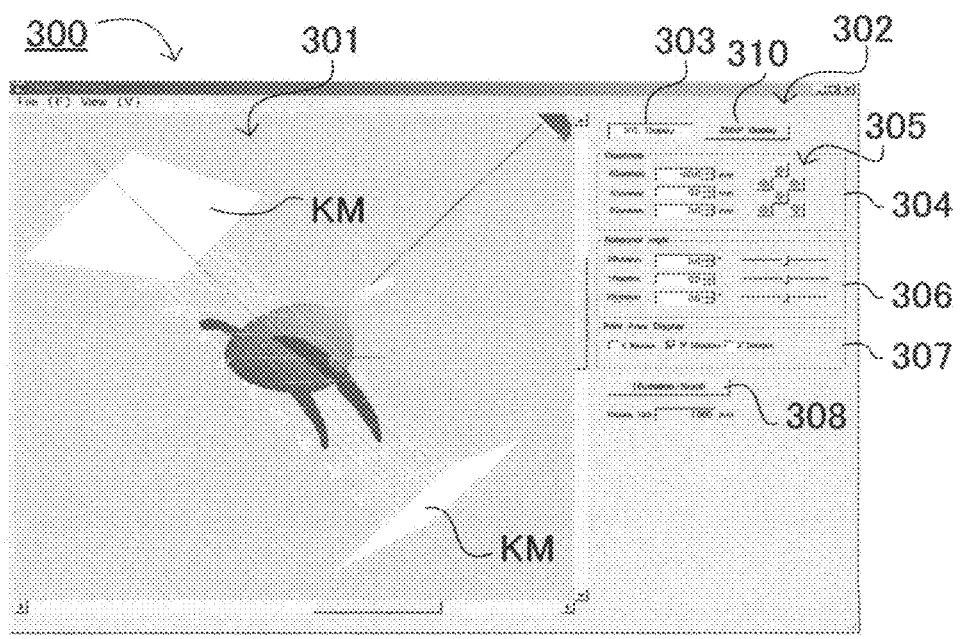
FIG. 66 is a photographic illustration of the edit display window in which boundary representations are displayed to indicate a printable zone in a Y direction.
Figure 67:
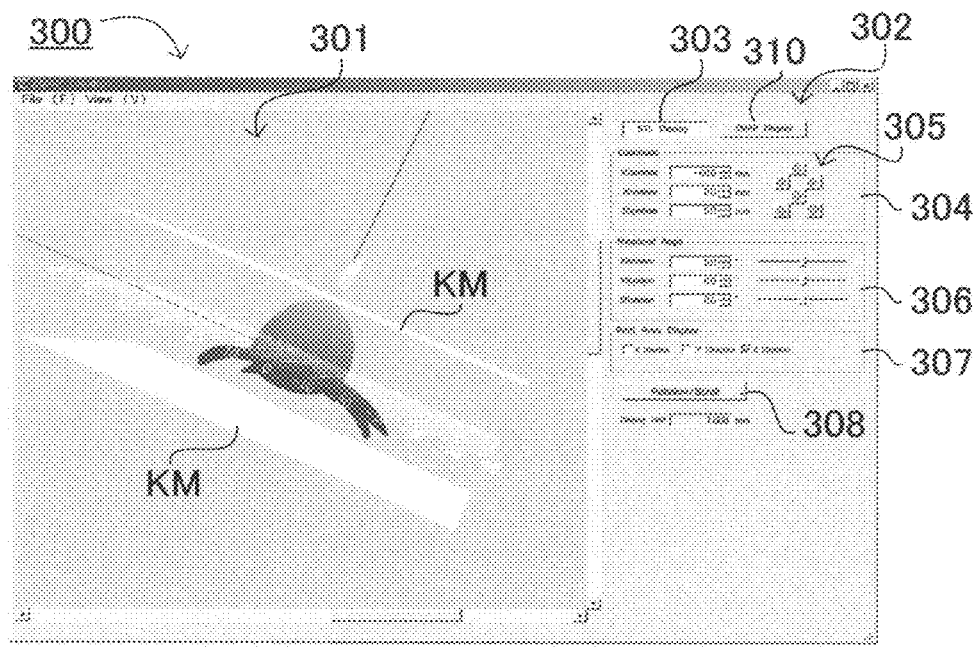
FIG. 67 is a photographic illustration of the edit display window in which boundary representations are displayed to indicate a printable zone in a Z direction.

As shown in FIGS. 65, 66 and 67, it is practicable to display boundary representations KM for indicating printable zones in X, Y and Z directions in the view window 301. The boundary representations KM indicating X, Y and Z directional printable zones are displayed by choosing X, Y and Z direction check boxes in a Printable Zone Display dialog box 307. The X, Y and Z directional printable zones can be displayed independently or concurrently. This boundary representing function enables users to visually ascertain whether a representation of the three dimensional data falls in X, Y and Z printable zones adjusting a layout of the object. In this instance, a view point can be changed by scrolling the view window 301 and/or rotating an object in the view window 301. For this purpose, scroll bars of the view window 301 are functionally altered between view window scrolling and object rotation. This functional alteration of the scroll bars is performed by enabling a Rotation/Scroll button 308. Further, the ZMAP edit window 300 may have a simple function of modifying a STL data file such as alteration of expansion/contraction ratio, trimming and the like.

Figure 68:
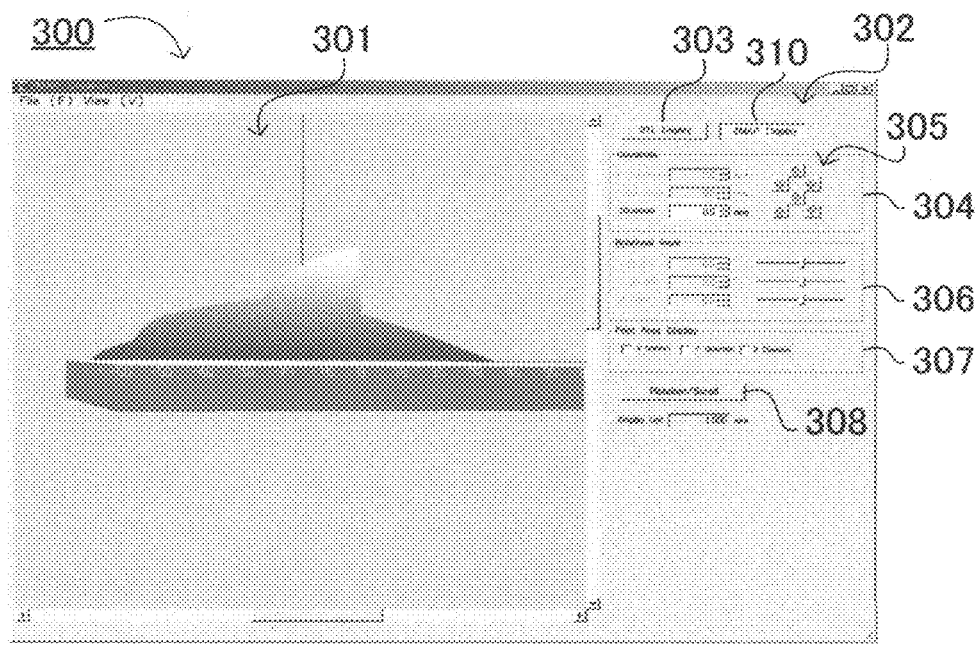
FIG. 68 is a photographic illustration of the edit display window in which a representation ZMAP data to which the STL data shown in FIG. 58 is converted.
Figure 69:
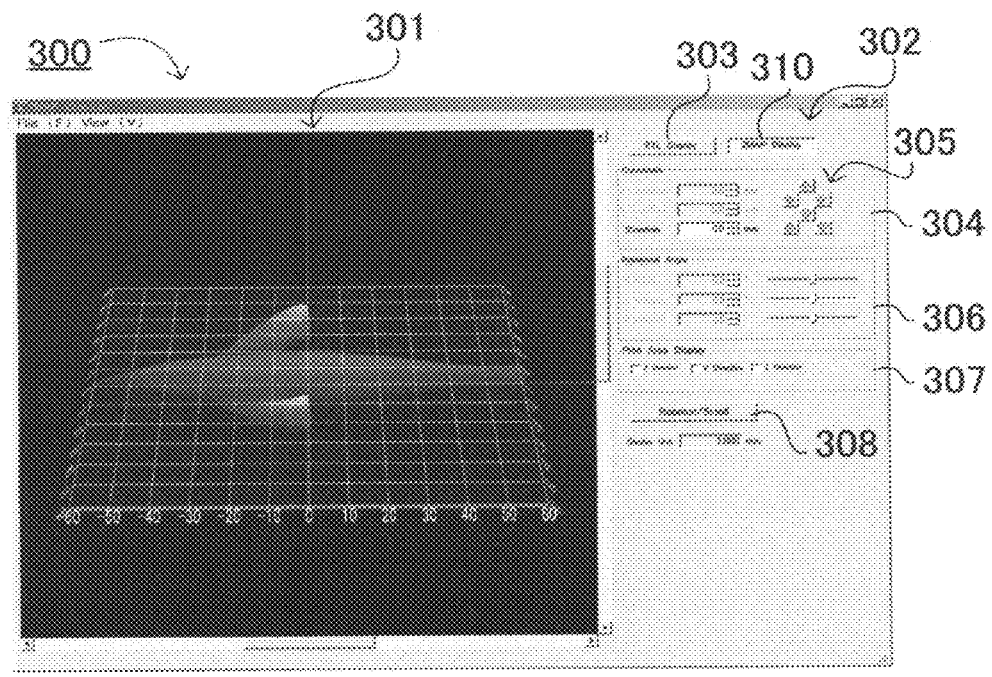
FIG. 69 is a photographic illustration of the edit display window in which a representation ZMAP data to which the STL data shown in FIG. 62 is converted.

When a posture of the representation of the three dimensional profile data is determined, the profile data is converted into a ZMAP data file. Specifically, when clicking and enabling a ZMAP Display button 310 in the Posture Adjustment dialog box 302, a confirmation dialog box appears to seek confirmation as to a conversion into a ZMAP data file. In this confirmation dialog box, an inquiry "Convert into ZMAP. Approve ?" is shown. When choosing an OK button for approval, STL data file is converted into to a ZMAP data file and, as a consequence, a ZMAP data file representing an object such as shown in FIG. 68 is created. Since the ZMAP data file contains information about height representing one Z coordinate for X and Y coordinates of a point in an X-Y coordinate plane, data representing a portion of the object below the X-Y coordinate plane is lost, so that only a portion of the object above the X-Y coordinate plane is displayed as shown in FIG. 68. Because the laser processing system is incapable of processing the back side of a work, only data representing an upper half of the work is sufficient. However, when it is required to print the backside of a work, the three dimensional profile data shown in FIG. 62 is rotated around, for example, the X-axis by 180° so that the object turns upside down as shown in FIG. 62 and then converted into ZMAP data shown in FIG. 69. While the view window 301 is in the state of ZMAP display, the ZMAP Display button 310 remains pressed until it is pressed and disabled. As a consequence, the ZMAP Display button 310 serves both as a command button for execution of data file conversion and a label indicating a content displayed in the view window 301. When the STL Display button 303 is pressed and disabled while the ZMAP Display button 310 remains enabled, the display in the view window 301 returns from a representation of the ZMAP data to a representation of the STL data display. Accordingly, the STL Display button 303 allows users to cancel and redo operation of data conversion, and to save the STL data file. After confirming it on the view window 301 that the three dimensional ZMAP data correctly represents an intended work surface, the ZMAP data file is saved in a desired directory by choosing a Save As ZMAP command in the file menu and naming it. In this way, a print pattern is three-dimensionally converted by specifying the ZMAP data as three dimensional data representing a print area.

Figure 49:
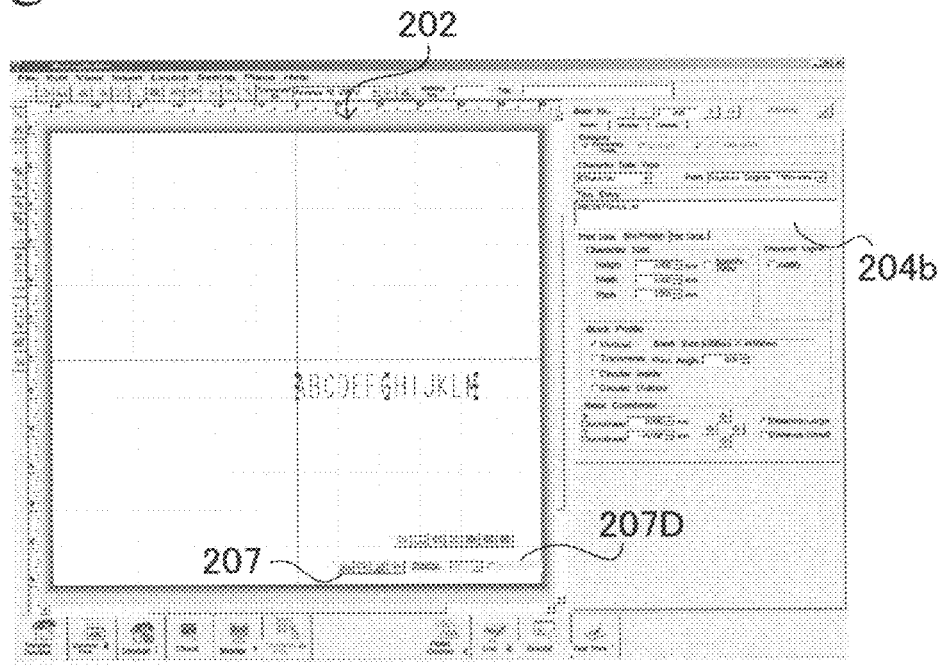
FIG. 49 is a photographic illustration of the edit display window for entering information about a two-dimensional print pattern.
Figure 50:
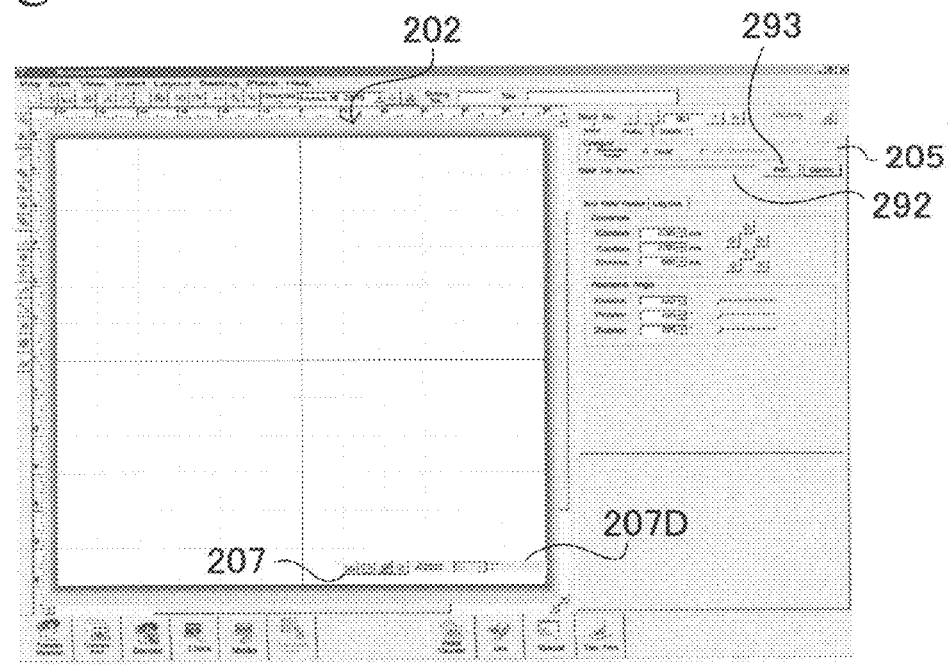
FIG. 50 is a photographic illustration of the edit display window in which a ZMAP data file is specified.
Figure 51:
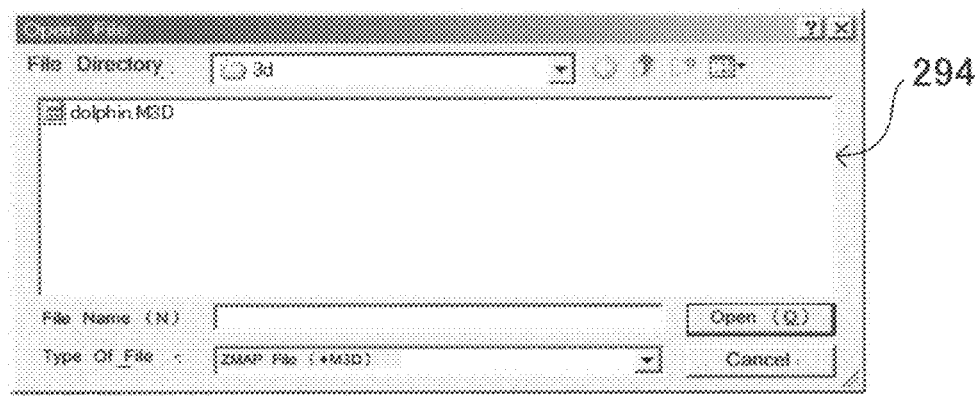
FIG. 51 is a photographic illustration showing a ZMAP data file selection window.
Figure 70:
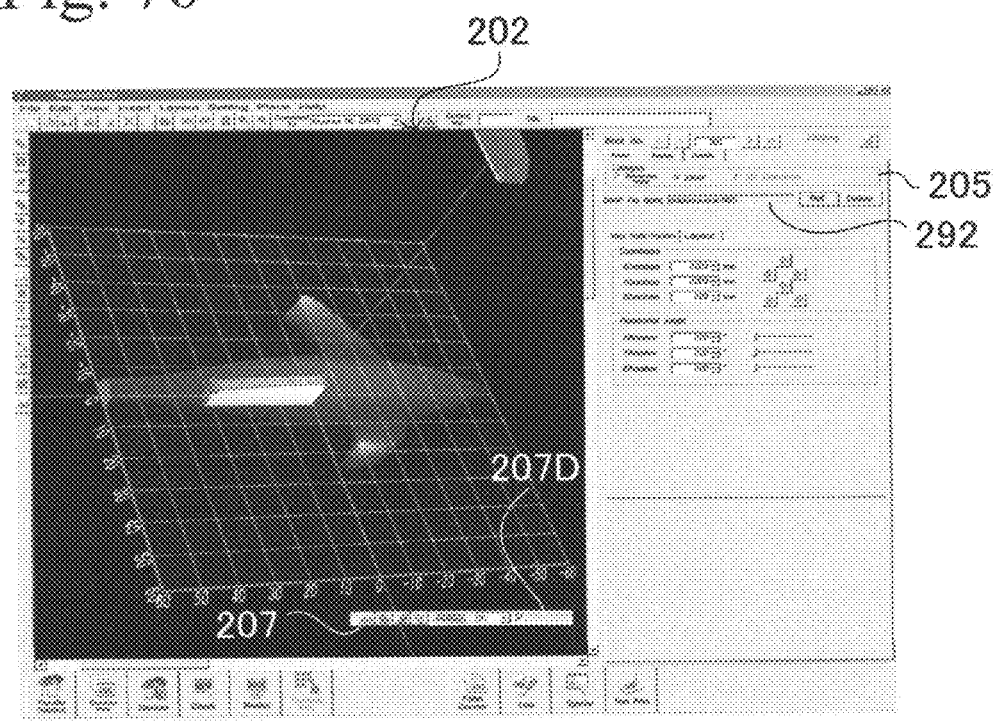
FIG. 70 is a photographic illustration of the edit display window in which a print pattern is transformed with the ZMAP data.

The three-dimensional conversion of a print pattern based on a specified ZMAP data is achieved as follows. After entering a character string "ABCDEFGHIJKLM" in the Text box 204*b* as shown in FIG. 49 and choosing ZMAP in the Print Category box 205 as shown in FIG. 52, a desired ZMAP data file (dolphin M3D) is chosen by specifying its file name in the ZMAP File Name box 292. As a consequence, the print pattern, i.e. the character string "ABCDEFGHIJKLM" is changed in three dimensions. At this time, the character string "ABCDEFGHIJKLM" is still displayed in A X-Y coordinate plane as shown in FIG. 52. When choosing the View button 207, the edit display window 202 is altered from the 2D view mode to the 3D view mode so as thereby to display the print area in three dimensions as shown in FIG. 53. In this way, the print pattern is mapped on the print area so as to equal out in appearance with the print pattern viewed from above shown in FIG. 52. Further, when enabling the ZPAP Display command box 207D, view window 301 displays the work defined by the ZMAP data in three dimensions with a three dimensional profile of the print pattern overlapped thereon as shown in FIG. 54. Similarly, when choosing a ZMAP data file representing a work upside down shown n FIG. 69, the print pattern is three dimensionally changed as shown in FIG. 70. In this way, the view window 301 can be altered from a display of the print area only to a display of the overall profile of the work, and vice versa, during setting operation. The user can adjust a position of the three dimensional data in which the print pattern is pasted.

When displaying a printing area specified on a three-dimensional work surface in three dimensions together with the work surface profile, it is visually checked up whether the printing area falls in an appropriate printable location relative to the work surface. A work surfaces is differently colored between a work surface area upon which a laser beam impinges at angles in a predetermined range for appropriate print quality (a printable work surface area) and a work surface area upon which a laser beam impinges at angles and is expected to be printable but defective in print quality (a defective printable work surface area). Specifically, the printable work surface area remains uncolored, and the defective printable work surface area is colored red. In this way, it is visually checked up on whether a specified print area falls thoroughly within a printable work surface area and which part of a specified print area cuts across a defective printable work surface area even partly. In the case where a work surface including a print area is at a far side from laser irradiation, the print area is hidden in the edit display window 202 in the 3D edit mode so as thereby to indicate that the specified print area is unprintable (an unprintable work surface area). This function signals the user a relative position of the work print area with respect to a work surface and prompts the user to correct the print area. This function is not linked to the above means. Any visual checking means known to those skilled in the art can be available for indicating a printable work surface area, a defective printable work surface area and an unprintable work surface area. For example, these work surface areas may be indicated by text messages on the edit display window 202, by voice messages or by an alarm. It is practicable to indicate one of the three situations, for example an unprintable work surface area, which the user wants to know.

In this instance, an incident angle of laser beam which distinguishes a printable work surface area and a defective printable work surface area from each other is specified by a default initial angle, or otherwise may be specified by entering another angle in an entry box additionally provided in the edit display window 202. Specifically, laser processing of a work surface is limited and made difficult depending upon irradiation angles and lowers its precision as an irradiation angle θ with a normal line of the work surface comes close to 90°. A critical irradiation angle or higher limit angle (processing limitation angle) is ordinarily fixed to 60° and may be, however, adjusted by the user.

In this way, it arises in three-dimensional printing according to work profiles and relative position between a work surface and a laser beam that some work surface areas are unexposed or only insufficiently exposable to the laser beam, in other words, unprintable or only defectively printable. Therefore, it is practicable to calculate a printable work surface area based on these factors and to caution the user to try another setting when representation of laser printing data falls within an unprintable work surface area. This calculation is performed in the arithmetical and logic unit 80. The arithmetical and logic unit 80 enables the defective surface area detection means 80B to detect a defective work surface area by performing calculations, the processing condition adjusting means 80C to adjust printing conditions so as to make the defective printable work surface area well printed, the highlighting means 80I to highlight the defective printable work surface area detected by the defective surface area detection means 80B so as thereby to display it differently from a printable work surface area, and the warning means 80J to provide a warning that a print pattern set by the processing condition setting means 3C cuts across even partly a defective printable work surface area.

The highlighting means 80I highlights a defective printable work surface area of a work surface in the edit display window 202. As shown in FIG. 39, a work surface area close to a root of a columnar work surface which is only defectively printable due to a narrow angle of a laser beam incident thereupon is displayed in red. Further, an unprintable work surface area is a work surface area which is at a far side from laser irradiation and, thus, isolated from laser irradiation. The defective printable work surface area and the unprintable work surface area are calculated by defective surface area detection means 80B. When a specified print pattern cuts across even partly an unprintable work surface area and is consequently unprintable, the warning means 80J makes the print pattern disappear from the edit display window 202 so as thereby to prompt the user to try another layout. For example, the warning means 80J makes a print pattern hidden when the print pattern cuts across even partly a work surface area specified at a far side from laser irradiation and displays a print pattern in red when it falls on a defective printable work surface area. In this way, work surface areas are categorized not simply by printable and unprintable, but a plurality of grades of print quality such as good quality, flawed quality and unprintable. This categorization of work surface area provides the user with detailed information about layout.

Figure 72:
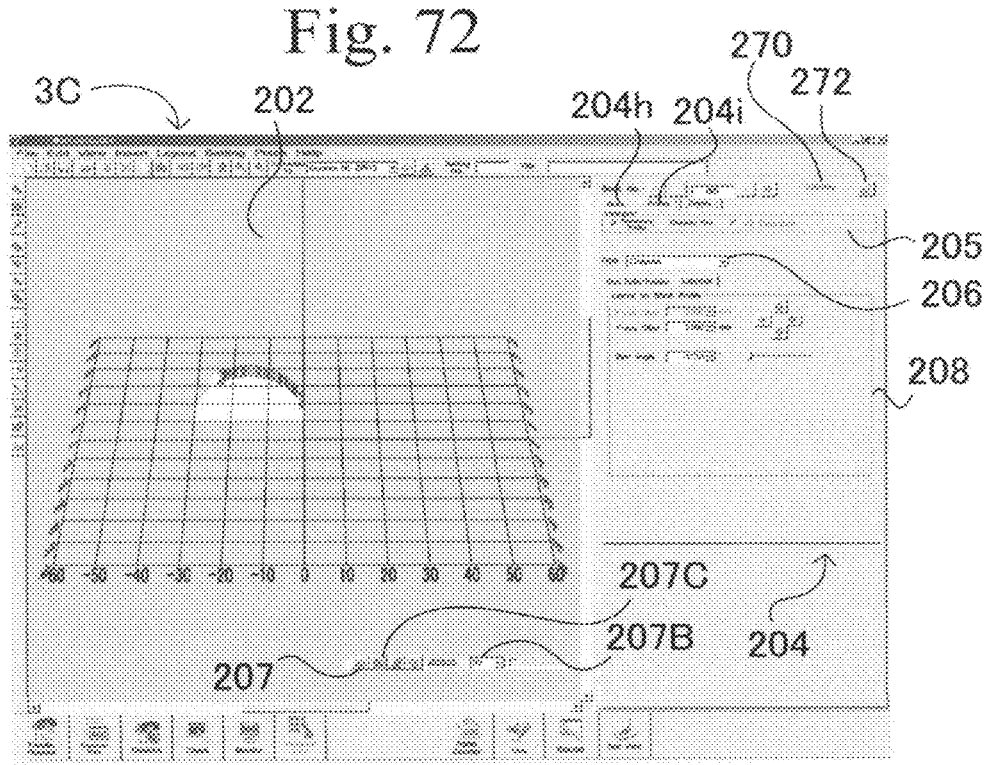
FIG. 72 is a photographic illustration of the edit display window in a 3D edit mode shown in FIG. 71 in which a print pattern adjusted in print start angle is displayed.

FIGS. 71 and 72 show print patterns, i.e. barcodes K which cut across even partly unprintable work surface areas. Therefore, the warning means 80J hides the print pattern in the edit display window 202. In this event, the printing position is adjusted so as to lay the print pattern in a printable work surface area. On that account, as shown in FIG. 71, the 3D Setting tab 204i is enabled to open the Layout dialog box 208 in which a print start angle is changed from −90° (a default angle) to −120°. As a result, the barcode is displayed as shifted as shown in FIG. 36. In this way, a print pattern is set up by adjusting a print start position, a work surface area, a narrow space width, a bar thickness and the like so as thereby to be accurately printed. This adjustment may be performed not manually but automatically by the processing condition adjusting means 80C.

Figure 73:
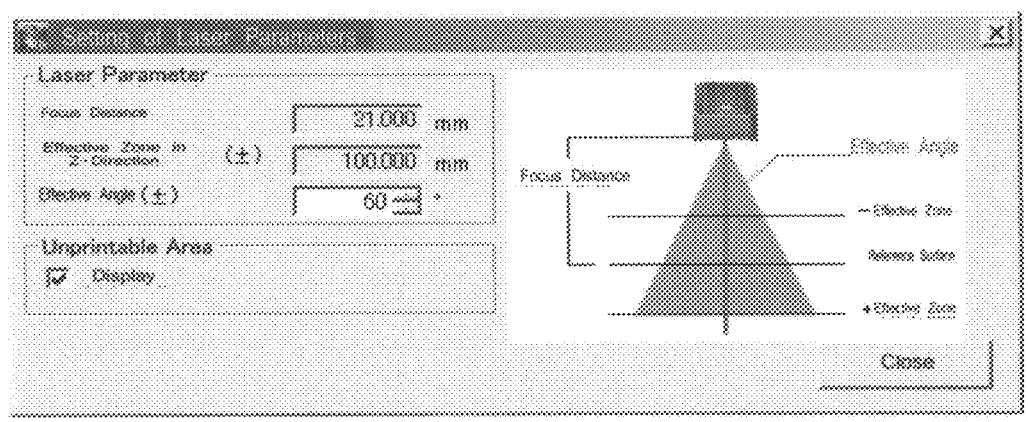
FIG. 73 is a photographic illustration showing printing a laser parameter setting dialog box.

Referring to FIG. 73 shows a Settings dialog box for setting laser parameters in which the function of highlighting an unprintable work surface area by the highlighting means 80I can be enabled and disabled. The function of displaying an unprintable work surface area is disabled by clearing an Enable Unprintable Work Surface Area Display check box in the Settings dialog box. In the Settings dialog box, laser parameters such as a focal distance, an effective range in a Z direction and an effective angle (a critical irradiation angle) are checked up on and adjusted as appropriate. In addition, a printable work surface area can be specified in size and position when a defective printable work surface area and an unprintable work surface area are detected by the defective surface area detection means 80B. On that account, the warning means 80J is enabled to display data on coordinate limits of a work surface area and a maximum printable size in the display unit 82. A numerical display of settings can be utilized as an indicator of resetting by the user and provide easy-to-operate circumstances.

The warning means 80J hides a print pattern in the an object display section 83 when the print pattern detected by the defective surface area detection means 80B cuts across at least partly a defective printable work surface area. In the past, in order to ascertain that printing work will not be performed correctly by a laser processing machine capable of processing in three dimensions due to improper printing conditions, the only way was to actually print for visual checking, or otherwise, a way to ascertain printability by the controller of a laser marking machine after transferring data on printing conditions into the memory of the controller and extracting the data. Printing conditions are determined by specifying a profile of work (e.g. column, cone, sphere, etc.) and a print pattern (e.g. a character string) to be printed on the work. Since a printable pattern size (printable work surface area) depends on parameters such as a work size and a diameter, it is necessary to specify a print pattern smaller than these parameters. However, in the past, users could not know whether a print pattern falls within a printable work surface area during printing conditions setting operation, and, as a consequence, the best the user could do was to check for errors only after transfer and extraction of data on the printing conditions which are determined by specifying a work profile and a print pattern. Since transfer and extraction of data is a somewhat time consuming operation, the conventional approach is inconvenient.

On the contrary, according to the present invention, the warning means 80J realizes the function of informing the user whether printing is possible or not and whether the print result will be good or bad during printing conditions setting operation. Practical informing means is to indicate a printable pattern size at the instant of specifying a work profile, a print pattern size at the instant of setting it, or a work profile and a print pattern combined together.

Figure 74:
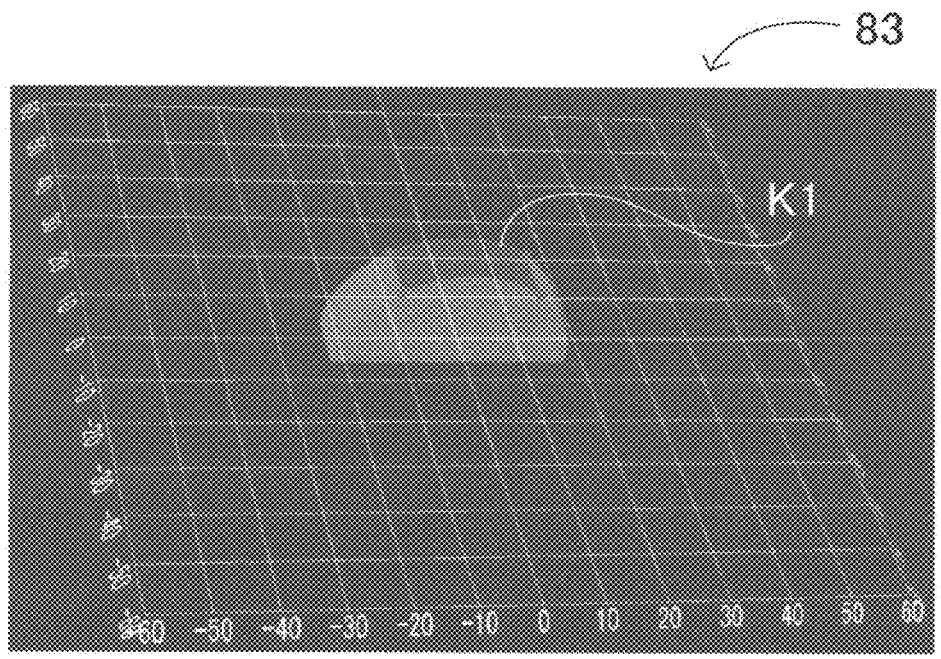
FIG. 74 is a photographic illustration showing a printable print block on a work.

FIG. 74 shows an example of a representation of a printable pattern size in the object display unit 83 at the instance of specifying a column as a work surface area. Therein print will be degraded due to a narrow incident angle at which a laser beam impinges and is detected as a defective printable work surface area by the defective surface area detection means 80B and displayed in red by the highlighting means 80I. Coincidentally, a printable work surface area is displayed by a frame K1 showing a pattern size printable on a columnar work surface by the warning means 80J. The frame K1 can be represented by a line different in color, thickness and/or style from an object for enhanced visibility and distinction of the printable work surface area.

Figure 75:
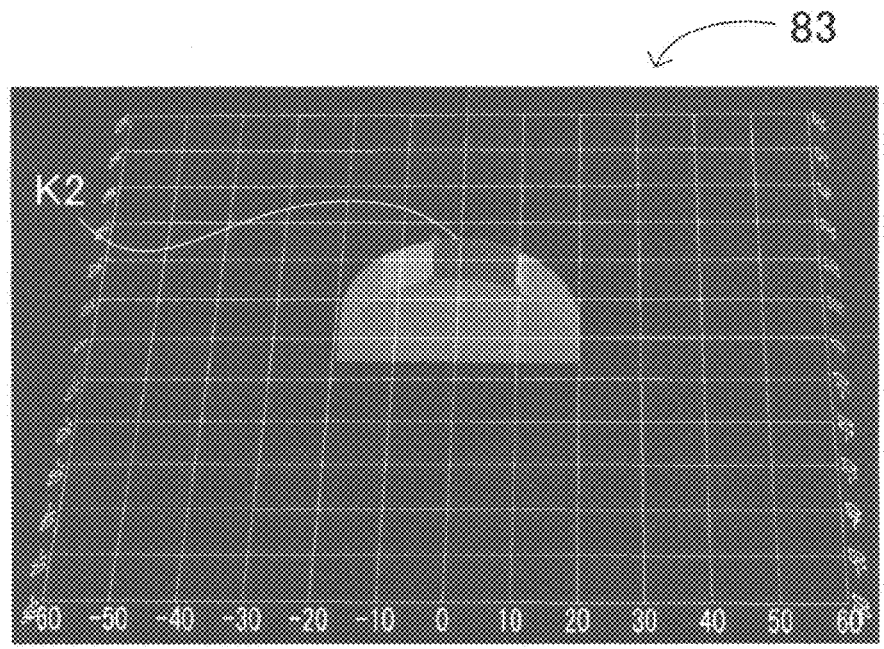
FIG. 75 is a photographic illustration showing a user specified print pattern.

FIG. 75 shows an example of a representation of a print pattern size in the object display section 83 at the instance of specifying it. When a size of a print pattern is specified by the user, a frame K2 having the same size as the print pattern is displayed on a work surface. Accordingly, a print pattern size currently specified is reflected in the representation in the object display section 83 for immediate visual checking. It is checked up by the user that there is no mixture between the defective printable work surface area colored red and the frame K2 and that print is expected to be made appropriately.

Figure 76:
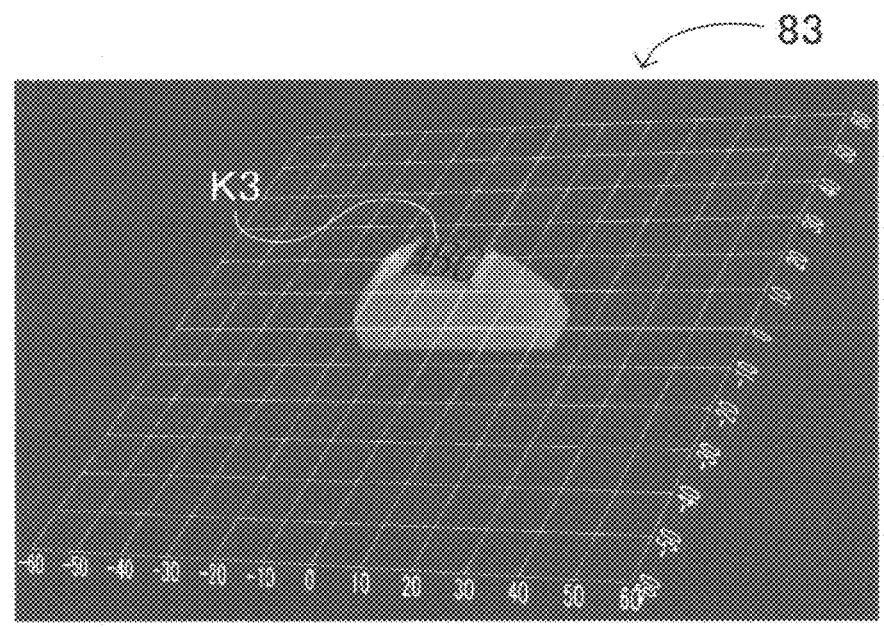
FIG. 76 is a photographic illustration showing a print pattern and a pattern size.
Figure 77:
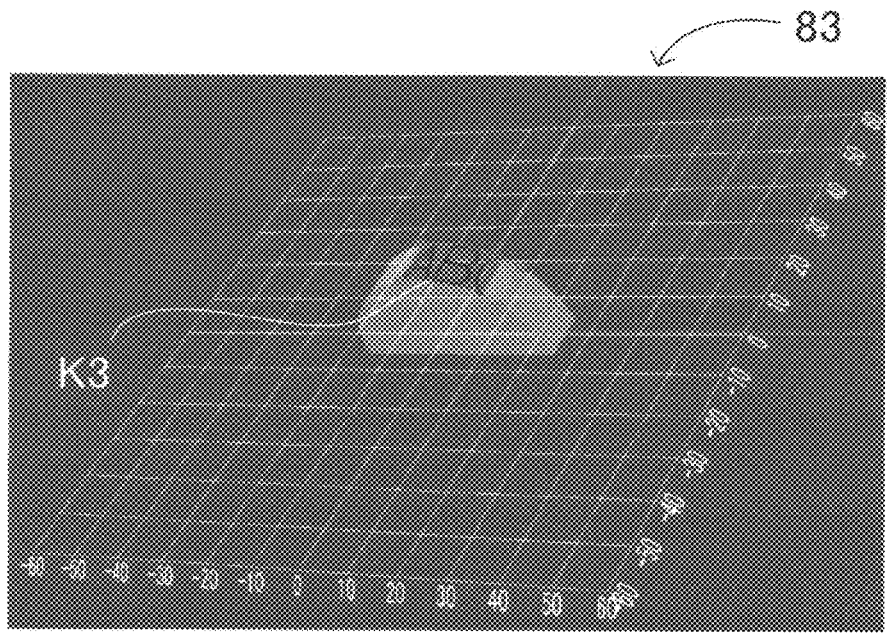
FIG. 77 is a photographic illustration showing a print pattern cutting across a defective work surface area.
Figure 91:
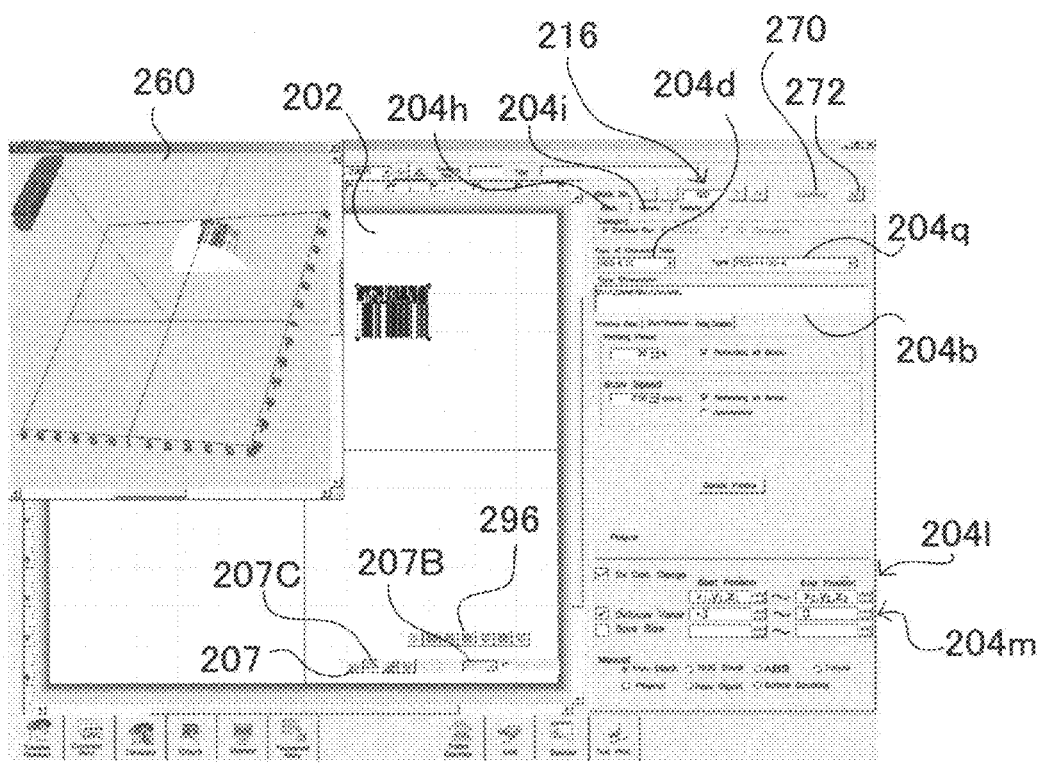
FIG. 91 is a photographic illustration of the edit display window in which a defocus distance setting dialog box is chosen.

FIGS. 76 and 77 show examples of representations of a print pattern and a work surface in combination in the object display section 83. Because the representation includes a print pattern, such as a character string "ABC", as well as a frame K3 indicating a print pattern size, the user can ascertain a virtually printed print pattern with enhanced visibility. In FIG. 75, it is checked up that the character string "ABC" in the frame K3 does not cut across even partly the defective printable work surface area colored red. On the other hand, in FIG. 77, it is checked up that the character string "ABC" in the frame K3 cuts across even partly the defective printable work surface area colored red. When such an interference between a print pattern and a defective printable work surface area occurs, it is practicable to display a text message as shown in FIG. 91.

Figure 78:
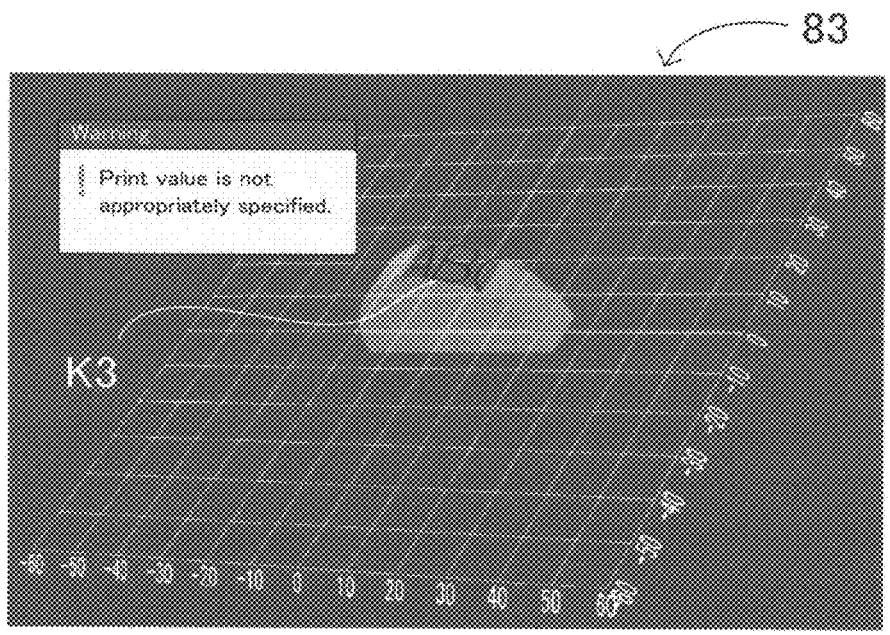
FIG. 78 is a photographic illustration showing a warning message on a screen.
Figure 79:
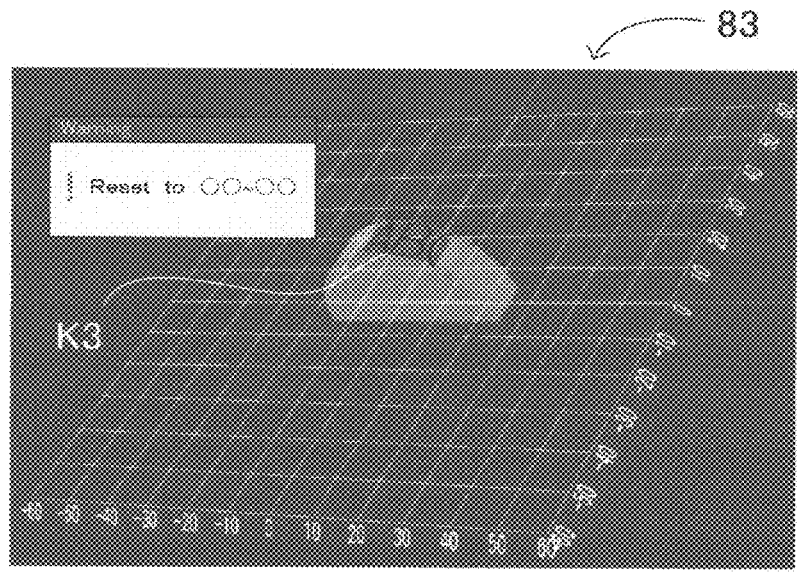
FIG. 79 is a photographic illustration showing a guidance message on a screen.

Referring to FIG. 78, the warning means 80J displays a precomposed written message such as "Caution: Printing conditions you set are improper" in the object display section 83. It is practicable to indicate recommendable values for another setting. FIG. 79 shows an example of a directive written message such as "Caution: Set between ○○~○○" for a guide to appropriate settings. Examples of the directive written message include "Caution: Set printing position between ○○~○○", "Caution: Set character size less than ○○" and the like. It is also allowed to use any combination of these directive written messages. These written messages offer a useful guide to another setting and provide easy-to-operate circumstances. These written messages may be of course replaced with voice messages or warning sounds.

The function of the defective surface area detection means 80B shown in FIG. 13A will be described in detail below. It is not improbable that a work surface includes an area where defective processing is made depending upon work profiles, work transfer speeds, scanning speeds of a laser beam. In the case where a processing pattern is accidentally specified in the defective printable area, since there are provided no means for informing of existence of a defective printable work surface area, defective prints and printing errors occur. Therefore, it is essential to carry out visual print quality inspection and withdrawal and disposition of defective works which is quite troublesome and wasteful. For these reasons, in this embodiment, the user is given a warning at the instant of specifying a print pattern that the print pattern is expected to be made, partially or completely, in a defective printable work surface area, or is given a warning that printing errors occur when actually printing. This warning function is realized by the defective surface area detection means 80B. In this instance, the term "defective printable work surface area" which is detected by the defective surface area detection means 80B as used herein includes an "unprintable work surface area." as well as a defective printable work surface area.

Figure 80:
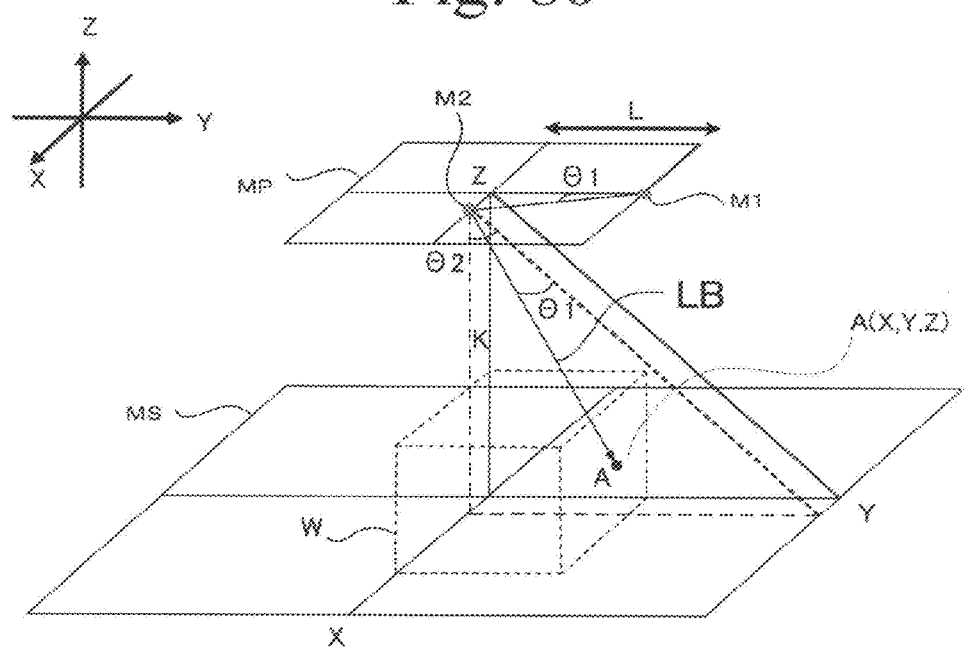
FIG. 80 is a perspective illustration showing a method of detecting a defective processable area by defective area detection means.
Figure 81:
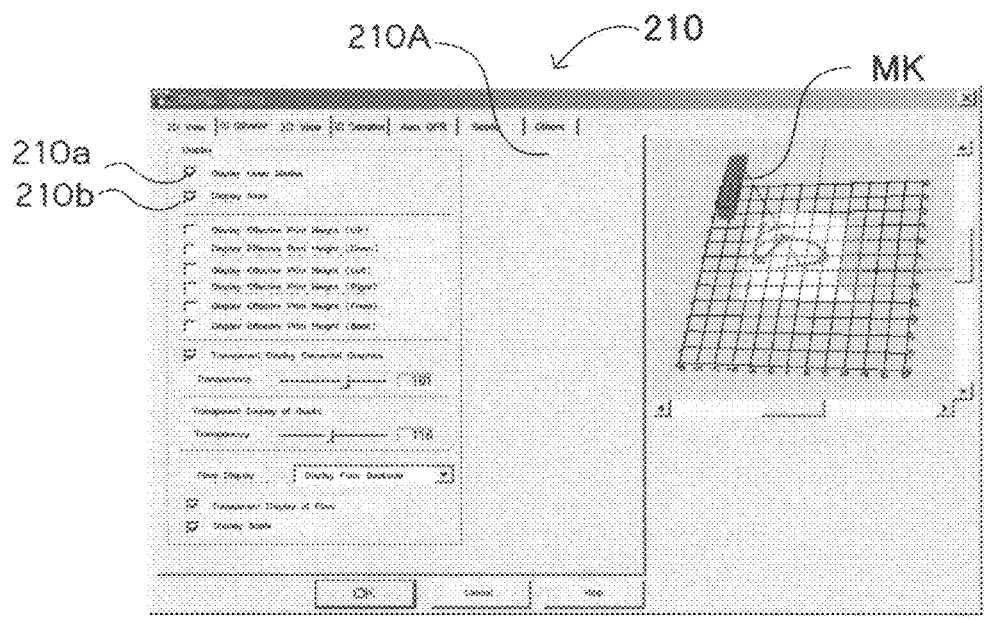
FIG. 81 is a photographic illustration showing an environment configuration window in which a 3D display dialog box is chosen.

FIG. 80 shows how the defective surface area detection means 80B detects a defective printable work surface area of a cubic work W. In this embodiment, a laser beam LB scans a printing plane SP at a fixed distance K from a reflection plane MP. First and second scan mirrors M1 and M2 have axes of rotation coinciding with X- and Y axes of the reflection plane, respectively, are located at a distance L from each other in the Y-direction, and inclined at an angle of θ1 in the X-direction. When focusing the laser beam LB at a point A having coordinates of X, Y and Z, the following equation hold:

$$\tan\theta_1 = X/\{[(Y^2+(K-Z)^2]^{1/2}+L\}$$

where a vector of the laser beam LB is expressed by the following equation:

$$(X-L\tan\theta_1, Y, Z-K)$$

Hence, $$x = Xt - LXt/\{[(Y^2+(K-Z)^2]^{1/2}+L\}+X$$

$$y = Yt + Y$$

$$z = (Z-K)t + Z$$

With the substitution Tan θ₁, x, y and z are expressed as follows:

$$x = (X-L\tan\theta_1)t + X$$

$$y = Yt + Y$$

$$z = (Z-K)t + Z$$

Whether any point A (X, Y, Z) is impinged by the laser beam LB, in other words, whether any point is shadowed from the laser beam LB and involved in a defective printable work surface area, depends on whether lines x, y and z have an intersecting point with the work surface. Therefore, the defective surface area detection means 80B detects a defective printable work surface area by calculating x, y and z from the above equations. Although the above description is directed to the case where the work remains stationary for simplified explanation, the defective surface area detection means 80B is enabled to detect a defective printable work surface area of a work which is moving by performing calculations coupled with a moving distance from time to time.

Concerning defective printing due to difference in scanning speed in X, Y and Z directions, since a Z-axis scan mirror operates at a scan speed relatively lower than X-axis and Y-axis scan mirrors. This fact makes a controversial impact on processing of an inclined work surface. In this case, when inclinations of the X- and the Y-axis with the Z-axis are greater than a predetermined inclination, it is determined that print is expected to be made defective. Defective print due to a difference in scan speed can be eliminated by adjusting printing parameters so as to lower scan speeds of the X- and the Y-scan mirrors. This is because the defective print is caused in some cases by the fact that the Z-axis scan mirror can not follow the Z-axis scan mirror. This scan speed adjustment function can be performed by the processing condition adjusting means 80C.

The processing condition adjusting means 80C calculates available processing conditions based on an angle of inclination of a work surface, a ratio of X·Y component relative to Z component, a scan sped of the Z scan mirror, a moving speed of the work, etc. The calculated processing conditions can be displayed on the display unit 82. The user can try another setting in reference to the calculated conditions. Otherwise, the processing condition adjusting means 80C may be adapted to specify processing conditions automatically. In this case, since processing conditions are collectively specified, the user is less pressed to specify processing conditions and precise processing is realized irrespective of a defective printable work surface area. Similarly, in the case where defective print occurs due to variations in scan speed of X- and Y-scan mirrors, the defective print can be eliminated by harmonizing the scan speeds of the scan mirrors with one another.

When the defective surface area detection means 80B detects a defective printable work surface area, the highlighting means 80I displays a defective printable work surface area and a printable work surface area differently so as to enable the user to get hold of the defective printable work surface area visually. In order to display these defective printable work surface area and printable work surface area differently, it is practicable to display the individual work surface areas in a linear gradient pattern, a gray scale pattern, a shading pattern or the like, as well as differing in color, for distinction between them. When printing by use of a palette, defective printable work surface areas differ from one another according to works as shown in FIG. 71. In such a case, the defective surface area detection means 80B detects a defective printable work surface area by work by performing calculations, so that the defective printable work surface area is distinctly displayed on the display unit 82 by the highlighting means 80I.

FIG. 40 shows an Environment Configuration window 210 including a 3D Environment Configuration dialog box 210A including various options and a Preview Window 210B which is used to specify a laser beam traveling path to a work. In the Preview window which is similar to the edit display window 202, a laser beam LB is displayed together with a marking head icon MK and a work as close as possible to the way it will appear in the edit display window 202 when specified. This function makes it easy for the user to get hold of a printing direction relative to a defective printable work surface area. The iconic representation of the marking head MK appears in the preview window 210B by default and disappears therefrom by clearing a Display Marker check box 210a in the 3D Environment Configuration dialog box 210A. The object in the preview window 210B is also displayed in three dimensions in the head display section 84 of the display section 83. It is enabled to display X, Y and Z coordinate axes in the edit display window 202 as shown in, for example, FIG. 40 for the purpose of easy coordinate orientation. The X, Y and Z coordinate axes may be different in color for clear visible distinction. In FIG. 40, the Z axis is brought into line with a laser beam path. Display of X, Y and Z coordinate axes makes a spatial localization of the marking head relative to a work. The X, Y and Z coordinate axes can be removed from the edit display window 202 by choosing the Display Axes check box 210b in the 3D Environment Configuration dialog box 210A. In this embodiment, the X, Y and Z coordinate axes appear or disappear when choosing or clearing the Display Axes check box 210b.

Figure 82:
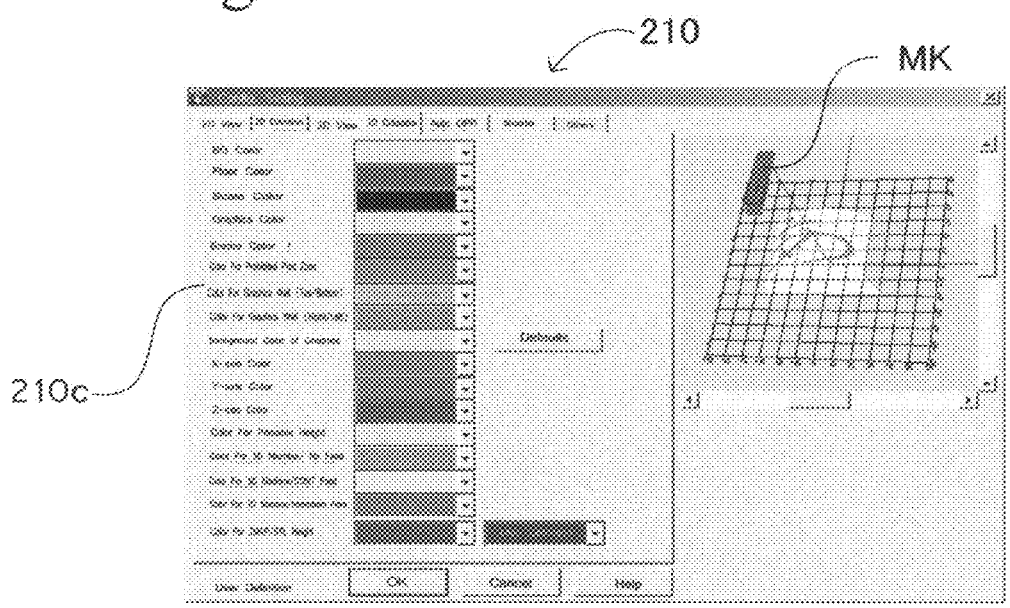
FIG. 82 is a photographic illustration showing an environment configuration window in which a 3D coloring dialog box is chosen.
Figure 83:
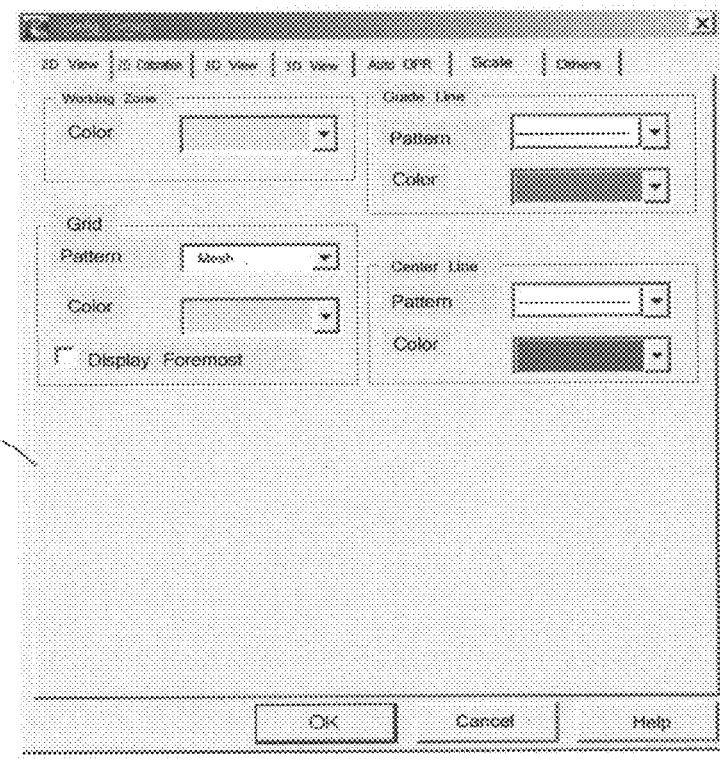
FIG. 83 is a photographic illustration showing an environment configuration window in which a 2D display dialog box is chosen.
Figure 84:
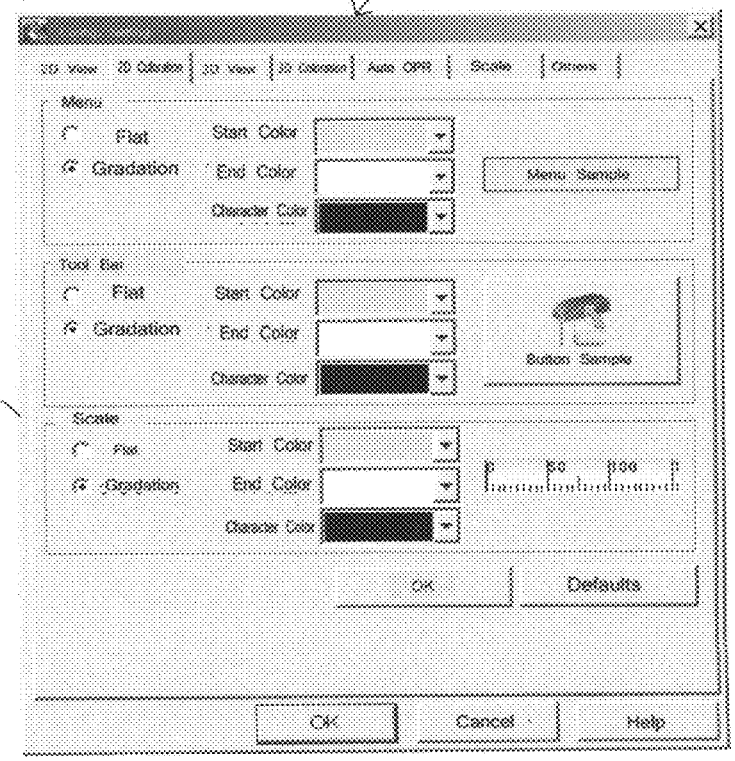
FIG. 84 is a photographic illustration showing an environment configuration window in which a 2D coloring dialog box is chosen.

It is of course a design choice to display or hide the X, Y and Z coordinate axes individually. It is also practicable to display one or more reference lines, besides the X, Y and Z coordinate axes. For example, when printing on an area close to a mot of a columnar work surface, it is practicable to draw a reference line along a side at the mot for clarity of a base position. Such a reference line can be specified by coordinates and a direction of vector. The marking head in the edit display window 202 is displayed in the form of an icon MK having the same appearance and color as a real marking head. However, it is preferred that the marking head icon has a back side different in color from a front side. For example, the marking head icon MK colored in ash gray at the front side has a white back side in FIG. 41 and is colored at a back side in different color from the front side in FIG. 40. Such a color pattern may be optional and is advantageous for the user to get hold of a position of the marking head when varying the view point. FIG. 82 shows a 3D Color Pattern dialog box 210C which appears when enabling a Color Pattern tab in the Environment Configuration window 210. The user can selectively specify colors and pattern elements in details in the preview window 210B. The pattern includes any style such as solid lines patterns, broken lines patterns, fill color patterns, hatching patterns and the like. FIGS. 83 and 84 show a 2D Environment Configuration dialog box 210D and a 2D Color Pattern dialog box 210C, respectively. The Environment Configuration window 210 can be disappeared and/or closed by pressing a close button.

In this way, the user can get hold of a physical relationship between the marking head and a work surface by displaying them together in three dimensions. As a consequence, the user can visually checks up on the representation of settings with ease and find and correct setting mistakes. In the above embodiment, the marking head moves and changes in position correspondingly to movement of a work surface and a shift in view point In the edit display window 202, an object can be zoomed, magnified or demagnified, in the 2D edit mode, and is, however, fixed at a default magnification. It is possible to display the marking head always at a fixed magnification irrespectively of magnification or demagnification of a work because the marking head is displayed for the primary purpose of orientation thereof. This lets the user keep track of the marking head even when a work is demagnified. Further, as the description is directed to printing of a work remaining stationary in the above embodiment, a 3D working area is centrally located in the edit display window 202 especially in the 3D edit mode. However, as described later, it is possible to enlarge the 3D working area for printing of a moving work so as to provide a large substantial area for a printable work surface area. This enables the user to check up on settings with ease. In particular, in the case where an elongated work moves in its longitudinal direction, the work is displayed in full view within the window screen so that it is quite easy for the user to get hold of the complete work without scrolling the window screen up and down.

In this way, the user can get hold of a physical relationship between the marking head and a work surface by displaying them together in three dimensions. As a consequence, the user can visually checks up on the representation of settings with ease and find and correct setting mistakes.

In the above embodiment, the marking head moves and changes in position correspondingly to movement of a work surface and a shift in view point In the edit display window 202, an object can be zoomed, magnified or demagnified, in the 2D edit mode, and is, however, fixed at a default magnification. It is possible to display the marking head always at a fixed magnification irrespectively of magnification or demagnification of a work because the marking head is displayed for the primary purpose of orientation thereof. This lets the user keep track of the marking head even when a work is demagnified. Further, as the description is directed to printing of a work remaining stationary in the above embodiment, a 3D working area is centrally located in the edit display window 202 especially in the 3D edit mode. However, as described later, it is possible to enlarge the 3D working area for printing of a moving work so as to provide a large substantial area for a printable work surface area. This enables the user to check up on settings with ease. In particular, in the case where a long work moves in its longitudinal direction, the work is displayed in full view within the window screen, it is quite easy for the user to get hold of the work thoroughly without scrolling the window up and down.

Figure 85:
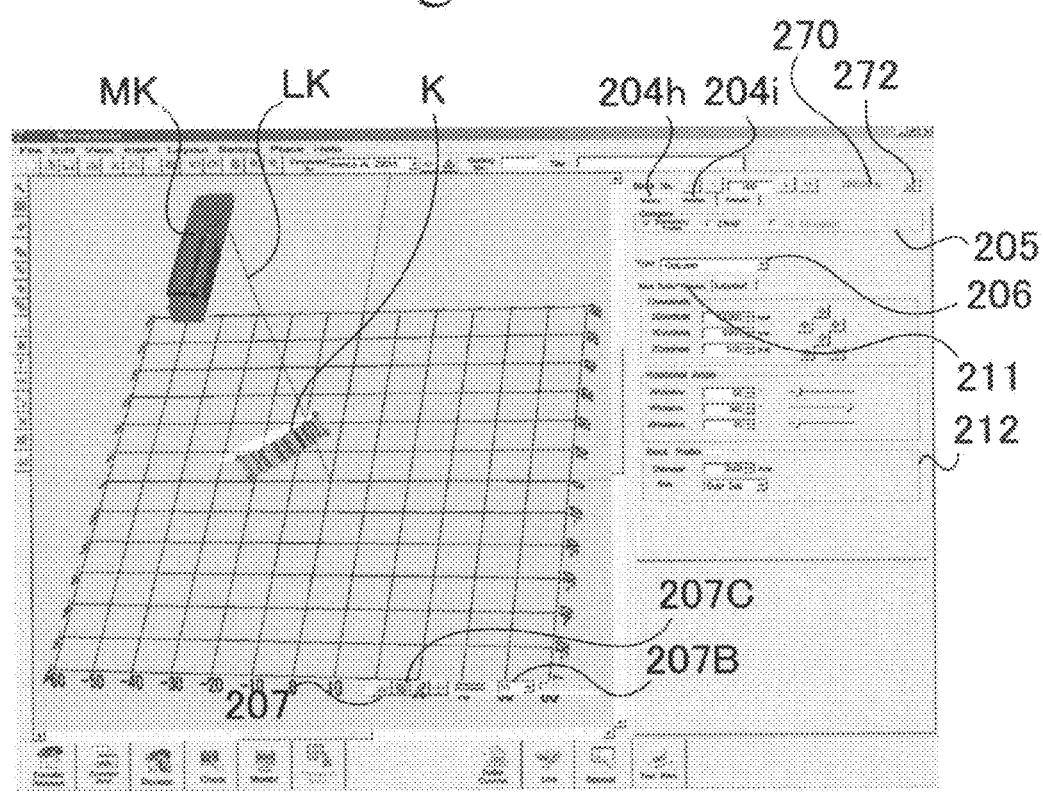
FIG. 85 is a photographic illustration of the edit display window in a 3D edit mode shown in FIG. 36 in which a work is changed in position

FIG. 85 shows the edit display window 202 with the 3D Setting tab 204i enabled in the Profile Setting dialog box chosen by. When enabling a Print Block Profile•Layout tab 211, a Details Setting dialog box 212 appears for letting the user specify details of a block patter including coordinates of a base position, angles of rotation and details of profile of a block pattern. When a columnar work surface is chosen, a radius of a column and a print side, inner or outer, are specified in the Block Pattern•Layout dialog box 212.

Figure 86:
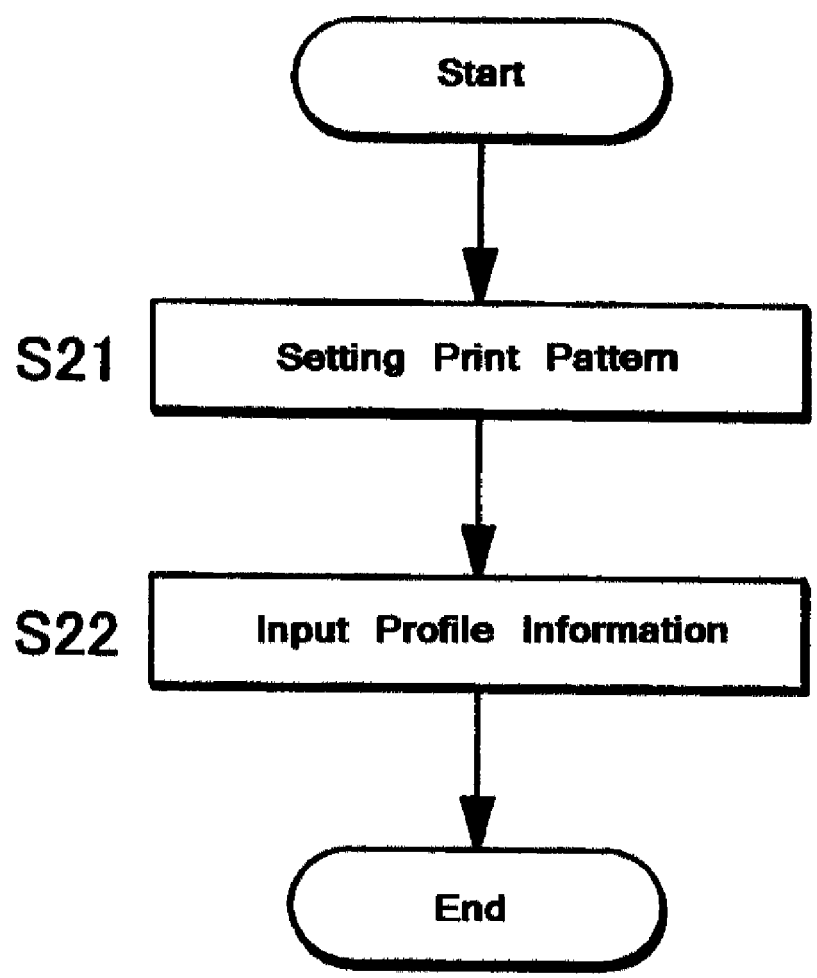
FIG. 86 is a flowchart illustrating a sequence of creating a processing pattern by specifying processing conditions.

FIG. 86 is a flowchart illustrating a procedure of processing pattern creation which is achieved by the processing data generation means 80K during execution of the laser processing data setting program. In first step S21, a processing pattern is set up by entering a character string through the processing condition setting means 3C and specifying an encoding pattern type. Specifically, as shown in FIG. 14 by way of example, after choosing Character String in the Print Category menu box 204a to show the Print Pattern input input dialog box 204, the user types numerical characters "01234 . . . 789" in the Text box 204b and then chooses a print pattern type, i.e. "2D Code" in the Character Data Type box 204d and a print pattern, i.e. QR Code, in the Type menu box 204q. The arithmetical and logic unit 80 makes calculations based on the information thus specified to create a print pattern. The created print pattern appears in the form of 2D representation on the edit display window 202. In this example, although the QC code is automatically created as a print pattern according to information about a character string entered through the processing condition setting means 3C, an intended print pattern may be chosen from a set of print pattern templates or importing an intended print pattern from other files and pasting it in the edit display window 202. In subsequent step S22, profile information is gained through the processing condition setting means 3C. Specifically, when enabling the 3D Setting tab 204i of the Print Pattern input input dialog box 204 shown in FIG. 14, a Print Category box 205 and the Profile menu box 206 appears as shown in FIG. 37. Then, a column is chosen as an elemental profile In the Profile dialog box 205. As a result, the edit display windows 202 changes an object from plane-shaped to column-shaped as shown in FIG. 38. When changing the edit display window 202 to the 3D view mod, the columnar work with the QR code laid thereon changes to 3D representation in the edit display window 202 as shown in FIG. 39. In this way, 3D representation of a print patter appears in the edit display window 202 in the 2D view modes by inputting print pattern information in step S21, and is subsequently converted into 3D representation in the same window 202 but in the 3D view mode by inputting profile information in step S22. The user can visually take a change in print pattern In the processing pattern creation sequence flowchart, the steps S21 and S22 may be replaced with each other. Once processing data has been acquired in the form of 3D spatial coordinate data, a fine adjustment is made in layout and position in the Z-direction as appropriate. The fine adjustment can be achieved by the use of scroll bars or a mouse wheel.

The resultant laser processing once provided in the above sequence is transferred to the control unit 1A of the laser processing system shown in FIG. 12 when pressing Transfer•Readout command button 215 below a lower window border. In the memory of the control unit 1A, the laser processing data is expanded and overwritten.

Figure 87A:
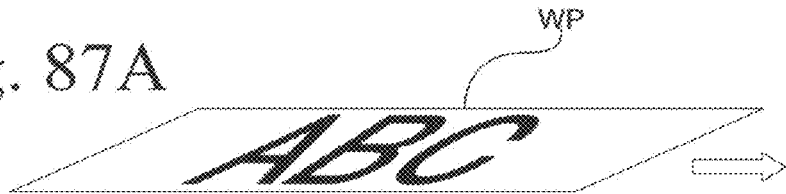
FIG. 87A is a perspective illustration explaining two dimensional printing of a moving work.
Figure 87B:
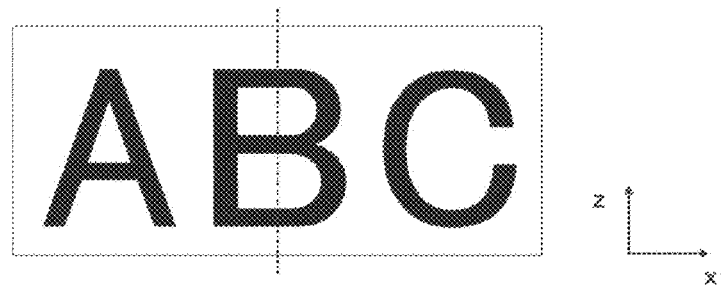
FIG. 87B is a plane illustration explaining two dimensional printing of a moving work.
Figure 88:
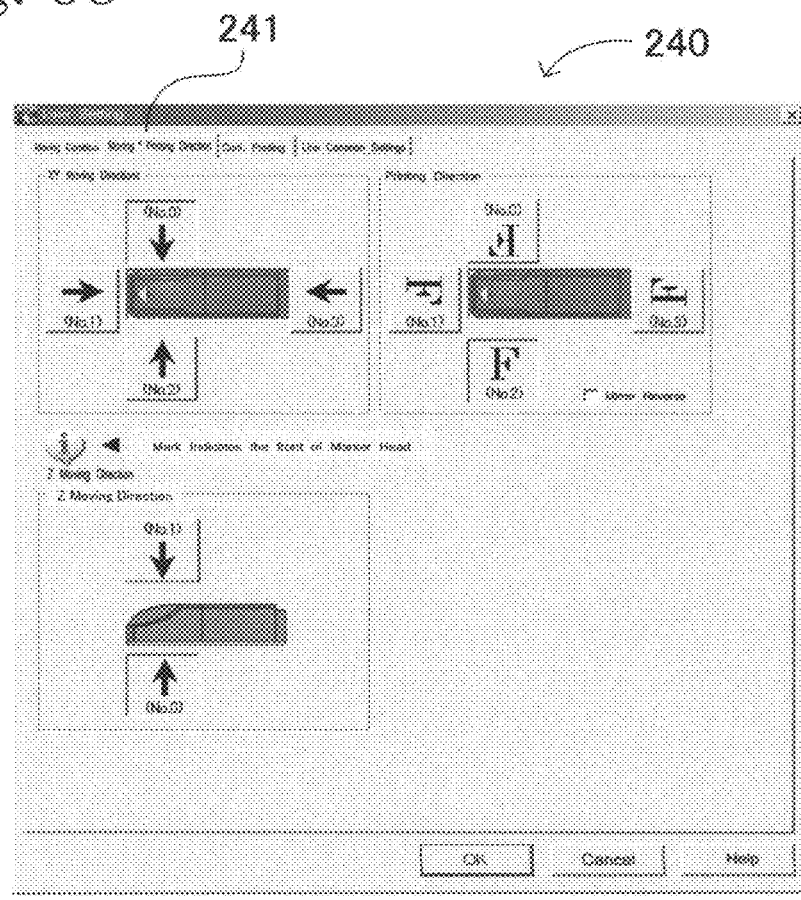
FIG. 88 is a photographic illustration showing a line setting window in which movement/direction dialog box is chosen.

The laser processing system performs printing based on the laser processing data. It is practicable to make test printing prior to actually printing in order to confirm whether printing is possible or not and whether the print result will be good or bad. A plurality of printing patterns can be specified for one work surface or individually for a plurality of work surfaces by repeating the same procedure. Further, a print patterns may be specified The moving work printing follows procedural steps of (1) determining a print pattern; (2) setting printing conditions for a moving plane work; (3) starting print; and (4) adding a moved distance of a work to X and Y coordinates of the print pattern. The printing conditions for a moving plane work which include at least a moving direction, a moving condition, and/or a printing area will be described in order below. In FIGS. 87A and 87B schematically showing the concept of moving work printing in two dimensions, the plane work WP moves towards the right in the drawing. In a Line Setting window 240 shown in FIG. 88 where a marking head is shown in plane and cross section, a Move Direction dialog box 241 is opened to let the user specify an X/Y direction and/or a Z direction of movement of the work WP. In this instance, a bearing of a line and a moving direction of the line are chosen in the Move Direction dialog box 241. The visual optionality of conditions makes the user to easily gain an understanding of relative position between the marking head and a work, so as thereby to achieve setting without errors. In the case where a direction of a print pattern is orthogonal with a moving direction of the marking head, an up or a down arrow is chosen in the Move Direction dialog box 241. The moving condition means a control mode of work speed, namely an open loop control for maintaining the work speed constant or a feedback control and is a choice between the two.

The printable work surface area is defined by moving ranges of a scanner correspondingly taken along X- and Y-axes of a plane coordinate system. The moving ranges of scanner is designed so that the coordinate plane displayed in the edit display window 202 such as shown in FIGS. 14 and 39 corresponds to a maximum printable work surface area. The user can automatically define a printable work surface area by specifying a print pattern within the coordinate plane.

When specifying processing conditions for a moving plane, positional X and Y coordinates of a laser beam after a start of printing a given print pattern can be calculated and it can be decided whether the laser beam should be turned on or off at the individual positions. The positional coordinate of a laser beam is calculated by adding a moving distance of a work in a moving direction to a coordinate of a substantial point forming part of the print pattern in the moving direction. In the example shown in FIG. 87A, since the work moves in an X-direction, the positional coordinate of a laser beam is calculated in terms of X-direction and is left intact in terms of Y-direction. The moving work printing is well suited for works which are rotating or moving in three dimensions. In such a case, the moving work printing follows the same procedural steps as the moving plane work printing.

Figure 89:
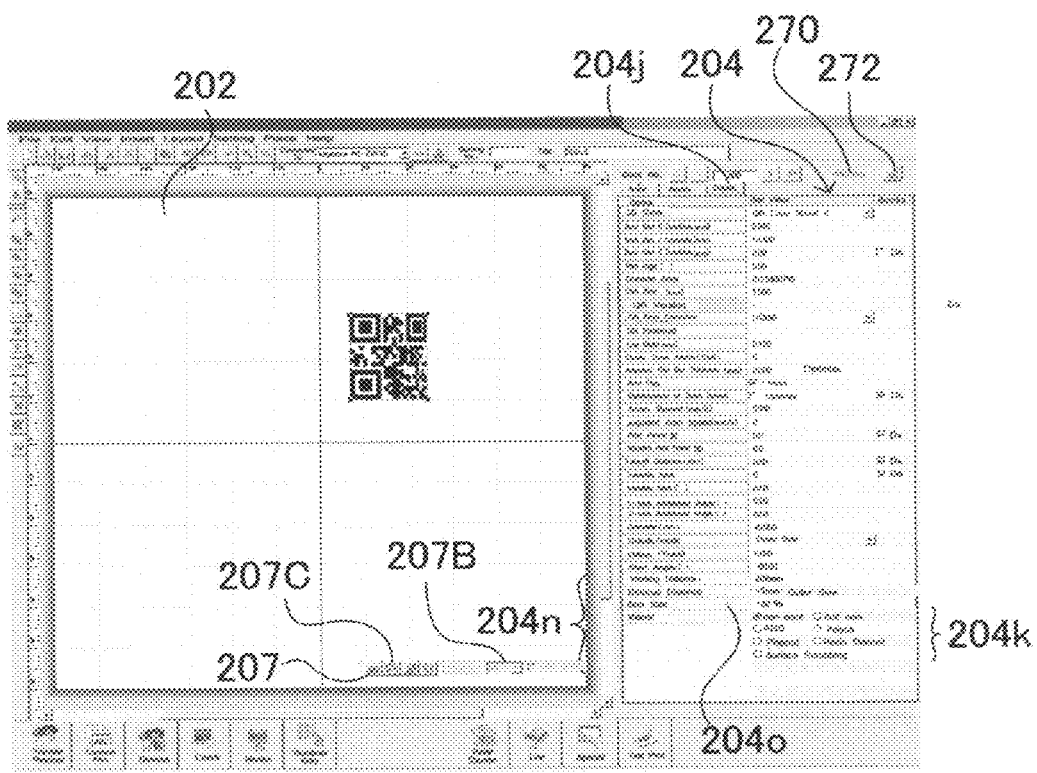
FIG. 89 is a photographic illustration of the edit display window in which a processing parameter setting dialog box is chosen.

FIG. 89 is an edit display window 202 with the Print Pattern input input dialog box 204 in which a Details Setting tab 204*j* is enabled by the user. The processing data generation means 80K described above is adapted to generate processing data based on processing conditions specified through the processing condition setting means 3C so as to turn out a basic condition for conformation of a focal point of a laser beam to a work surface. However, it is possible to set a defocus distance so that the laser beam is intentionally put out of focus on the work surface. The term "defocus distance" as used herein shall mean and refer to an offset from a focal position of a laser beam or a distance between a focal point of a laser beam and a work surface. In the Details Setting dialog box, the user can specify a defocus distance which the user wants in a Defocus box 204*o* which is one of parameters boxes schematically denoted by 204*n*. The laser beam is focused at the defocus distance specified by the user above from a work surface if the defocus distance is a negative value or below from a work surface if it is a positive value. It is also practicable to set other parameters such as a spot size of a laser beam on a work surface and a work material. At this time of specifying one parameter, the processing conditions set by the user are automatically changed according to the parameter. As a consequence, the user can easily perform conditioning through an alteration of a parameter which the user wants. As shown in FIG. 89, the parameters boxes 204*n* include a Working Distance box, a Spot Side box and a Material box. The working distance is inherent in an in-use laser processing machine and is automatically set depending upon it by ordinary. The spot size is specified in percentage with respect to a spot size at a focal point. The work material is chosen from a pull-down Material menu 204*k* appearing when the Material box is chosen. The Material menu lists various processing purposes such as Steel Print in Black and Stainless Print in Black, Resin Deposition and Rough Surface, besides various materials such as ABS Resin, Polycarbonate Resin and Phenol resin. Selection of a material induces coordination of power density of the laser beam.

These parameters are dependent on one another. That is, when adjusting a defocus distance of a laser beam, power density and a spot size of the laser beam varies correspondingly. Further, when choosing a work material and a purpose of processing, appropriate power density is adjusted correspondingly and hence, a spot size or a defocus distance of the laser beam varies correspondingly. Therefore, if it was necessary to adjust power density of a laser power keeping the spot size of the laser beam, the user is required to specify a desired spot size of the laser beam, and besides adjusting parameters such as output power of the laser beam and a scanning speed so as thereby to seek for an appropriate combination of parameters which causes no change in the spot size of the laser beam. The adjustment of parameters was performed by another trial and selected based on the result of actual laser processing of a work surface, which is quite troublesome and consumes a lot of time.

In light of the above problem, the laser processing data setting system 180 of the present embodiment has a relational data base in the form of a look-up table 5*a*, listing a number of records of parameters according to changes in individual parameters, in the memory device 5A (see FIG. 13). When changing one of the parameters, an appropriate record is selected from the look-up table 5*a* so as to set parameters of the selected record automatically. Accordingly, the processing condition setting is completed by changing only a parameter which the user wants to change. For example, in the Details Setting dialog box opened in the Print Pattern input dialog box 204 shown in FIG. 89, when specifying either a spot size or a work material, the remaining parameters in the Details Setting dialog box are automatically corrected according to the parameter or the attribute which the user specified. Even if changing a defocus distance after a spot size or a work material is specified, the remaining parameters (for example, laser output power and a scanning speed, etc.) are also corrected automatically so as to keep the specified parameter, i.e. the spot size or the work material, unchanged. In this way, as the user is requested to change only a parameter which the user intends, a desired result is reached quite easily.

Figure 90A:
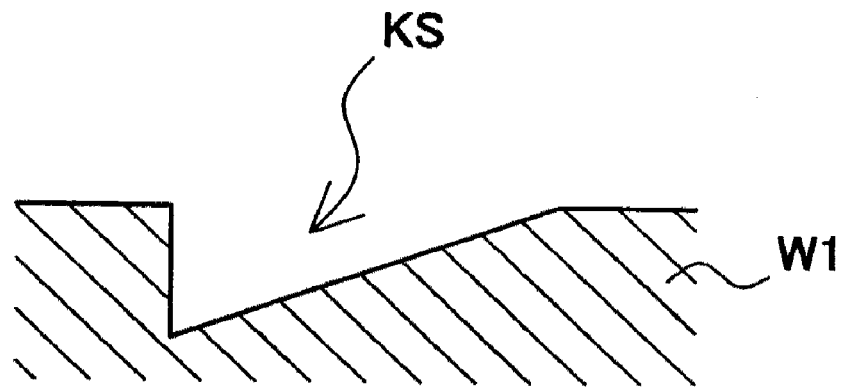
FIG. 90A is an illustration showing a processed work section of a work on which a sloping groove is engraved.
Figure 90B:
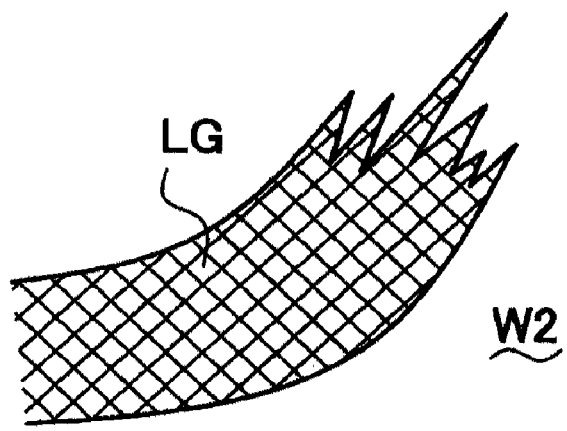
FIG. 90B shows a processed work surface on which a logo is printed in brushstroke.

FIGS. 90A and 90B show processed patterns which are formed by varying a processing parameter continuously during laser processing. More specifically, FIG. 90A shows a processed work section of a work W1 on which a sloping groove KS is engraved, and FIG. 90B shows a processed work surface W2 on which a logo LQ is printed in brushstroke. These processed patterns KS and LG are formed by varying a defocus distance or a barn spot of a laser beam continuously. The processing data generation means 80K adjusts the remaining parameters automatically following the continuous variation of the defocus distance so as to keep the remaining processing conditions unchanged. As a consequence, processing conditions which are not necessary to be changed remains unchanged.

FIG. 91 shows an edit display window 202 accompanied by a Continuous Processing dialog box for setting continuous laser processing. When choosing a Continuous Processing check box, spin boxes appears to let the user specify defocus distances or spot sizes in numeral value. For example, when after choosing a Defocus Distance check box, defocus distances at start and end positions are specified in the spin boxes for start and end positions, respectively. The defocus distance linearly varies in a specified range. It is practicable to specify a defocus distance for either a start position or an end position, and an increasing or a decreasing rate or a change by increment or decrement in place of the defocus distance for a start position or an end position. When specifying defocus distances, spot sizes are correspondingly and automatically specified in spin boxes in reference to the look-up table 5*a* in the memory device 5A. In this way, when having a choice between the corresponding two, the other is automatically specified, so that the user can change the processing conditions specified once by specifying only an intended parameter without focusing attention on dependency relations of the parameters. In the example shown in FIG. 56, the edit display window 202 and the 3D viewer window 260 display RSS•CC codes responding to a choice of RSS & CC which the user specified in the Character Data Type box 204*d*. In this instance, either an RSS code or a composite code comprising an RSS code and a micro PDF code arranged adjacently can be chosen in the Character Data Type spin box 204*d*. As the composite code, RSS-24 CC-A has been chosen in the Type menu box 204*q*. In order to enable the user to enter a describe in the Text box 204*b* with ease, it is practicable to display a floating tool bar including various tools, including special character code tools, external character tools and the like. As just described above, the processing data generation means 80K enables the user to alter settings such as a work material, a processing pattern, a type of finish, a machining time and the like by changing a beam size of a laser beam without restraint. The file of the processing data created according to parameters for processing conditions that once the user specified is saved under an individual file name at any time. The processing data file is saved by choosing a File menu to display a pull-down menu and then choosing Save As menu to open a File Save dialog box and entering a new file name in a file name box. The processing data file can be use when the same laser processing is applied to similar works. It is practicable to use various data files of all-to-common processing conditions which are provided previously.

As just described above, the basic process of the programmed laser processing data setting comprises setting a character string and its layout as information about a two dimensional print pattern by use of a user interface for two dimensional setting, and thereafter setting three dimensional information and its layout for converting the two dimensional print pattern into a three dimensional print pattern by use of a user interface for three dimensional setting. Specifically, information about a print pattern such as a character string, a barcode, a two dimensional code, a user-defined graphic and the like and data on a plane layout of the print pattern such as a size, inclination of the individual characters, line widths and the like are entered through the user interface for two dimensional setting. This data entry can be achieved by directly specifying numerical values or by directly editing an object displayed in two dimensions on the display screen or window through mouse operation. Subsequently, information about a three dimensional pattern and a layout is added to the two dimensional print pattern by use of the user interface for three dimensional setting. In order to specify a three dimensional profile, the 3D Setting tab 204i (see FIG. 38) is opened. When specifying Column in the Profile menu box 206, a print pattern is changed as attached to a columnar surface and displayed in plane as viewed from right above the columnar surface as shown in FIG. 38.

Transformation of the print pattern from a plane view to a three dimensional view is achieved as follows. In the case of a three dimensional object such as a columnar surface which is developable in plane, a print pattern such as a character string set in two dimensions is regarded as being laid on a developed plane surface. When creating a three dimensional columnar surface from the developed plane view, it is easily calculated which position the character string occupies in the three dimensional work surface. Further, a front view of the three dimensional character string is gained by creating a representation view of the columnar work surface with the character string laid thereon which is viewed infinitely right above from a surface to be printed and then excluding information about all but the character string, i.e. about the columnar work surface, from the representation view of the columnar work surface. Not exclusively to this way, it is practicable to project a print pattern set in two dimensions onto a three dimensional surface in a desired direction or to lay a print pattern set in two dimensions on a three dimensional surface in approximate mapping.

Figure 92:
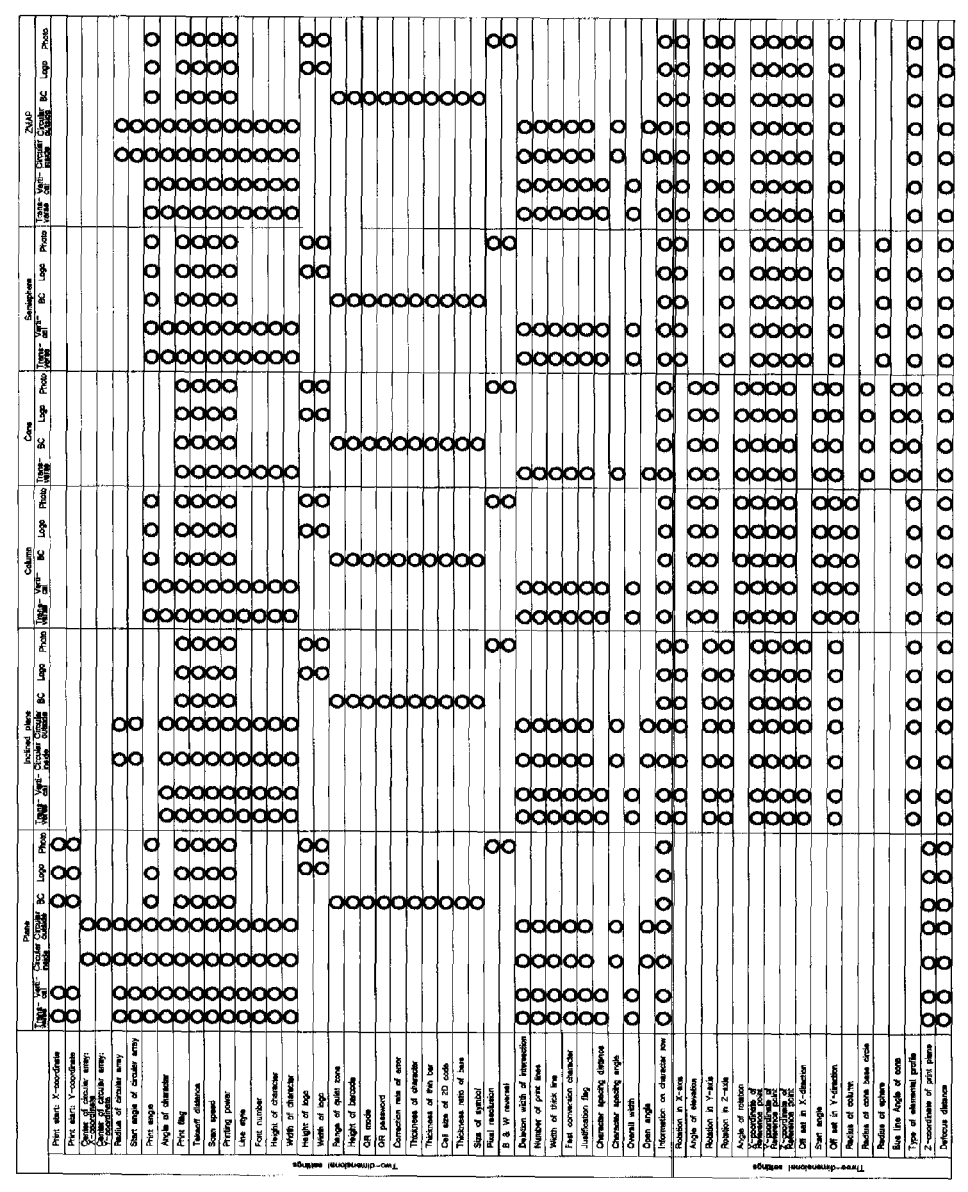

A layout of the print pattern set in three dimensions is adjusted by use of the user interface for three dimensional setting. The layout adjustment is finely achieved by adjusting a position of the print pattern displayed in plane on the two dimensional view window intuitively confirming a solid position of the print pattern on the three dimensional view window. For the layout adjustment, information is entered to specify coordinates of a reference position of a basic profile, an inclination of the basic profile, distances of characters from the reference position of the basic profile. This information entry can be achieved by directly specifying numerical values or by directly editing an object (the print pattern) on a work surface displayed in two dimensions and/or three dimensions in the display screen or window. Examples of items which are possibly specified in the layout adjustment include those listed in a table shown in FIG. 92.

The processing conditions include information about processing patterns and information about three dimensional profiles necessary to convert a processing pattern into a three-dimensional profile according to the work profiles. Examples of the processing pattern include character strings, graphics such as barcodes, two dimensional codes and logos. In mass processing such as printing of pallets, it is preferred to involve variable numbers such as a date of manufacture and a serial number in a processing pattern. Such a processing pattern applied to a work assures traceability of the work.

Figure 93A:
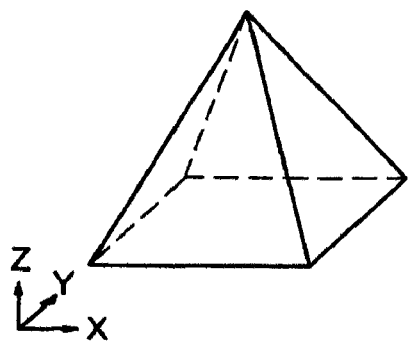
FIGS. 93A and 93B are illustrations for demonstrating a correlation of a Z coordinate to X and Y coordinates with regard to printing a quadrangular pyramidal work.
Figure 93B:
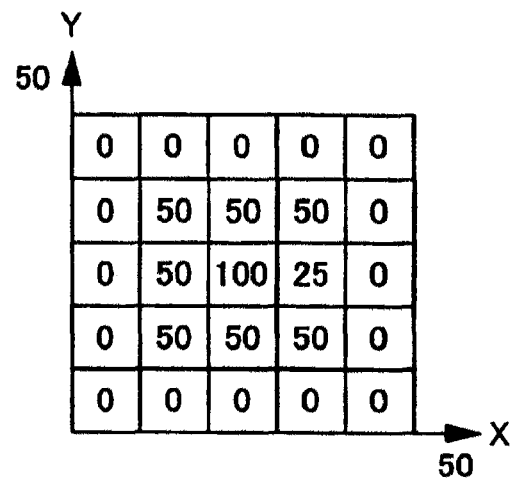

FIGS. 93A and 93B are illustrations for explaining a tracking function of the Z-axis scanner. In the laser processing system for three dimensionally scanning a work surface with a laser beam to print the work surface, the Z-axis scanner is enabled to move following movement of X-axis and Y-axis scanners by correlating a Z coordinate with X and Y coordinates. Taking printing a quadrangular pyramidal work shown in FIG. 93A, a Z coordinate of a position on an oblique plane is correlated with X and Y coordinates of the position which is represented by a cell of a correlation chart shown in FIG. 93B. The Z-axis scanner can operate to move a laser beam spot to a Z coordinate which is automatically determined according to operation of the X-axis and Y-axis scanners following the correlation defined by the correlation chart. In general, a Z-axis scanner is apt to be inferior in responsiveness to X-axis and Y-axis scanners due to a mechanical difference from the X-axis and Y-axis scanners. In other words, the Z-axis scanner takes too long to complete scan operation after receiving an instruction of scan as compared with the X-axis and Y-axis scanners. Therefore, when causing the Z-axis scanner to follow up the X-axis and Y-axis scanners, there occurs a waiting time until the Z-axis scanner completes its scan operation or it is necessary to reduce speeds of response of the X-axis and Y-axis scanners, so that, in any case, it takes a comparatively long time to complete printing.

Figure 94A:
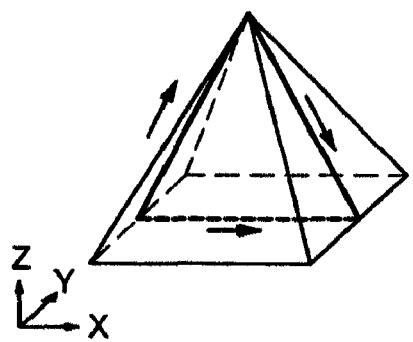
FIGS. 94A and 94B are illustrations for demonstrating a tracking function of a Z-axis scanner.
Figure 94B:
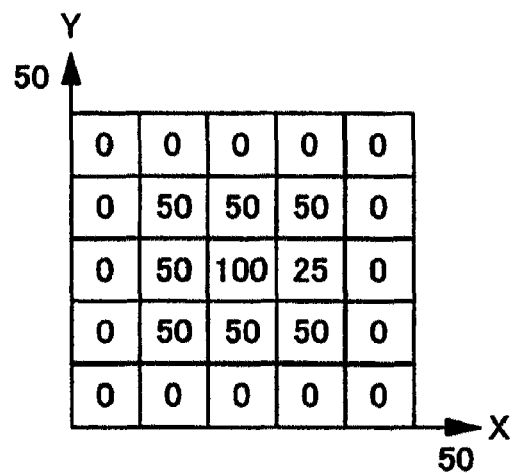

For that reason, in this embodiment, the Z-axis scanner tracking function is enabled not regularly but only as needed. Specifically, as shown in FIGS. 94A and 94B, the Z-axis scanner is caused to operate as indicated by a heavy solid line and arrows according to the correlation defined by the correlation chart during substantive printing and, however, stays in a position to hold the laser beam spot at a fixed Z coordinate as indicated by a heavy broken line and an arrow during an interruption of printing. As a consequence, the Z-axis scanner discontinues its operation during operation of the X-axis and Y-axis scanners during an interruption of printing, so that, since the X-axis and Y-axis scanners are allowed to operate at their potential speeds, an overall printing time is shortened. For example, it is practicable to output a Z coordinate correlated with X and Y coordinates during substantive printing and a fixed Z coordinate independent from X and Y coordinates. The Z-axis scanner may remains unchanged in position so as to retain the laser beam spot at a Z coordinate at completion of the last printing or may operate so as to return the laser beam spot to a specific Z coordinate such as a Z coordinate upon activation of the laser marking system, a lowest or a highest Z-coordinate during printing. Otherwise, the Z-axis scanner may operate so as to move the laser beam spot to a Z-coordinate for initiation of subsequent printing. This enables the scanning device to ensure a smooth start of scanning operation.

Figure 95:
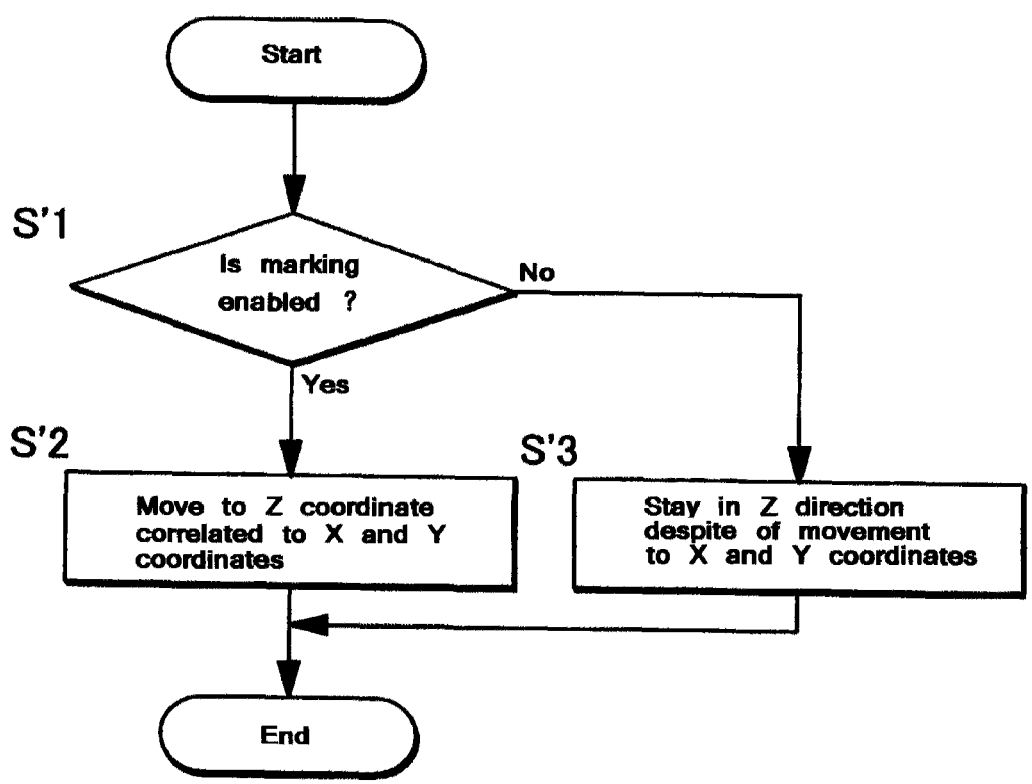
FIG. 95 is a flowchart illustrating a control sequence of Z-axis scanner tracking.

FIG. 95 is a flowchart illustrating a control sequence of Z-axis scanner operation. When operating the Z-axis scanner so as to move a laser beam spot from a position P1 (Xa, Ya, Za)

to a position P2 (Xb, Yb, Zb) (see FIG. 96A), a judgment is made in step S'1 as to whether irradiation of a laser beam is effected. When the answer is negative or NO, the Z-axis scanner operates so as to move the laser beam spot along a path defined by Z-coordinates correlated to X and Y coordinates in step S'2. More specifically, the Z-axis scanner operates so as to move the laser beam spot from a Z coordinate Za to a Z coordinate a along a heavy solid line shown in FIG. 96A following operation of the X and Y scanners for movement of the laser beam spot from X and Y coordinates Xa and Ya to X and Y coordinates Xb and Yb, respectively. On the other hand, when the answer to the judgment in step S'1 is affirmative or YES, the control logic proceeds to step S'3 where the Z-axis scanner remains stationary so as there by to allow the laser beam spot to move directly from a Z coordinate Za to a Z coordinate a along a heavy broken line shown in FIG. 97A while the X and Y scanners operates so as to position the laser beam spot at X and Y coordinates Xb and Yb, respectively, when irradiation of a laser beam is resumed for subsequent printing. In this way, the Z-axis scanner is prevented from unnecessarily operating and, as a consequence, the X-axis and Y-axis scanners can operate at high speeds correspondingly.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A laser processing system for processing a work surface within a working area with a predetermined processing pattern by the use of a laser beam, said laser processing system comprising:
    a laser generating device for generating a laser beam for processing;
    a scanning device for scanning a work surface with said laser beam within a two-dimensional scanning area which is defined as a working area by a scannable extent of said scanning device;
    said scanning device comprising;
        a beam expander for varying a distance at which said laser beam generated by said laser generating device is focused;
        a first scanner for deflecting said laser beam coming from said beam expander in a first direction to scan said work surface within said scanning area in said first direction; and
        a second scanner for deflecting said laser beam reflected by said first scanner in a second direction perpendicular to said first direction to scan said work surface within said scanning area in said second direction;
    a control section for controlling said laser generating device and said scanning device so as to process said work surface based on laser processing conditions;
    a processing pattern setting section for setting as said laser processing conditions a processing pattern and a position of said processing pattern within said two-dimensional scanning area;
    a two-dimensional display device for displaying said two-dimensional scanning area and said processing pattern in two-dimensions positioned at said position within said scanning area and set by the processing pattern setting section;
    a work setting section for setting as said laser processing conditions a three-dimensional profile of said work surface;
    a data generating section for generating laser processing data for said work surface based on said laser processing conditions set by said processing pattern setting section and work setting section;
    a three-dimensional display device for displaying said scanning area in three-dimensions as well as said three-dimensional profile of said work surface superimposed on said scanning area based on data representing said processing pattern and said position of said processing pattern set by said processing pattern setting section and said three-dimensional profile of said work surface set by said work setting section; and
    a position changing section for shifting a position of said work surface and said processing pattern integrally with said work surface within said scanning area displayed in said three-dimensional display device.

2. The laser processing system as defined in claim 1, wherein the data generating section is provided with coordinate conversion section for converting coordinate data of said processing pattern from two-dimensional plane coordinate data to three-dimensional spatial coordinate data so as to make the processing pattern virtually fit the three-dimensional profile.

3. The laser processing system as defined in claim 1, wherein said work setting section selects said three-dimensional profile of said work surface from a plurality of predetermined three-dimensional profiles.

4. The laser processing system as defined in claim 1, wherein said work setting section specifies either one of inner and outer sides of said profile of said work surface for processing.

5. The laser processing system as defined in claim 1, wherein said three-dimensional display device is capable of displaying said work surface in three dimensions selectively in an X-Y coordinate plane, a Y-Z coordinate plane, a Y-Z coordinate plane and a Z-X coordinate plane.

6. The laser processing system as defined in claim 1, wherein said position changing section is capable of adjusting the position of said processing pattern and said work surface in an X-Y coordinate plane and a position of the Z direction.

7. The laser processing system as defined in claim 1, wherein said work setting section is capable of setting an angle of rotation of said work surface with respect to each axis of three-dimensional coordinate system of said three-dimensional display device and said three-dimensional display device displays said work surface after a rotation through said angle of rotation.

8. The laser processing system as defined in claim 1, further comprising size setting section for varying a size of said work surface displayed within said scanning area on said three-dimensional display device.

9. The laser processing system as defined in claim 1, wherein said processing pattern setting section is capable of collectively setting a plurality processing patterns in a group and also setting as said laser processing conditions each said processing pattern and a position of each individual said processing pattern.

10. The laser processing system as defined in claim 9, wherein said work setting section is capable of setting as said laser processing conditions a three-dimensional profile of said work surface according to each individual said processing pattern.

11. The laser processing system as defined in claim 1, and further comprising view point changing section for rotating said scanning area displayed in two dimensions so as thereby to change a view point of a three-dimensional display on said three-dimensional display device.

12. The laser processing system as defined in claim 11, wherein said three-dimensional display device shows a three-dimensional display of a direction of radiation of said laser beam.

13. A laser processing data setting system for setting processing data based on a processing pattern with which a laser processing system having scanning device processes a work surface within a working area, which is a scanning area defined in one direction by a first scannable extent of said scanning device and in another direction orthogonal with said one direction by a second scannable extent of said scanning device, according to laser processing conditions with a laser beam, said laser processing data setting system comprising:
 a processing pattern setting section for setting as said laser processing conditions a processing pattern and a position of said processing pattern within said two-dimensional scanning area;
 a two-dimensional display device for displaying said two-dimensional scanning area and said processing pattern in two-dimensions positioned at said position within said scanning area and set by the processing pattern setting section;
 a work setting section for setting as said laser processing conditions a three-dimensional profile of said work surface, said three-dimensional profile being selected from a plurality of predetermined elemental profiles;
 a data generating section for generating laser processing data for said work surface based on said laser processing conditions set by said processing pattern setting and work setting sections;
 a three-dimensional display device for displaying said scanning area in three-dimensions as well as said three-dimensional profile of said work surface superimposed on said scanning area based on data representing said processing pattern and said position of said processing pattern set by said processing pattern setting section and said three-dimensional profile of said work surface set by said work setting section; and
 a position changing section for shifting a position of said work surface and said processing pattern integrally with said work surface within said scanning area displayed in said three-dimensional display device.

* * * * *